United States Patent
Pichaimurthy et al.

(10) Patent No.: US 11,606,465 B2
(45) Date of Patent: Mar. 14, 2023

(54) SYSTEMS AND METHODS TO AUTOMATICALLY PERFORM ACTIONS BASED ON MEDIA CONTENT

(71) Applicant: Rovi Guides, Inc., San Jose, CA (US)

(72) Inventors: Rajendran Pichaimurthy, Karnataka (IN); Madhusudhan Seetharam, Bangalore (IN); Gyanveer Singh, Bihar (IN)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 17/123,603

(22) Filed: Dec. 16, 2020

(65) Prior Publication Data

US 2022/0191331 A1    Jun. 16, 2022

(51) Int. Cl.
| | |
|---|---|
| H04M 3/56 | (2006.01) |
| H04N 7/14 | (2006.01) |
| G10L 15/18 | (2013.01) |
| G06F 3/16 | (2006.01) |

(52) U.S. Cl.
CPC .......... *H04M 3/568* (2013.01); *G06F 3/165* (2013.01); *G10L 15/1822* (2013.01); *H04M 3/567* (2013.01); *H04N 7/142* (2013.01); *H04N 7/147* (2013.01)

(58) Field of Classification Search
USPC ................................................... 379/202.01
See application file for complete search history.

(56) References Cited

U.S. PATENT DOCUMENTS

| | | | |
|---|---|---|---|
| 8,515,025 | B1 | 8/2013 | Hewinson |
| 9,232,190 | B1 | 1/2016 | Vendrow |
| 10,057,636 | B1 | 8/2018 | Nijim et al. |
| 10,084,665 | B1 | 9/2018 | Arunachalam et al. |
| 10,235,996 | B2 | 3/2019 | Renard et al. |
| 10,244,104 | B1 | 3/2019 | Ireland et al. |
| 10,798,341 | B1 | 10/2020 | Hegde et al. |
| 11,044,287 | B1 | 6/2021 | Mahajan et al. |
| 11,082,465 | B1 * | 8/2021 | Chavez ................. G06V 20/40 |
| 11,082,467 | B1 | 8/2021 | Hartnett et al. |
| 11,140,222 | B2 | 10/2021 | Anders et al. |
| 11,290,684 | B1 | 3/2022 | C S et al. |
| 2006/0092269 | A1 | 5/2006 | Baird et al. |
| 2007/0282990 | A1 | 12/2007 | Kumar et al. |
| 2007/0286347 | A1 | 12/2007 | Moore |

(Continued)

OTHER PUBLICATIONS

U.S. Appl. No. 17/123,582, filed Dec. 16, 2020, Gaurav Gandhi.

(Continued)

*Primary Examiner* — Amal S Zenati
(74) *Attorney, Agent, or Firm* — Haley Guiliano LLP

(57) ABSTRACT

Systems and methods are provided for automatically selecting a mute function based on audio content. One example method includes receiving, at a first computing device, a first audio input and, from a second computing device, a second audio input.
Content of the first audio input and the second audio input is determined with natural language processing. Whether the content of the first audio input corresponds to the content of the second audio input is determined. A mute function is operated at the first computing device, based on the determination of whether the content of the first audio input corresponds to the content of the second audio input.

13 Claims, 45 Drawing Sheets

(56) References Cited

U.S. PATENT DOCUMENTS

| | | |
|---|---|---|
| 2009/0094370 A1 | 4/2009 | Jacob et al. |
| 2009/0097628 A1 | 4/2009 | Yap et al. |
| 2009/0113060 A1 | 4/2009 | Jacob et al. |
| 2009/0231438 A1 | 9/2009 | Srivastava et al. |
| 2009/0282103 A1 | 11/2009 | Thakkar et al. |
| 2009/0327425 A1 | 12/2009 | Gudipaty |
| 2010/0034366 A1* | 2/2010 | Basson ............... G10L 15/26 379/202.01 |
| 2010/0135481 A1 | 6/2010 | Christenson et al. |
| 2010/0174575 A1 | 7/2010 | Farrell et al. |
| 2012/0128322 A1 | 5/2012 | Shaffer et al. |
| 2012/0163576 A1 | 6/2012 | Bentley et al. |
| 2012/0218373 A1 | 8/2012 | N'Guessan |
| 2012/0265328 A1 | 10/2012 | Kadirkamanathan et al. |
| 2013/0205358 A1 | 8/2013 | Huang et al. |
| 2013/0279678 A1 | 10/2013 | Beerse et al. |
| 2013/0301810 A1 | 11/2013 | Dunne et al. |
| 2013/0329866 A1 | 12/2013 | Mai et al. |
| 2015/0058058 A1 | 2/2015 | Shi et al. |
| 2015/0215365 A1 | 7/2015 | Shaffer et al. |
| 2015/0319309 A1 | 11/2015 | Cunico et al. |
| 2015/0334149 A1 | 11/2015 | Chougle et al. |
| 2015/0381817 A1 | 12/2015 | Zhao et al. |
| 2016/0100084 A1 | 4/2016 | Schofield et al. |
| 2016/0359943 A1 | 12/2016 | Huang et al. |
| 2017/0104647 A1 | 4/2017 | Chaiyochlarb et al. |
| 2018/0025750 A1 | 1/2018 | Smith et al. |
| 2018/0034887 A1 | 2/2018 | Dunne et al. |
| 2018/0091563 A1 | 3/2018 | Hughes |
| 2018/0218727 A1 | 8/2018 | Cutler et al. |
| 2018/0241882 A1 | 8/2018 | Lee et al. |
| 2018/0350218 A1 | 12/2018 | Jeon et al. |
| 2018/0358034 A1 | 12/2018 | Chakra et al. |
| 2018/0376105 A1 | 12/2018 | Davies |
| 2019/0068389 A1 | 2/2019 | Chitre et al. |
| 2019/0158586 A1 | 5/2019 | Anders et al. |
| 2019/0236212 A1 | 8/2019 | Heindorf et al. |
| 2020/0084056 A1 | 3/2020 | Deluca et al. |
| 2020/0099889 A1 | 3/2020 | Sugihara |
| 2020/0110572 A1 | 4/2020 | Lenke et al. |
| 2020/0244357 A1 | 7/2020 | Heath et al. |
| 2020/0260050 A1 | 8/2020 | Pell |
| 2020/0374536 A1 | 11/2020 | Edpalm et al. |
| 2021/0056860 A1 | 2/2021 | Fahrendorff et al. |
| 2021/0104246 A1 | 4/2021 | Jolly et al. |
| 2021/0118436 A1 | 4/2021 | Kim et al. |
| 2021/0218590 A1 | 7/2021 | Akhoury et al. |
| 2022/0060525 A1 | 2/2022 | Chavez et al. |
| 2022/0086209 A1 | 3/2022 | Suto et al. |

OTHER PUBLICATIONS

U.S. Appl. No. 17/123,620, filed Dec. 16, 2020, Sindhuja C S.
U.S. Appl. No. 17/123,640, filed Dec. 16, 2020, Sindhuja C S.
U.S. Appl. No. 17/123,659, filed Dec. 16, 2020, Rajendran Pichaimurthy.
Hasan et al., "An automatic fire detection and warning system under home video surveillance," 2016 IEEE 12th International Colloquium on Signal Processing & Its Applications (CSPA), 2016, pp. 258-262, doi: 10.1109/CSPA.2016.7515842.
Landa et al., "Implementation of a Remote Real-Time Surveillance Security System for Intruder Detection", 2017 9th International Conference on Measuring Technology and Mechatronics Automation (ICMTMA), 2017, pp. 102-105, doi: 10.1109/ICMTMA.2017.0032.

* cited by examiner

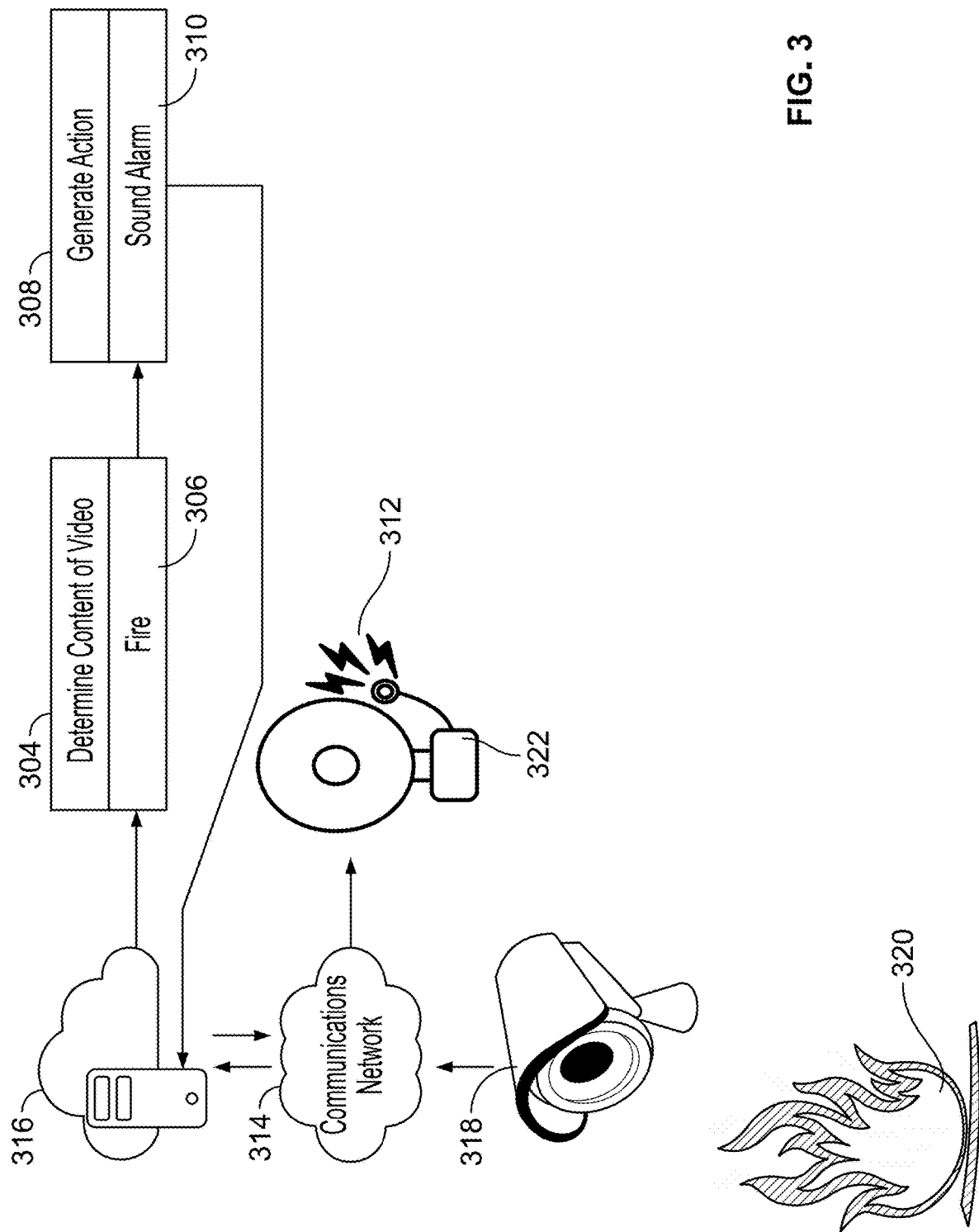

| Device | Role | Video | Audio | Bandwidth | Company | Role |
|---|---|---|---|---|---|---|
| 1 | Host | Yes | Yes | High | ABC Inc. | Director |
| 2 | Co-host | Yes | No | Medium | ABC Inc. | Manager |
| 3 | Co-host | No | No | Medium | DEF Inc. | Associate |
| 4 | Participant | No | No | High | N/A | Vice President |
| 5 | Participant | No | No | Low | GHI LLP | N/A |
| 6 | Participant | Yes | No | Medium | N/A | N/A |

2502
Transmit, from a Computing Device, a Video Stream to One or More Secondary Computing Devices

2504
Detect a Network Connectivity Issue Between the First Computing Device and the One or More Secondary Computing Devices

2506
Display a Notification to One or More of the Secondary Computing Devices if a Network Issue Detected

FIG. 25

SYSTEMS AND METHODS TO AUTOMATICALLY PERFORM ACTIONS BASED ON MEDIA CONTENT

BACKGROUND

The disclosure relates to automatically performing actions based on media content and, in particular, systems and related methods for determining and performing actions pertaining to video and/or audio streams.

SUMMARY

With the proliferation of computing devices, such as laptops, smartphones and tablets, there has been an increase in the use of systems that receive and process video and/or audio. For example, a videoconferencing program on a laptop may enable a user to view video streams via the laptop screen. The videoconferencing program may have a number of capabilities built into it, for example the ability to record the videoconference, the ability to mute the user or other videoconference participants, the ability to display the video streams of other participants in different ways, and/or the ability to start a conference call from a calendar invite. Typically all these functions are operable by the user in a manual fashion. In addition, if a video stream is no longer received from a participant, then the videoconferencing program may indicate an error. In videoconferencing calls with a larger number of participants, the number of configurable options can distract a host of the videoconference from delivering the videoconference, as they are distracted by adjusting settings associated with the videoconference. For example, a host may want to record only parts of a videoconference, such as the presentation of a slide deck, and may not want to record an informal discussion following the presentation. If the host forgets to stop the recording, then it will require extra work to edit the video after the videoconference. In another scenario, there may be two presentations with an informal discussion between them. The host may remember to stop the recording after the first presentation, but forgets to start the recording after the informal discussion, losing the second presentation entirely. On top of this, a participant may be muted while listening to the presentation, but forget to unmute themselves when attempting to participate in the informal discussion and may miss their opportunity to contribute to the discussion. Additionally, the host may be joined by co-hosts. If so, the host may wish to order the participants in a particular manner on their screen. However, if a co-host is late in joining the videoconference, then it may distract the host to have to rearrange the order of the participants on their screen. For a user who wishes to attend a videoconference, but it conflicts with another event on their calendar, the user may wish to catchup on the videoconference at a later time. However, if the videoconference is long and does not stick to an advertised agenda, it may take an excessive amount of time for the user to find the content that they are interested in. Additional issues arise when participants have connectivity issues, especially if a participant is the person giving a presentation. It can be confusing for videoconference participants if connectivity issues are experienced and they are unsure as to whether, for example, the videoconference is proceeding. There are a variety of issues that arise when using videoconferencing, some of which pertain to the video aspect and some of which pertain to the audio aspect. Although the above example refers to a videoconference, these problems may arise when using video and/or audio outside of videoconferencing as well. For example, a user may wish to record only certain parts of a video of a Closed-circuit Television (CCTV) system, or the videoconference may instead be a teleconference.

In view of the foregoing, it would be beneficial to have a system that allows actions to be performed automatically based on media content.

Systems and methods are described herein for automatically performing actions based on media content. In accordance with an aspect of the disclosure, a method is provided for automatically performing an action based on video content. A content determination engine is used to determine content of the video. Based on the content of the video, an action to perform at the first computing device and/or a second computing device is generated. If the action is to be performed at the second computing device, the action to be performed is transmitted to the second computing device. The action is performed at the respective first and/or second computing device.

An example implementation of such a method is a household camera that is connected to a local network and transmits a live video stream to a server. The content of the video stream is determined at the server, and the server determines that there is an intruder attempting to enter the household. Based on the content of the video stream, the server generates an action to display an alert on a mobile device that is in communication with the server. The action is transmitted to the mobile device, and the mobile device displays an alert indicating that there is an intruder attempting to enter the household.

Audio may also be received at the first computing device, and the determining the content of the video may be based, at least in part, on the received audio. The content of the video may additionally and/or alternatively be determined based on text recognition of any text present in the video and/or any people identified in the video.

The method may further include identifying and determining the state of at least one object in the video, and the generated action to perform is based on the state of the object. In addition to the example described above, this may include identifying a fire and sounding an alarm on a connected alarm and/or displaying an alert at a mobile device.

The action to perform may include the stopping of any video that is being broadcast from the first device, stopping the storage of any video that is being stored at the first device and/or transmitting video from the first computing device to at least one other computing device.

In accordance with another aspect of the disclosure, a method is provided for automatically selecting a mute function based on audio content. A first audio input is received at a first computing device. In addition, a second input is received at the first computing device from a second computing device. Natural language processing is used to determine content of the first and second audio inputs. It is then determined whether the content of the first audio input corresponds to the content of the second audio input. Based on whether or not the first and second audio inputs correspond, a mute function may be operated at the first computing device.

An example of such a system is an audioconferencing system that uses natural language processing to determine what participants are speaking about. For example, the participants are discussing gravitational waves and someone shouts "Shut the door, please" in proximity to a first participant. The system may determine that the phrase "Shut the door, please" does not correspond to gravitational waves and hence may turn on the mute function of the first participant's device.

The first audio input may be received via an input device, such as a microphone, and the second audio input may be received from a second computing device via, for example, a network. The first and/or second audio input may be transcribed. Although the example above indicates that the mute function is turned on, the natural language processing may determine that a speaker is intending to be heard, but has accidentally left the mute function turned on. In this case, the mute function may be operated by the system and turned off. It may also be beneficial to automatically record the participants, so that if it is determined that the mute function has accidentally been left on, the first part of a participant's contribution can be automatically played back, so that none of the participant's contribution is missed.

A network, such as the natural language processing network discussed above, may be trained to determine whether the content of a first audio input corresponds to the content of a second audio input. Source audio data including source audio transcriptions made up of words is provided. A mathematical representation of the source audio data is produced, wherein the source audio words are assigned a value that represents the context of the work. The network is trained, using the mathematical representation of the source audio data, to determine whether the content of first and second audio inputs correspond.

In another aspect, a method for automatically arranging the display of a plurality of videos on a display of a computing device is provided. A plurality of video streams is received at a computing device. An order in which to display the video streams, based on the video of the video streams, is determined. The video streams are displayed on a display of the computing device based on the determined order.

An example of such a system is a mobile device displaying a plurality of audiovisual streams of a videoconference for a business presentation. The mobile device uses natural language processing to determine what is being said in the audiovisual streams and orders the streams so that the presenters are displayed first on the screen. Such an example may further make use of a participant recognition model and/or query a database of participant names in order to aid with the ordering of the videos. Additionally, the entropy (i.e., how much movement there is in a video) of a video may be used to indicate who is presenting and who is participating. In addition to determining the entropy, the determination may take into account whether the entropy is contributed by human movement or non-human movement. Another factor that may be taken into account to order the videos is the frequency of messages (e.g., in a chat function) that are exchanged between devices. Finally, the order in which the participants join the videoconference may be taken into account.

In another aspect, a method is provided for automatically responding to network connectivity issues in a media stream. A media stream is transmitted from a first computing device to one or more secondary computing devices. Whether there is a network connectivity issue between the first computing device and the one or more secondary computing devices is detected. Where a network connectivity issue is detected, a notification is transmitted to one or more of the secondary computing devices.

An example of an implementation of such a method follows. If a user participating in a videoconference via a laptop has a connectivity issue, for example if they move out of range of a Wi-Fi network, then a notification is transmitted to the other participants indicating that the user is having a connectivity issue. The system on which this method is implemented may comprise, for example, a server that monitors the status of all participants and transmits notifications as appropriate. Alternatively, the system may be de-centralized, and participants may monitor the status of other participants in the videoconference. The method may also or alternatively comprise monitoring network connectivity issues between secondary devices and transmitting a notification to the primary device and the other secondary devices.

The notification may be in the form of a text message, an audio message, an icon and/or a notification that appears in a notification area of the one or more secondary computing devices. The secondary computing devices may be split into subgroups, with one or more of the subgroups prioritized for receiving notifications. The determination of the network connectivity may include transmitting a polling signal and monitoring for any change in the polling signal, monitoring for a change in bitrate of the video stream and/or monitoring for a change in the strength of a wireless signal.

Natural language processing may be used to determine content of the audio of videoconference participants, and the notification may be transmitted to one or more secondary devices based on the audio of the videoconference. This may include determining the name of one or more participants named in the videoconference. A database of participants may be queried to determine, for example, whether the participant is a host of the videoconference.

In another aspect, a method is provided for automatically identifying content of a conference call. Audio is received at a computing device. A user response to the audio is determined, and, using natural language processing, content of the audio is determined. An action is performed based on the user response and the audio content.

An example of such a system is a user participating in a conference call via a mobile device. The user may pick up the mobile device when they are interested in the content of the conference call and may put down the mobile device when they are less interested. By monitoring the output of an accelerometer of the mobile device, the user response can be determined. The audio of the conference may be transmitted to a server, and the content of the audio may be determined. For example, the user may be interested in fast cars, but less interested in slow cars. Based on the determination, the server may instruct the mobile device to automatically record the parts of the conference call that relate to fast cars.

Other ways of determining user interest include using an image capture device, such as a camera of a computing device, to capture images of the user. The images may be analyzed to determine a user's facial expression and/or a user's emotion (e.g., bored, interested, excited). In addition, audio may be captured via the device. For example, if a user is listening to music at the same time, that may indicate that they are less interested in the content. Also, a characteristic associated with the user's voice may be determined. Other indicators include monitoring the time that a user displays a conferencing application on a display of the computing device, tracking a user's eye movement and/or associating audio content from the conference call with a user profile. Another example of an action that may be performed is alerting the user to specific content. For example, if the conference related to slow cars for the last 30 minutes and has changed to fast cars, the user may be alerted so that they can pay attention to the conference.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout and in which:

FIG. 3 shows another exemplary environment in which a video is received at a computing device and an action based on the video content is automatically performed, in accordance with some embodiments of the disclosure;

FIG. 24 is an exemplary data structure for indicating attributes associated with conference participants, in accordance with some embodiments of the disclosure;

FIG. 25 is a flowchart representing a process for transmitting a media stream from a first computing device to one or more secondary computing devices and for automatically responding to network connectivity issues, in accordance with some embodiments of the disclosure;

DETAILED DESCRIPTION

Figure 1:
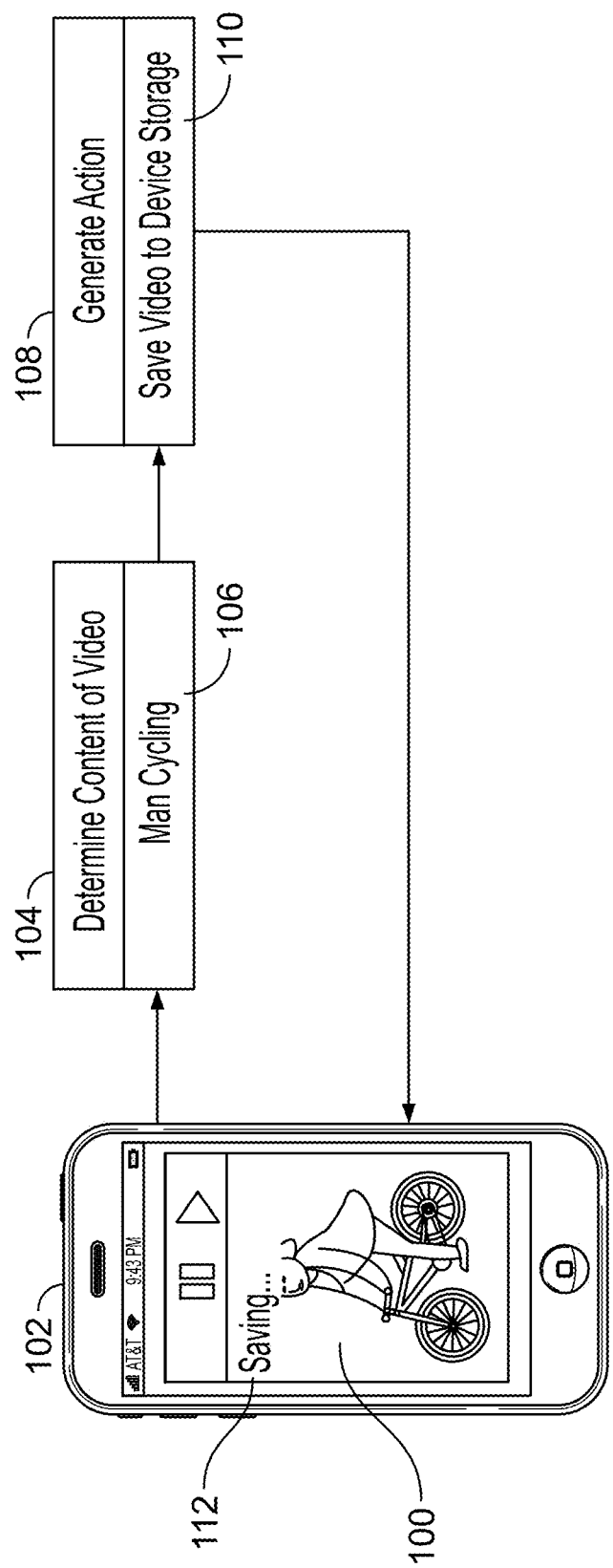
FIG. 1 shows an exemplary environment in which a video is received at a computing device and an action based on the video content is automatically performed, in accordance with some embodiments of the disclosure.

Systems and methods are described herein for automatically performing actions based on media content. As referred to here, media content may be a video, audio and/or a combination of the two (audiovisual). A video is any sequence of images that can be played back to show an environment with respect to time. Media content may comprise a file stored locally on a computing device. Alternatively and/or additionally, media content may be streamed over a network from a second computing device. Streamed media may be provided in a substantially real-time manner, or it may refer to accessing media from a remote computing device. In some examples, media content is generated locally, such as via a microphone and/or camera.

Performing an action includes performing an action at a program running on a computing device, for example, operating a mute function of a program. Performing an action may also include transmitting an instruction to a second device, for example an internet-of-things (IoT) device. This can include sounding an alarm or displaying an alert. The action may also include operating a connected device, for example a connected coffee machine. The action may be in relation to the media content, for example recording (or stopping the recording of) media content.

A network is any network on which computing devices can communicate. This includes wired and wireless networks. It also includes intranets, the internet and/or any combination thereof. Where multiple devices are communicating, this includes known arrangements of devices. For example, it may include multiple devices communicating via a central server, or via multiple servers. In other cases, it may include multiple devices communicating in a peer-to-peer manner as defined by an appropriate peer-to-peer protocol. A network connectivity issue is any issue that has the potential to cause issues with the transmission of media content between two or more computing devices. This may include a reduction in available bandwidth, a reduction in available computing resources (such as computer processing and/or memory resources) and/or a change in network configuration. Such an issue may not be immediately obvious to an end user, however; for example, a relatively small reduction in bandwidth may be a precursor to further issues. A connectivity issue may manifest itself as pixilated video and/or distorted audio on a conference call. Network connectivity issues also include issues where connectivity is entirely lost.

Determining the content of audio and/or video may include utilizing a model that has been trained to recognize the content of audio and/or video, for example, if the video is of a fire, to recognize that the video is showing a fire. Such a model may be an artificial intelligence model, such as a neural network. Such a model is typically trained on data before it is implemented. The trained model can then infer the content of audio and/or video that it has not encountered before. Such a model may associate a confidence level with such output, and any determined actions may take into account the confidence level. For example, if the confidence level is less than 60%, an action may not be recommended. The model may be implemented on a local computing device. Alternatively and/or additionally, the model may be implemented on remote server, and the output from the model may be transmitted to a local computing device. The model may be continually trained, such that it learns from media that it receives as well, in addition to an original data set.

The disclosed methods and systems may be implemented on a computing device. As referred to herein, the computing device can be any device comprising a processor and memory, for example a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a handheld computer, a stationary telephone, a personal digital assistant (PDA), a mobile telephone, a portable video player, a portable music player, a portable gaming machine, a smartphone, or any other television equipment, computing equipment, or wireless device, and/or combination of the same.

The display of a computing device may be a display that is largely separate from the rest of the computing device, for example one or more computer monitors. Alternatively it may be a display that is integral to the computing device, for example the screen or screens of a mobile phone or tablet. In other examples, the display may comprise the screens of a virtual reality headset, an augmented reality headset or a mixed reality headset. In a similar manner, input may be provided by a device that is largely separate from the rest of the computing device, for example an external microphone and/or webcam. Alternatively, the microphone and/or webcam may be integral to the computing device.

The methods and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory, including, but not limited to, volatile and non-volatile computer memory or storage devices such as a hard disk, floppy disk, USB drive, DVD, CD, media cards, register memory, processor caches, Random Access Memory (RAM), etc.

FIG. 1 shows an exemplary environment in which a video is received at a computing device and an action based on the video content is automatically performed, in accordance with some embodiments of the disclosure. Video 100 is received at a mobile device 102. The video 100 can be streamed video, for example as part of a videoconference, or video that is accessed locally. On receiving the video, a content determination engine determines 104 content of the video. In this example, the video 100 is of a man cycling 106.

An action to perform at the mobile device 102 is determined 108. The action may take into account one or more preset rules. For example, the rule may comprise "save the video if the content is not private." In this example, as the content is not private, the action is to save the video the device storage 110. The action is performed at the mobile device 102 and the video is saved 112 to the device storage. The preset rules may be set by a user of the mobile device, for example, through a settings page. Alternatively, the preset rules may be determined by a distributor of an application running on a computing device and not be changeable by a user. For example, a company may wish to ensure that CCTV videos are automatically recorded if the video is of an employee accessing a secure premises after a certain time and are not deletable by a user reviewing the video. The company may require a second factor to be determined in order to ensure that the time stamp of the video has not been altered. In this case, the content determination engine may determine that the video shows an employee accessing the secure premises and that it has been recorded after a certain time, for example, based on a light level of the video. If these preset rules are met, then the video may be automatically recorded. The preset rules may be populated automatically, based on the determined content of video. For example, if the video comprises sensitive material, then rules relating to saving the video may be auto-populated.

Determining the content of video and generating the action to perform may include utilizing a trained model. Such a model may be an artificial intelligence model, such as a trained neural network, and may associate a confidence level with the output. The action to be performed may take into account the confidence level. For example, if the confidence level is less than 70%, an action may not be performed. In this particular example, the trained model would be implemented at the mobile device 102.

Figure 2A:
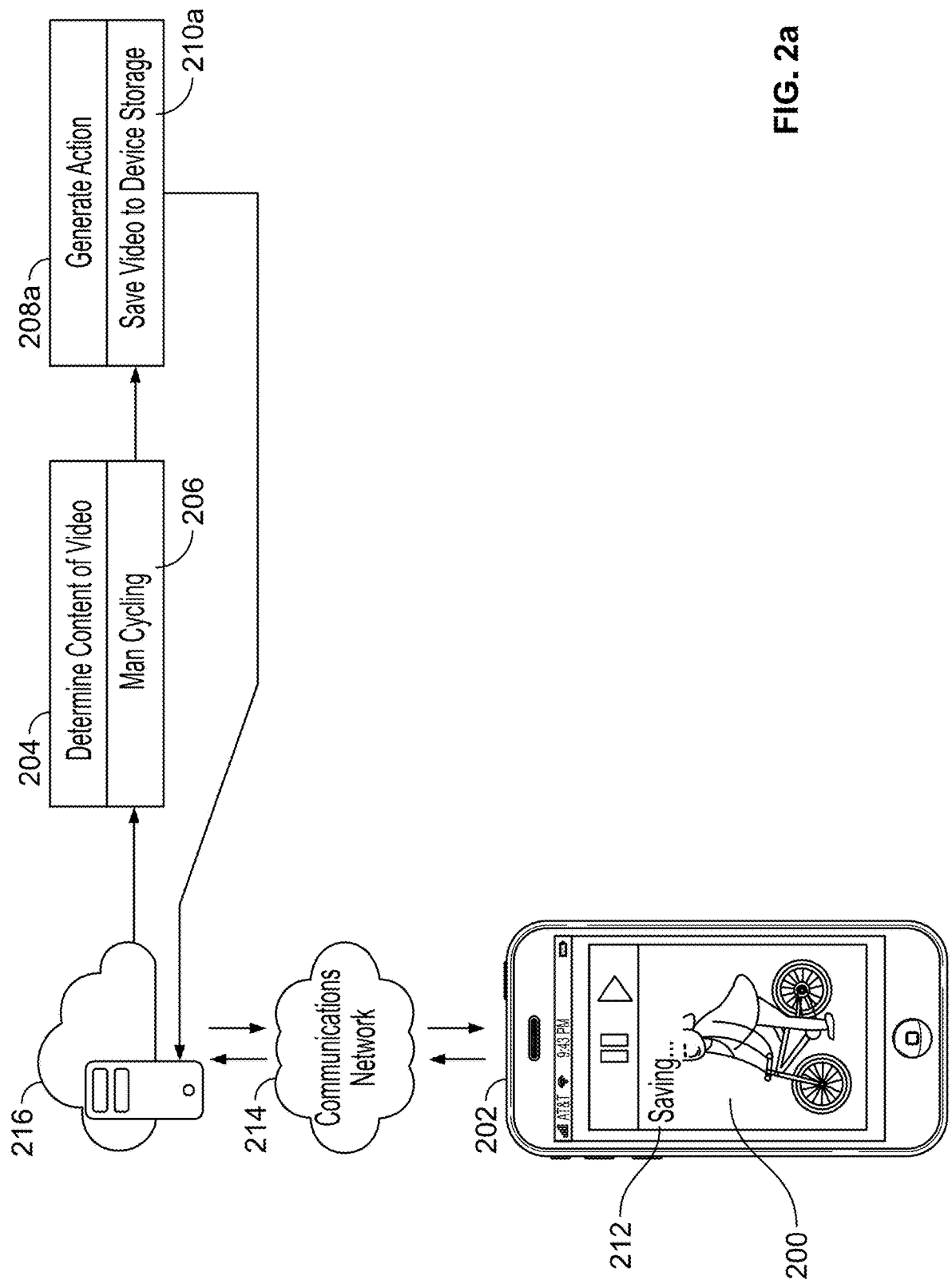
FIGS. 2a and 2b show further exemplary environments in which a video is received at a computing device and an action based on the video content is automatically performed, in accordance with some embodiments of the disclosure.
Figure 2B:
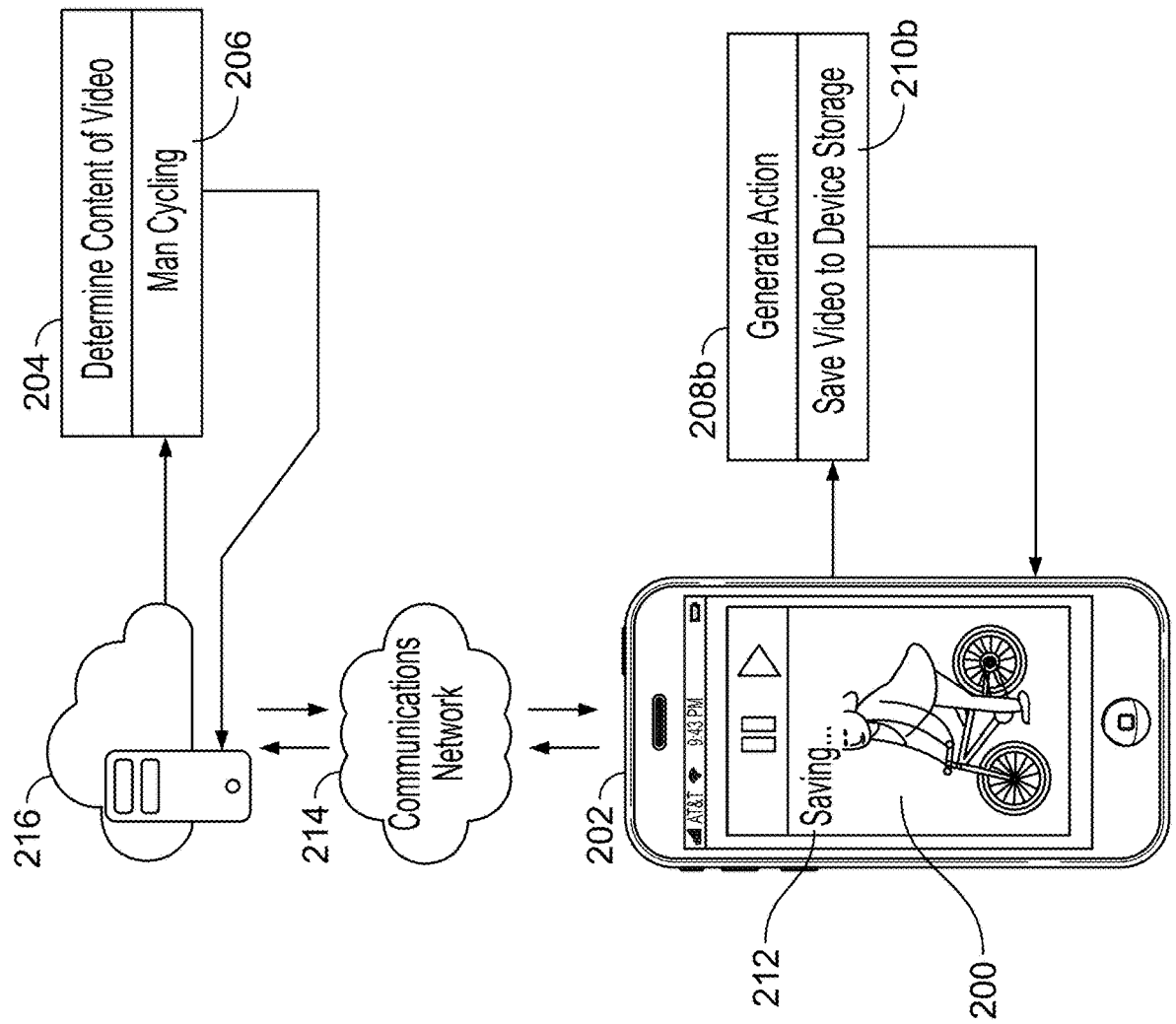

FIGS. 2a and 2b show another exemplary environment in which a video is received at a computing device and an action based on the video content is automatically performed, in accordance with some embodiments of the disclosure. Video 200 is received at a mobile device 202. Again, the video 200 can be streamed video, for example as part of a videoconference, or video that is accessed locally. On receiving the video, the video is transmitted, via a communications network 214, to a server 216. The communications network 214 may be a local network and/or the internet and may include wired and/or wireless components. At the server 216, a content determination engine determines content 204 of the video. In this example, the video 200 is again of a man cycling 206.

In FIG. 2a, in addition to the content determination engine determining content 204 of the video, an action to perform at the mobile device 202 is generated 208a at the server. Again, the action may take into account one or more preset rules. For example, the rule may comprise "save the video if the content is not private." In this example, as the content is not private, the action is to save the video the device storage 210a. The determined action is transmitted back to the mobile device 202 via the communications network 214. The determined action is performed at the mobile device 202 and the video is saved 212 to the device storage.

In FIG. 2b, once the content determination engine has determined the content 204 of the video, the determined content is transmitted from the server 216 to the mobile device 202 via the communications network 214, and an action to perform at the mobile device 202 is generated 208b at the mobile device 202. Again, the action may take into account one or more preset rules. For example, the rule may comprise "save the video if the content is not private." In this example, as the content is not private, the action is to save the video to the device storage 210b. The determined action is performed at the mobile device 202 and the video is saved 212 to the device storage.

The preset rules and the determination of the content of the video and generating the action to perform may be implemented as discussed above in connection with FIG. 1, but with elements of the model implemented at a server, as discussed above in connection with FIGS. 2a and 2b.

FIG. 3 shows another exemplary environment in which a video is received at a computing device and an action based on the video content is automatically performed, in accordance with some embodiments of the disclosure. A computing device comprising a camera 318 captures images of an environment at regular intervals. This may, for example, be one image a minute, one image a second, 10 images a second, 30 images a second, 60 images a second or 120 images a second. The camera 318 may also capture images at a variable rate. For example, it may capture images at a base rate of one image a second, but if motion is detected, it may increase the rate to, for example, 60 images a second. The camera 318 may be a connected (i.e., connected to a network) security camera of a household and/or a connected camera of a smart doorbell. In this example, the environment being captured by the camera 318 comprises a fire 320. The camera 318 sends the images via a communications network 314 to a server 316. The images may be automatically compressed before they are sent over the network 314. At the server, the content of the video is determined 304. In this example, it is determined that the video comprises a fire 306. At the server, an action is generated 308. In this example, the action is to sound an alarm at a connected alarm 310. The action is transmitted via the communications network 314 to the connected alarm 322, and the alarm sounds 312. In this way, any computing device comprising a camera can be used to make another connected device a smart device (i.e., a device that can operate to some extent interactively and autonomously). The camera 318 or the alarm 322 may not be capable of detecting a fire by themselves; however, as both are connectable to a network and are capable of receiving instructions, it is possible to make them both operate in a smart manner. In this way, the capabilities of any internet-connected device can be improved. In addition or alternatively, the server may transmit an alert to emergency services, or to a mobile phone of a user and/or operate a connected fire suppression system.

Figure 4:
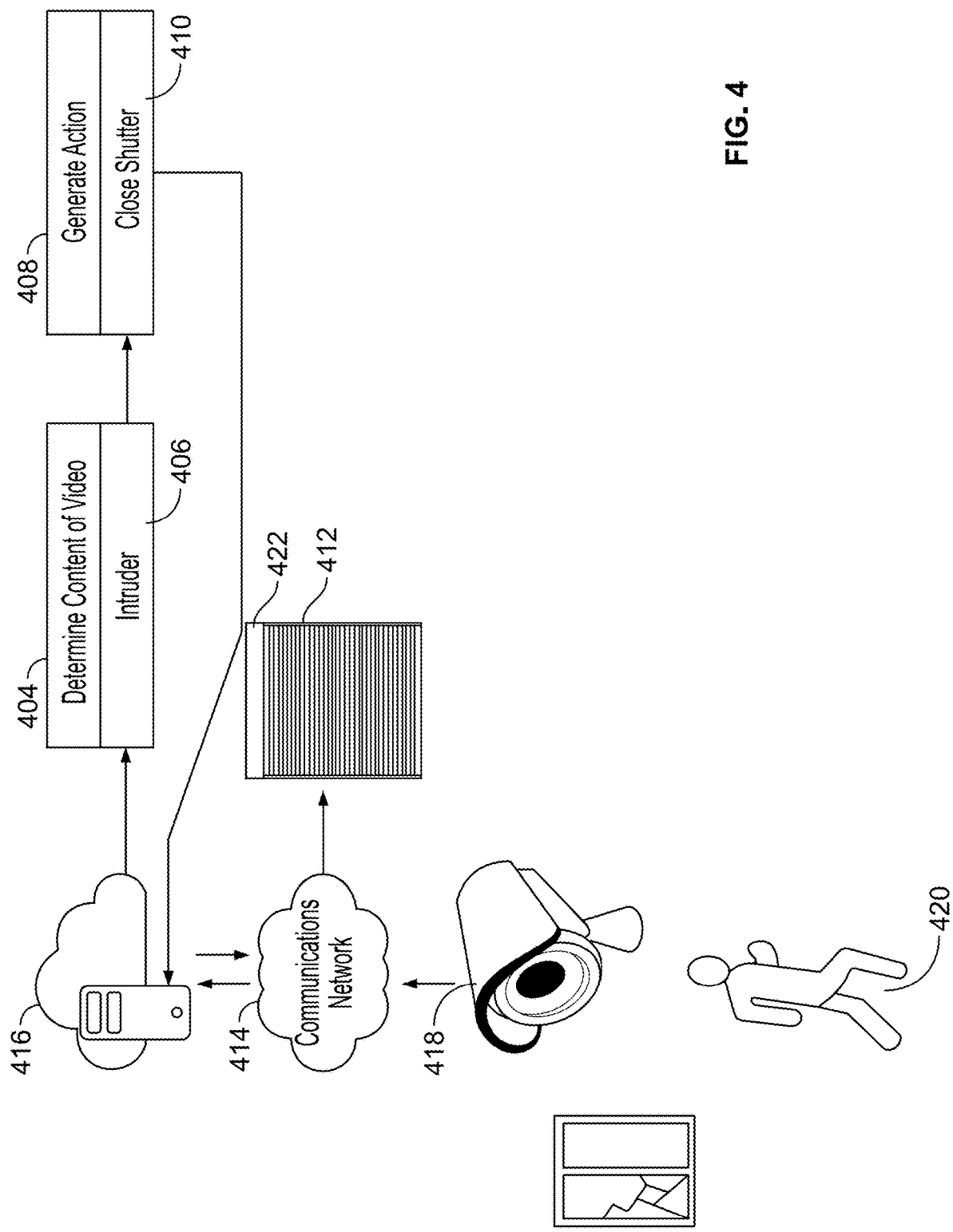
FIG. 4 shows another exemplary environment in which a video is received at a computing device and an action based on the video content is automatically performed, in accordance with some embodiments of the disclosure.

FIG. 4 shows another exemplary environment in which a video is received at a computing device and an action based on the video content is automatically performed, in accordance with some embodiments of the disclosure. A computing device comprising a camera 418 captures images of an environment at regular intervals. The camera may be similar to the aforementioned camera 318. The camera 418 may be a connected (i.e., connected to a network) security camera of a household and/or a connected camera of a smart doorbell. In this example, the environment being captured by the camera 418 comprises an intruder 420. In a similar manner to that described in connection with FIG. 3, the camera 418 sends the images via a communications network 414 to a server 416. At the server, the content of the video is determined 404. In this example, it is determined that the video comprises an intruder 406. At the server, an action is generated 408. In this example, the action is to close a connected shutter 410. The action is transmitted to via the communications network 414 to the connected shutter 422 and the shutter closes 412. Again, the camera 418 or the shutter 422 may not be capable of detecting an intruder by themselves; however, as both are connectable to a network and are capable of receiving instructions, it is possible to make them both operate in a smart manner. In addition or alternatively, the server may transmit an alert to emergency services and/or an alert to a mobile device of a user.

Figure 5:
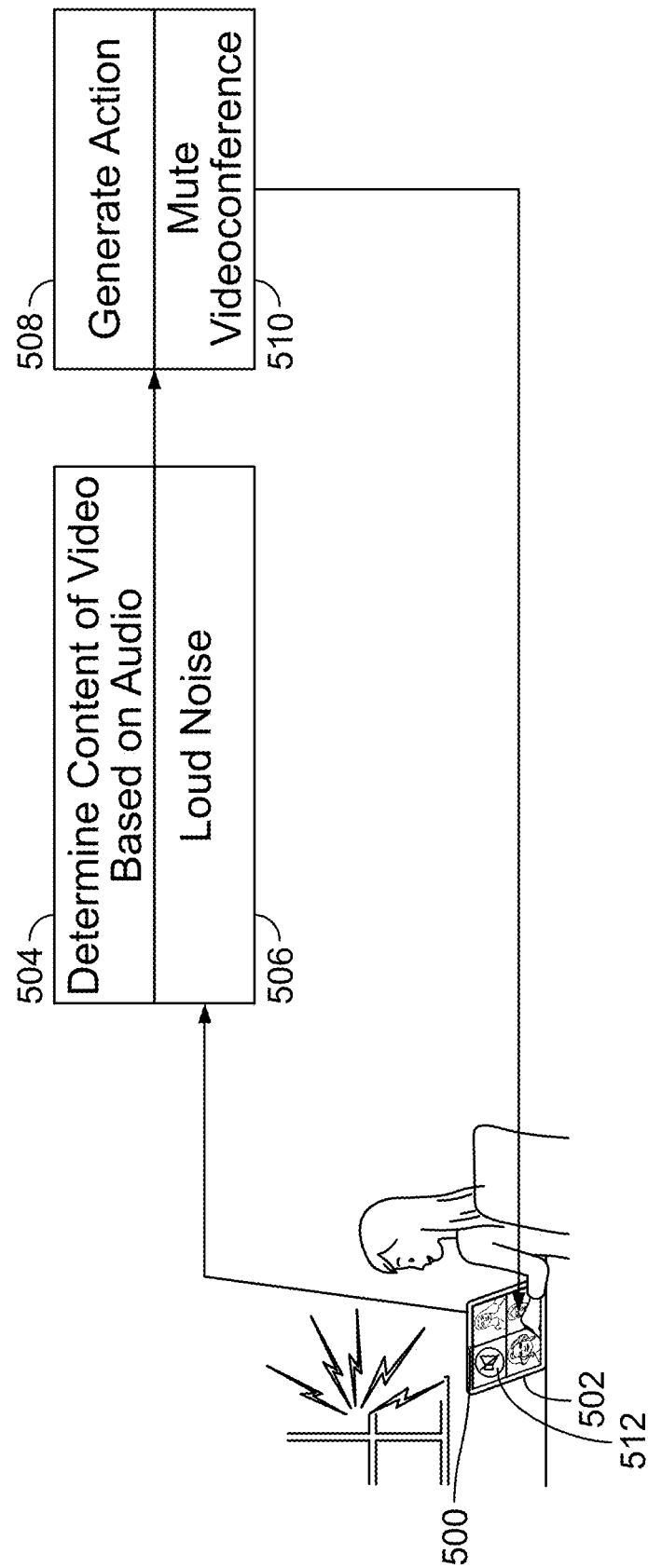
FIG. 5 shows another exemplary environment in which a video is received at a computing device and an action based on the video content is automatically performed, in accordance with some embodiments of the disclosure.

FIG. 5 shows another exemplary environment in which a video is received at a computing device and an action based on the video content is automatically performed, in accordance with some embodiments of the disclosure. Video and audio are received via a webcam comprising a microphone 500 at a laptop 502 as part of a user participating in a videoconference. The microphone of the webcam 500 captures a loud sound, which causes the user to get up and investigate. The content of the video is determined based on the audio 504. In this example, it is determined that the user is getting up to investigate the loud noise 506. An action to be performed is generated 508. In this example, it is to mute the videoconference 510, so that other participants are not disturbed. At the laptop 502, the action is performed and the user's audio input to the videoconference is muted 512.

Figure 6:
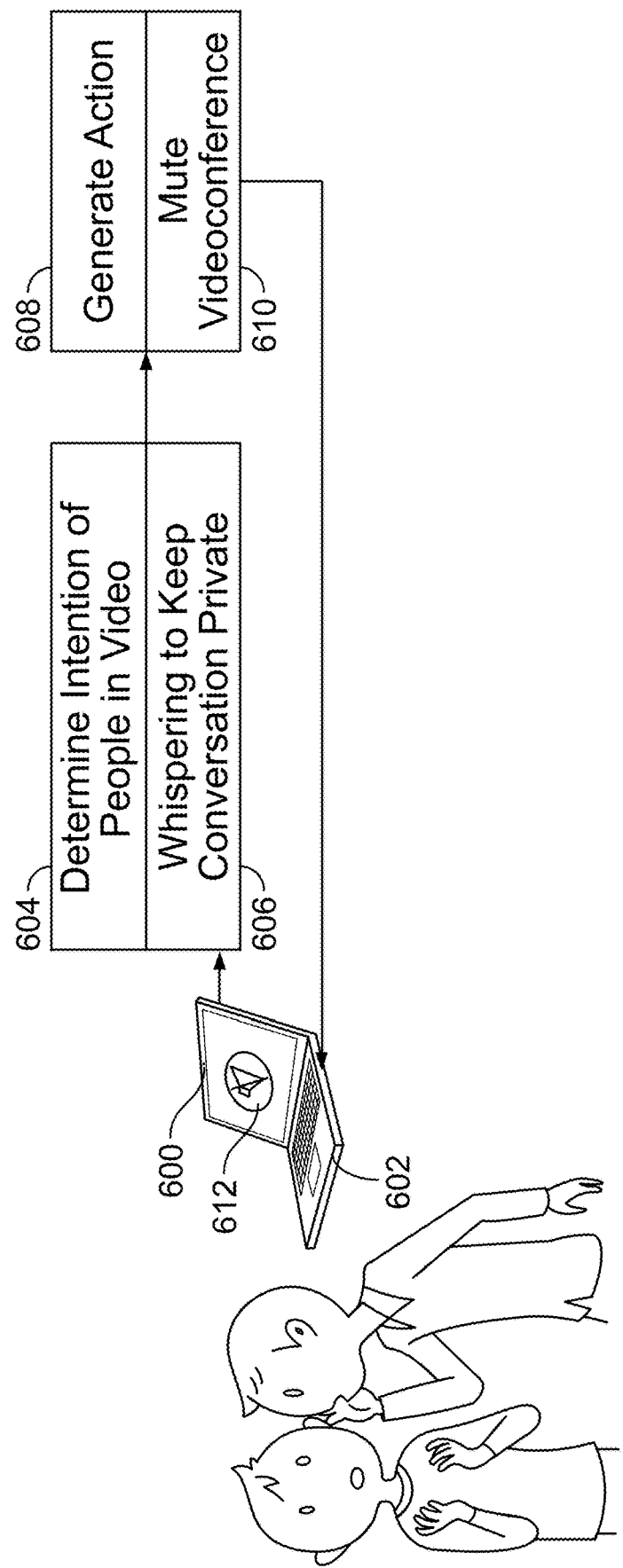
FIG. 6 shows another exemplary environment in which a video is received at a computing device and an action based on the video content is automatically performed, in accordance with some embodiments of the disclosure.

FIG. 6 shows another exemplary environment in which a video is received at a computing device and an action based on the video content is automatically performed, in accordance with some embodiments of the disclosure. Video and audio are received via a webcam 600 at a laptop 602 as part of users participating in a videoconference. In this example, there are two users in the same room, in front of the same webcam 600. The webcam 600 captures one user's action of whispering to the other user. In this example, the intention of the users in the video is determined 604, based on an intention modelling database. The intention of the one user who is whispering to the other user is determined as wanting to keep the conversation private 606. An action to be performed is generated 608. In this example, it is to mute the videoconference 610 (i.e. mute the laptop's microphone), so that the conversation remains private. At the laptop 602, the action is performed and the user's audio input to the videoconference is muted 612.

Figure 7:
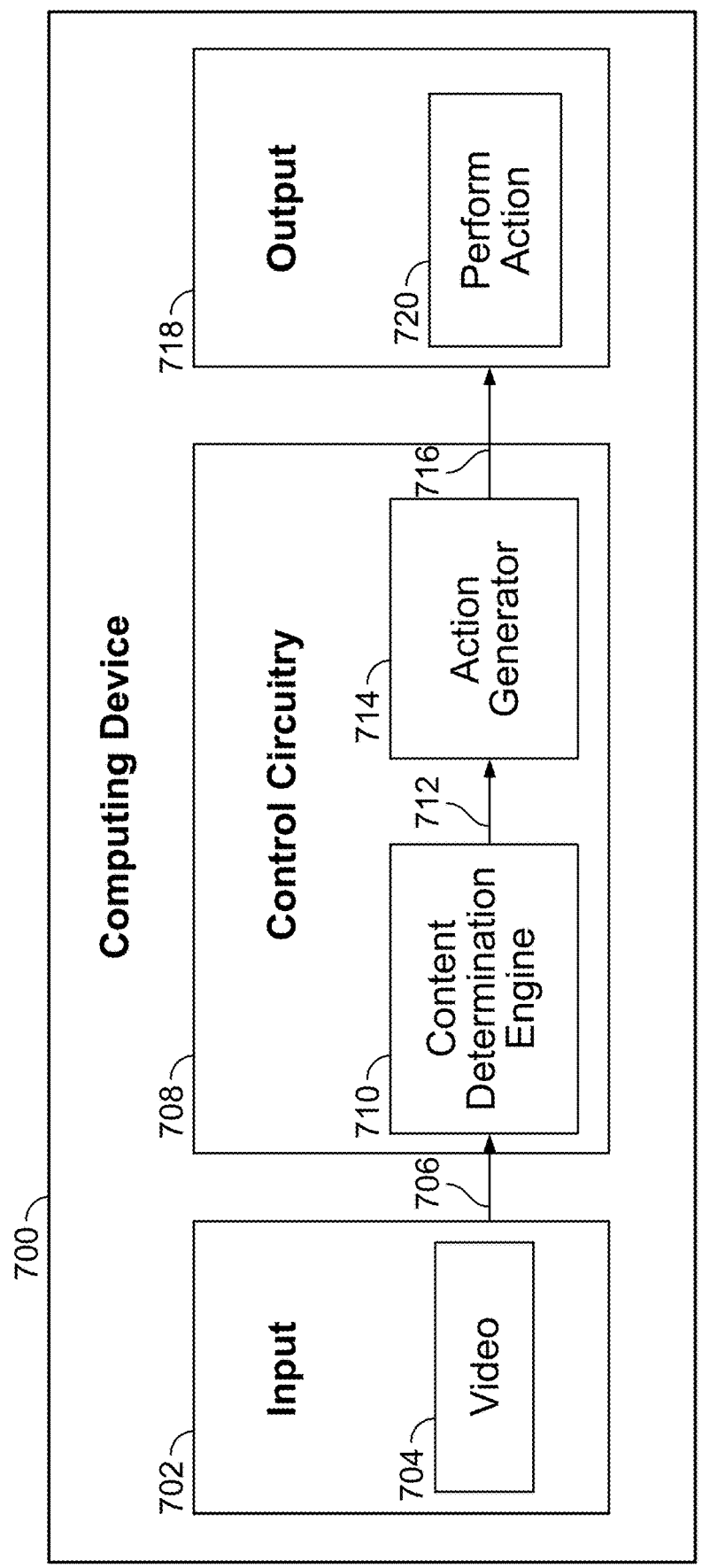
FIG. 7 is a block diagram representing components of a computing device and data flow therebetween for receiving a video and for automatically performing an action based on the video content, in accordance with some embodiments of the disclosure.

FIG. 7 is a block diagram representing components of a computing device and data flow therebetween for receiving a request to display an indicator menu and for displaying an indicator menu, in accordance with some embodiments of the disclosure. Computing device 700 (e.g., a device 102, 202, 302, 402, 502, 602 as discussed in connection with FIGS. 1-6) comprises input circuitry 702, control circuitry 708 and an output module 718. Control circuitry 708 may be based on any suitable processing circuitry and comprises control circuits and memory circuits, which may be disposed on a single integrated circuit or may be discrete components. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). Some control circuits may be implemented in hardware, firmware, or software.

A user provides an input 704 that is received by the input circuitry 702. The input circuitry 702 is configured to receive video input as, for example, a video stream and/or a recorded video. The input may be from a second computing device, via a network, for a streamed video. For a recorded video, the input may be from a storage device. Transmission of the input 704 from the input device to the input circuitry 702 may be accomplished using wired means, such as a USB cable, or wireless means, such as Wi-Fi. The input circuitry 702 determines whether the input is a video and, if it is a video, transmits the video to the control circuitry 708.

The control circuitry 708 comprises a content determination engine 710 and an action generator 714. Upon the control circuitry 708 receiving the video, the content determination engine 710 determines the content of video and transmits 712 the content to the action generator 714. The action generator 714 generates an action based on the content of the video and transmits 716 the action to the output module 718. As discussed above, the content determination engine and/or the action generator may be a trained network.

On receiving the action to perform, the output module 718 performs the generated action 720. The action may be performed at the same computing device as that at which the video is received. Alternatively, the action may be performed at a different computing device. If the action is performed at a different computing device, the action may be transmitted to the second computing device via a network.

Figure 8:
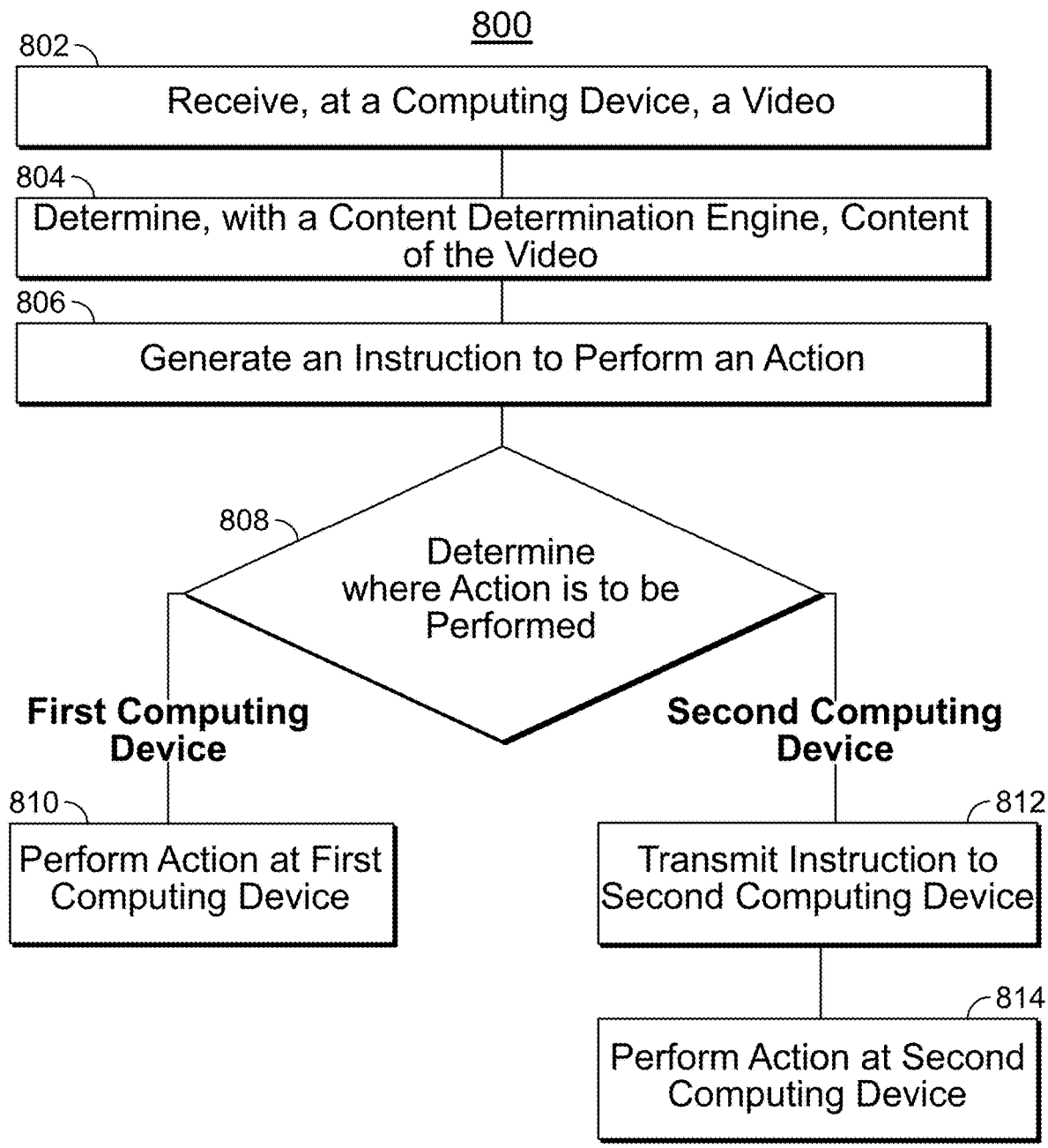
FIG. 8 is a flowchart representing a process for receiving a video and for automatically performing an action based on the video content, in accordance with some embodiments of the disclosure.

FIG. 8 is a flowchart representing a process for receiving a video and for automatically performing an action based on the video content, in accordance with some embodiments of the disclosure. Process 800 may be implemented on any aforementioned computing device 102, 202, 302, 402, 502, 602. In addition, one or more actions of process 800 may be incorporated into or combined with one or more actions of any other process or embodiment described herein.

At 802*a* computing device 102, 202, 302, 402, 502, 602 receives a video. This may be a video from a memory of the computing device. The video may be a video stream from another computing device.

At 804, the content of the video is determined with a content determination engine. The content determination engine may be a trained network. At 806, an instruction to perform an action is generated. Again, the generation of an instruction to perform may be via a trained network.

At 808, it is determined where the generated action is to be performed. If the action is to be performed at the first computing device, at 810 the action is performed at the first computing device. If the action is to be performed at a second computing device, at 812 the action is transmitted to the second computing device, and at 814, the action is performed at the second computing device. Performing the action may also comprise executing instructions at the first computing device.

Figure 9:
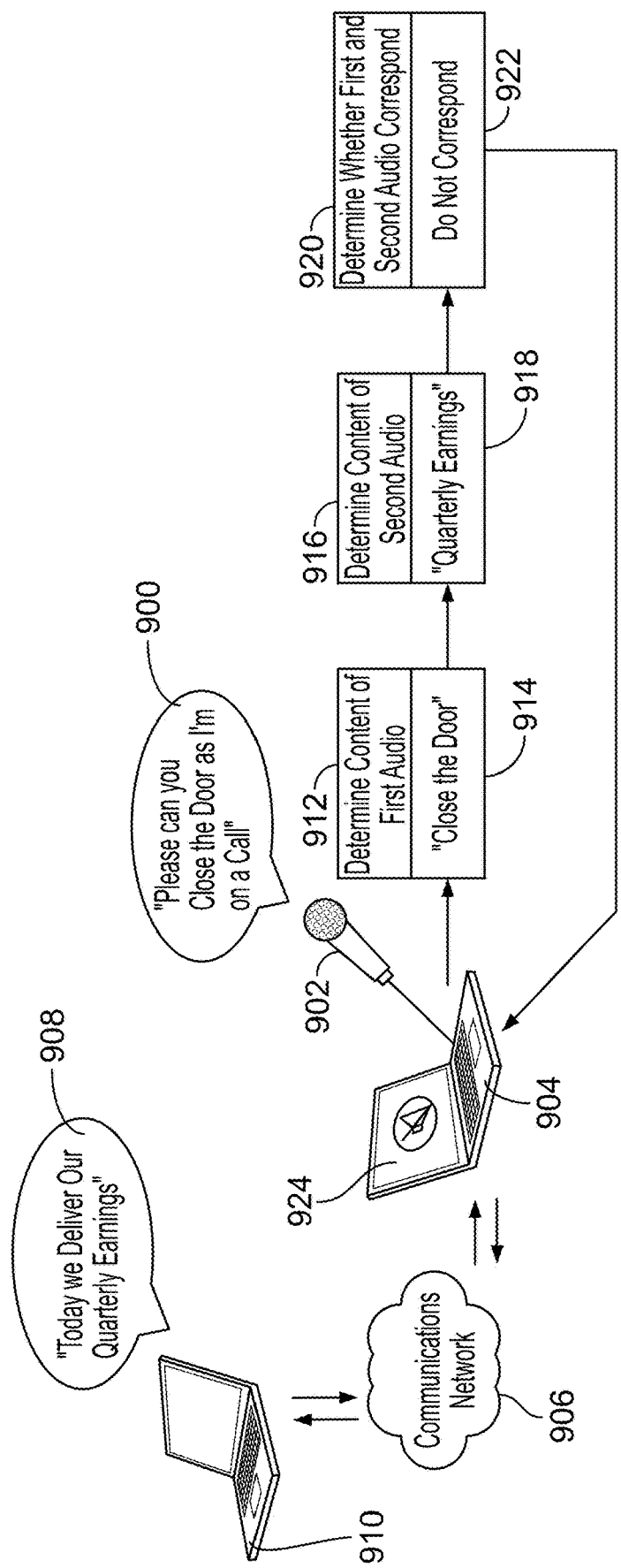
FIG. 9 shows an exemplary environment in which first and second audio inputs are received at a computing device and a mute function is automatically selected based on the audio inputs, in accordance with some embodiments of the disclosure.

FIG. 9 shows an exemplary environment in which first and second audio inputs are received at a computing device and a mute function is automatically selected based on the audio inputs, in accordance with some embodiments of the disclosure. In this example, initially, the mute function 924 of the first laptop 904 is not turned on. A first audio input, "Please can you close the door as I'm on a call," 900 is received via a microphone 902 at a first laptop 904. A second audio input, "Today we deliver our quarterly earnings" 908 is received at a second laptop 910 and is transmitted to the first laptop 904 via a communications network 906. The communications network 906 may be a local network and/or the internet and may include wired and/or wireless components. The content of the first audio 900 is determined 912 with natural language processing. In this example, the content is determined as someone asking for the door to be closed 914. The content of the second audio 908 is determined 916 with natural language processing. In this example, the content is determined as a quarterly earnings meeting 918. Whether or not the audio content of the first audio input and the second audio input correspond is determined 920. In this example, the two audio inputs do not correspond 922.

Determining the content of audio and whether the two audio inputs correspond may include utilizing a trained model. Such a model may be an artificial intelligence model, such as a trained neural network, and may associate a confidence level with the output. In this particular example, the trained model would be implemented at the laptop 904.

A mute function 924 is operated at the first laptop 904. In this example, as the first audio input 900 and the second audio input 908 do not correspond, a user microphone at the first laptop 904 is muted so that their request to close the door does not interrupt the conference.

Figure 10A:
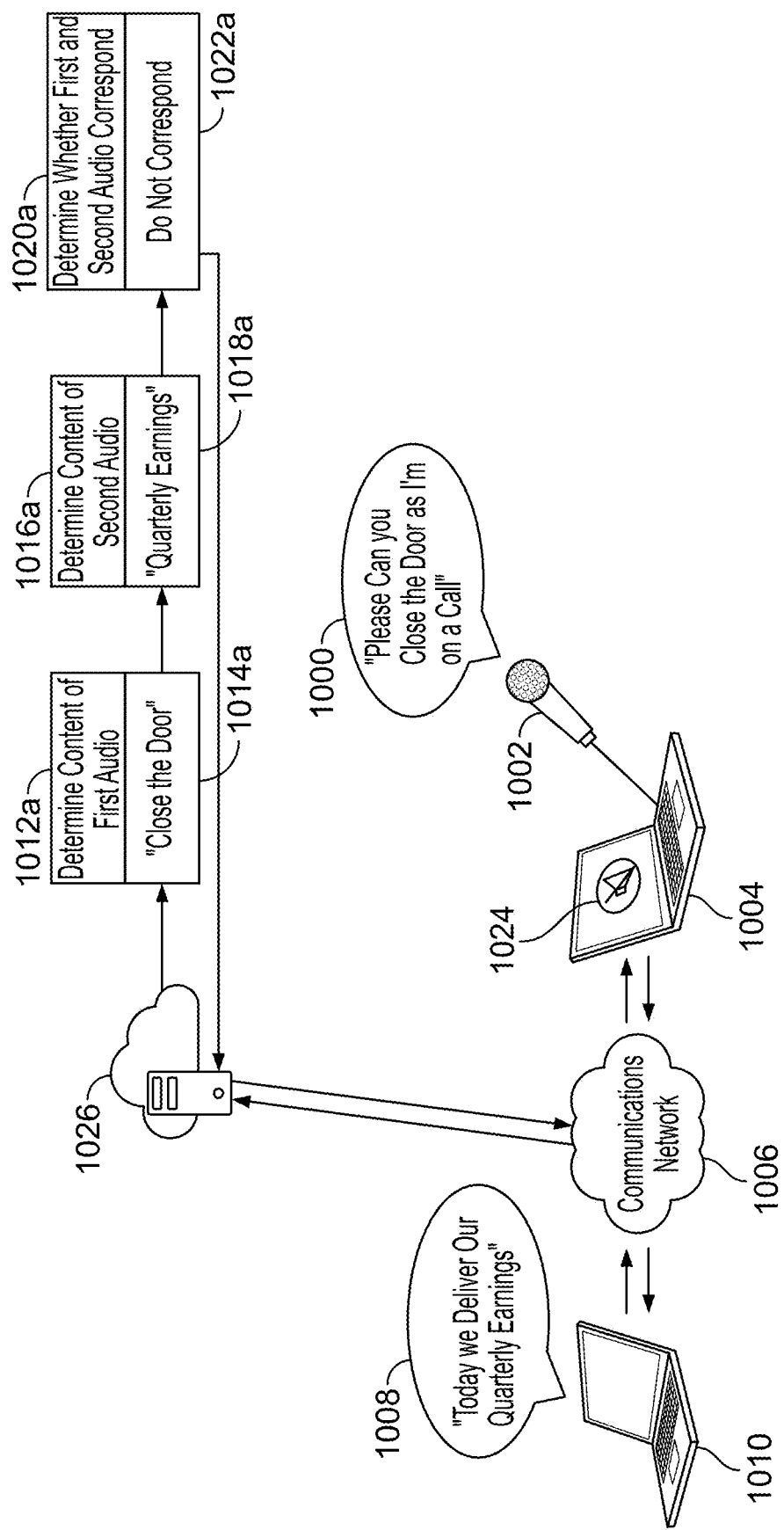
FIGS. 10a-10c show further exemplary environments in which first and second audio inputs are received at a computing device and a mute function is automatically selected based on the audio inputs, in accordance with some embodiments of the disclosure.
Figure 10B:
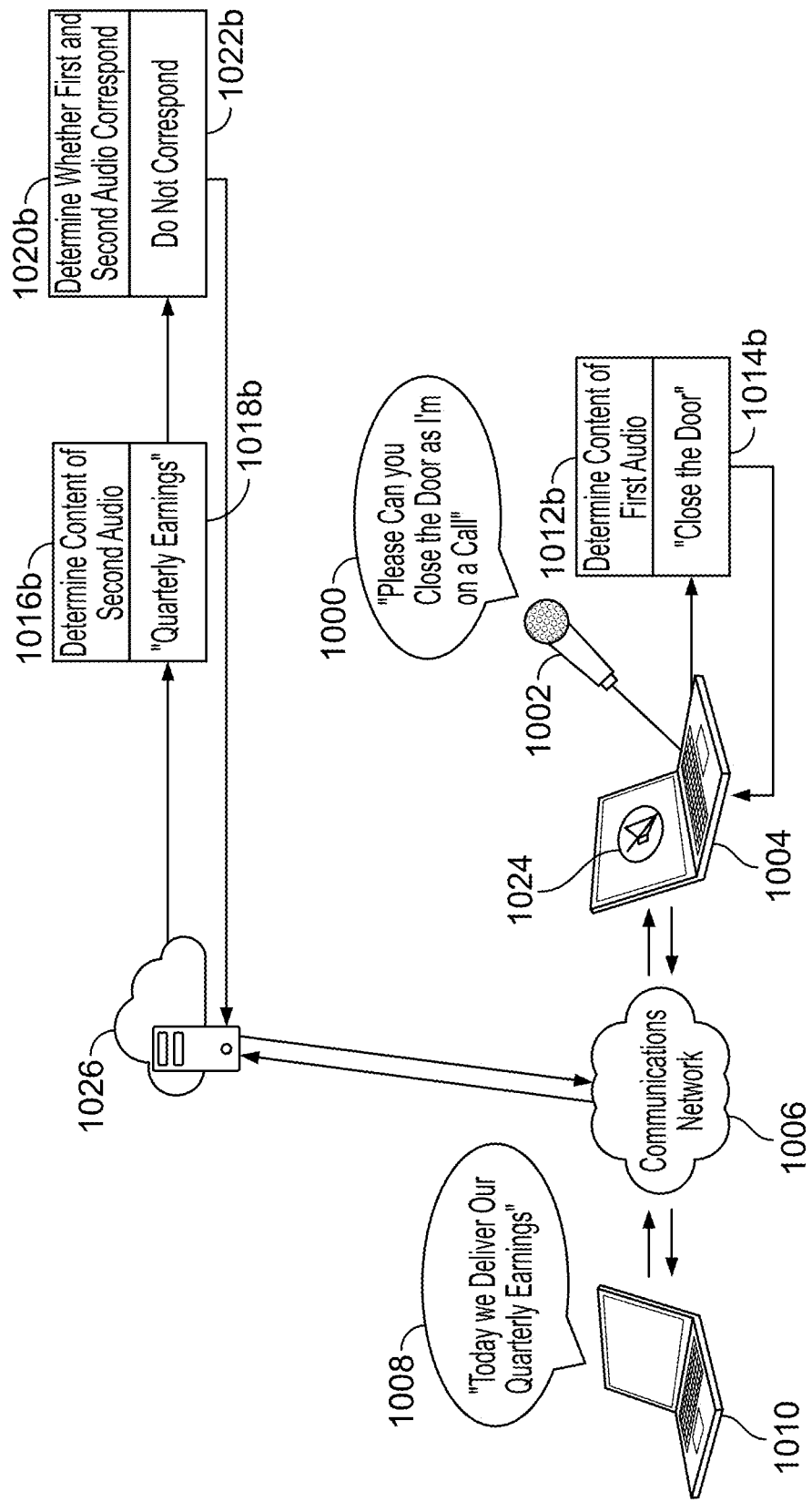

FIGS. 10*a* and 10*b* show exemplary environments in which first and second audio inputs are received at a computing device and a mute function is automatically selected based on the audio inputs, in accordance with some embodiments of the disclosure. In this example, initially, the mute function 1024 of the laptop 1004 is not turned on. Again, a first audio input, "Please can you close the door as I'm on a call," 1000 is received via a microphone 1002 at a first laptop 1004. A second audio input, "Today we deliver our quarterly earnings" 1008 is received at a second laptop 1010 and is transmitted to the first laptop 1004 via a communications network 1006. The communications network 1006 may be a local network and/or the internet and may include wired and/or wireless components.

In FIG. 10*a*, the first audio input 1000 and the second audio input 1008 are transmitted via the communications network 1006 to a server 1026. At the server 1026, the content of the first audio input 1000 is determined 1012*a* with natural language processing. In this example, the content is determined as someone asking for the door to be closed 1014*a*. The content of the second audio 1008 is determined 1016*a* with natural language processing. In this example, the content is determined as a quarterly earnings meeting 1018*a*. Whether or not the audio content of the first audio input and the second audio input correspond is determined 1020*a*. In this example, the two audio inputs do not correspond 1022*a*. Whether or not the audio content of the first audio input and the second audio input correspond is transmitted from the server 1026, via the communications network 1006, to the first laptop 1004. A mute function 1024 is operated at the laptop 1004. In this example, because the first audio input 1000 and the second audio input 1008 do not correspond, a user at the laptop 1004 is muted so that their request to close the door does not interrupt the conference.

In FIG. 10*b*, the content of the first audio input 1000 is determined 1012*b* at the first laptop 1004, and the content of the first audio input 1000 is transmitted, via the communications network 1006, to the server 1026. The second audio 1008 is transmitted from the second laptop 1010, via the communications network 1006, to the server 1026. At the server 1026, the content of the second audio 1008 is determined 1016*b* with natural language processing. In this example, the content is determined as a quarterly earnings meeting 1018*b*. Whether or not the audio content of the first audio input and the second audio input correspond is determined 1020*b*. In this example, the two audio inputs do not correspond 1022*b*. Whether or not the audio content of the first audio input and the second audio input correspond is transmitted from the server 1026, via the communications network 1006, to the first laptop 1004. A mute function 1024 is operated at the laptop 1004. In this example, as the first audio input 1000 and the second audio input 1008 do not correspond, a user at the laptop 1004 is muted so that their request to close the door does not interrupt the conference.

Figure 10C:
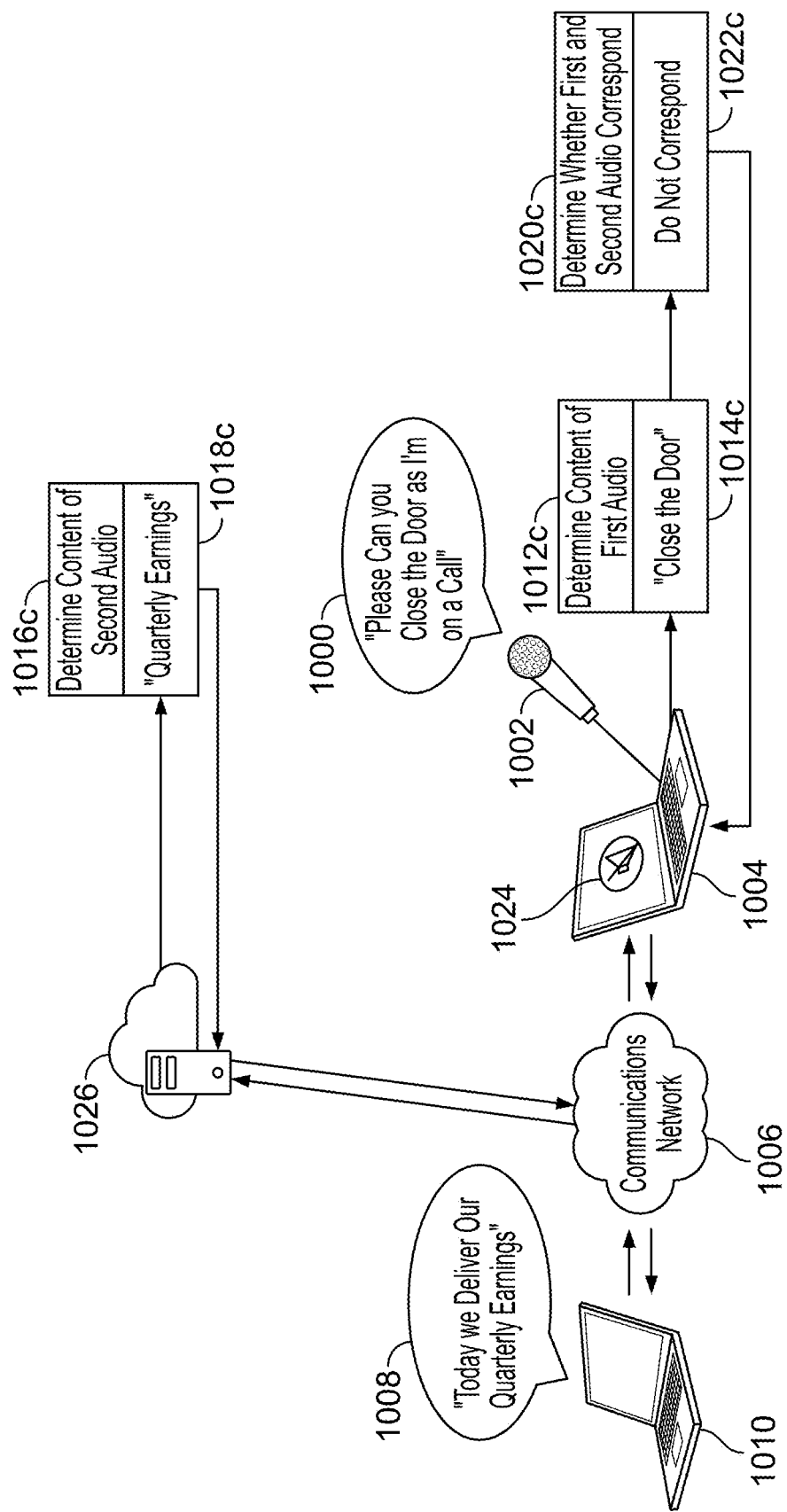

In FIG. 10*c*, the content of the first audio input 1000 is determined 1012*c* at the first laptop 1004. The second audio 1008 is transmitted from the second laptop 1010, via the communications network 1006, to the server 1026. At the server 1026, the content of the second audio 1008 is determined 1016*c* with natural language processing. In this example, the content is determined as a quarterly earnings meeting 1018*c*. The content of the second audio 1008 is transmitted, via the communications network 1006, to the first laptop 1004. Whether or not the audio content of the first audio input and the second audio input correspond is determined 1020*c* at the first laptop 1004. In this example, the two audio inputs do not correspond 1022*c*. A mute function 1024 is operated at the laptop 1004. In this example, as the first audio input 1000 and the second audio input 1008 do not correspond, a user at the laptop 1004 is muted so that their request to close the door does not interrupt the conference.

Again, determining the content of audio and whether the two audio inputs correspond may include utilizing a trained model. Such a model may be an artificial intelligence model, such as a trained neural network, and may associate a confidence level with the output. In this particular example, at least elements of the trained model would be implemented at the server 1026.

Figure 11:
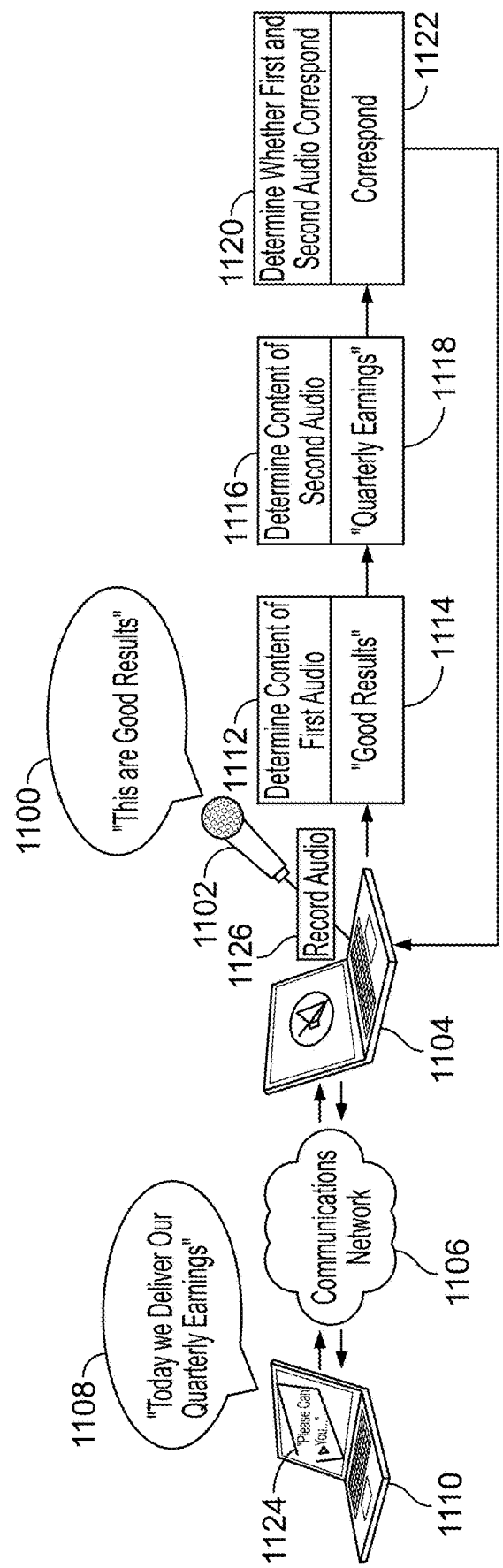
FIG. 11 shows another exemplary environment in which first and second audio inputs are received at a computing device and a mute function is automatically selected based on the audio inputs, in accordance with some embodiments of the disclosure.

FIG. 11 shows another exemplary environment in which first and second audio inputs are received at a computing device and a mute function is automatically selected based on the audio inputs, in accordance with some embodiments of the disclosure. In this example, initially, the mute function of the first laptop 1104 is turned on. A first audio input, "These are good results," 1100 is received via a microphone 1102 at a first laptop 1104. The input is recorded 1126 at the first laptop 1104. In other examples, the first audio input may be transmitted from the first laptop 1104 to a server and may be recorded at the server. A second audio input, "Today we deliver our quarterly earnings" 1108 is received at a second laptop 1110 and is transmitted to the first laptop 1104 via a communications network 1106. The communications network 1106 may be a local network and/or the internet and may include wired and/or wireless components. The content of the first audio input 1100 is determined 1112 with natural language processing. In this example, the content is determined as good results 1114. The content of the second audio 1108 is determined 1116 with natural language processing. In this example, the content is determined as a quarterly earnings meeting 1118. Whether or not the audio content of the first audio input and the second audio input correspond is determined 1120. In this example, the two audio inputs correspond 1122.

Determining the content of audio and whether the two audio inputs correspond may include utilizing a trained model. Such a model may be an artificial intelligence model, such as a trained neural network, and may associate a confidence level with the output. In this particular example, the trained model would be implemented at the laptop 1104.

A mute function is operated at the first laptop 1104. In this example, the first audio input 1100 and the second audio input 1108 correspond; however, the mute function of the first laptop 1104 is turned on. To address this, a part of the recorded audio 1126 from where the user started speaking is transmitted to the second laptop 1110, before the mute function of the first laptop 1104 is turned off. In this way a user at the second laptop 1110 should receive, at least substantially, the whole contribution 1124 of a user at the first laptop 1104. The recording 1126 is essentially used as a buffer to aid with situations where a participant is trying to contribute but has the mute function turned on. A trained network may also be utilized to determine whether it is suitable to play back the recorded portion of audio, for example, if it would interrupt a speaker at the second laptop 1110.

Figure 12:
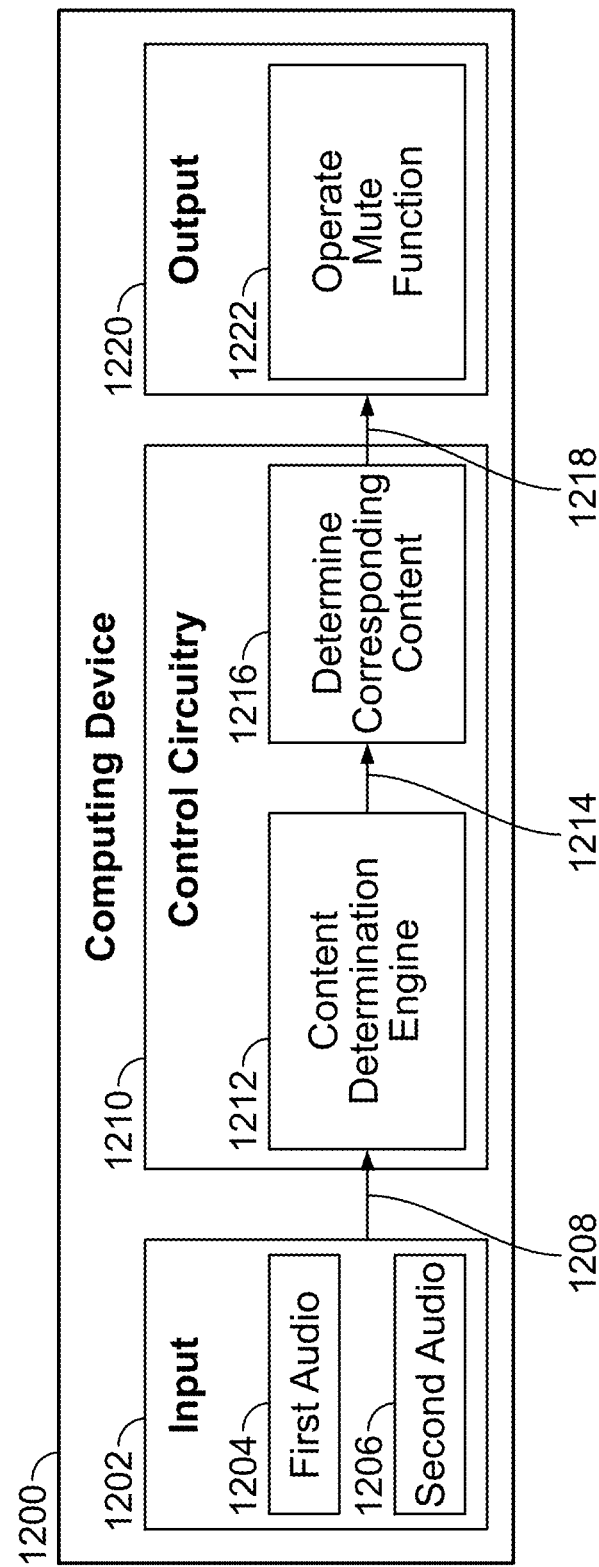
FIG. 12 is a block diagram representing components of a computing device and data flow therebetween for receiving a video and for automatically selecting a mute function based on first and second audio inputs to the computing device, in accordance with some embodiments of the disclosure.

FIG. 12 is a block diagram representing components of a computing device and data flow therebetween for receiving a video and for automatically selecting a mute function based on first and second audio inputs to the computing device, in accordance with some embodiments of the disclosure. Computing device 1200 (e.g., a computing device 904, 1004, 1104 as discussed in connection with FIGS. 9-11) comprises input circuitry 1202, control circuitry 1210 and an output module 1220. Control circuitry 1210 may be based on any suitable processing circuitry and comprises control circuits and memory circuits, which may be disposed on a single integrated circuit or may be discrete components. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). Some control circuits may be implemented in hardware, firmware, or software.

First audio input 1204 and second audio input 1206 are received by the input circuitry 1202. The input circuitry 1202 is configured to receive audio input as, for example, an audio stream. The input may be from a microphone that is integral or is external to the computing device 1200. Input from a second computing device may be via a network for a streamed audio. Transmission of the input 1204, 1206 from the input device to the input circuitry 1202 may be accomplished using wired means, such as a USB cable, or wireless means, such as Wi-Fi. The input circuitry 1202 determines whether the input is audio and, if it is audio, transmits the audio to the control circuitry 1210.

The control circuitry 1210 comprises a content determination engine 1212 and a module to determine whether the content corresponds 1216. Upon the control circuitry 1210 receiving 1208 the audio, the content determination engine 1212 determines the content of the first and second audio and transmits 1214 the content of the first and second audio to the module to determine whether the content corresponds 1216. Whether or not the two correspond is transmitted 1218 to the output module 1220. As discussed above, the content determination engine and/or the action generator may be a trained network.

On receiving the indication whether the two correspond, the output module 1220 operates the mute function 1222.

Figure 13:
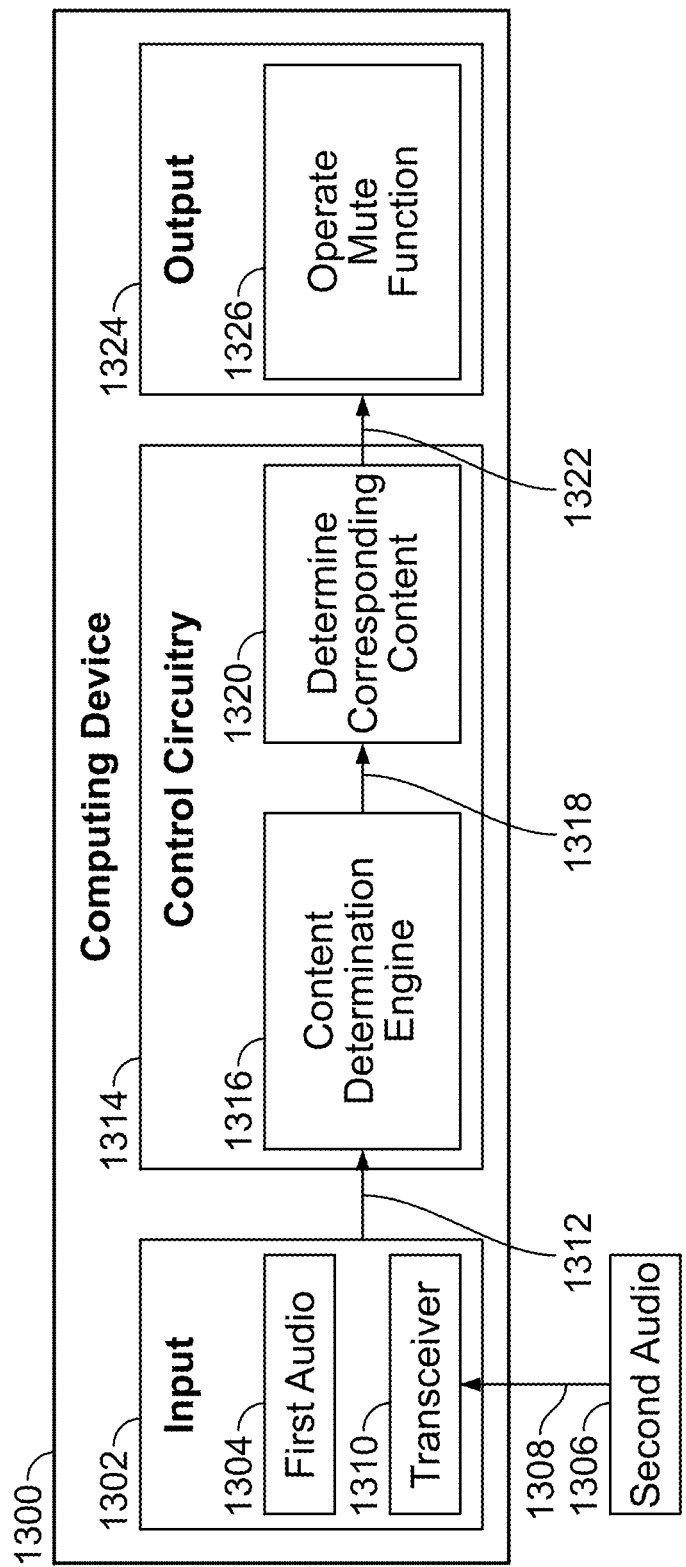
FIG. 13 is another block diagram representing components of a computing device and data flow therebetween for receiving a video and for automatically selecting a mute function based on first and second audio inputs to the computing device, in accordance with some embodiments of the disclosure.

FIG. 13 is another block diagram representing components of a computing device and data flow therebetween for receiving a video and for automatically selecting a mute function based on first and second audio inputs to the computing device, in accordance with some embodiments of the disclosure. Computing device 1300 (e.g., a computing device 904, 1004, 1104 as discussed in connection with FIGS. 9-11) comprises input circuitry 1302, control circuitry 1310 and an output module 1324. Control circuitry 1310 may be based on any suitable processing circuitry and comprises control circuits and memory circuits, which may be disposed on a single integrated circuit or may be discrete components. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). Some control circuits may be implemented in hardware, firmware, or software.

First audio input 1304 is received by the input circuitry 1302. The input circuitry also comprises a transceiver 1310 for receiving 1308 the second audio input 1306, for example from a second computing device via a wireless network. The input circuitry 1302 is configured to receive audio input as, for example, an audio stream. The input may be from a microphone that is integral or is external to the computing device 1300. Transmission of the input 1304, 1306 from the input device to the input circuitry 1302 may be accomplished using wired means, such as a USB cable, or wireless means, such as Wi-Fi. The input circuitry 1302 determines whether the input is audio and, if it is audio, transmits the audio to control circuitry 1314.

The control circuitry 1314 comprises a content determination engine 1316 and a module to determine whether the content corresponds 1320. Upon the control circuitry 1314 receiving 1312 the audio, the content determination engine 1316 determines the content of first and second audio and transmits 1318 the content of the first and second audio to the module to determine whether the content corresponds 1320. Whether or not the two correspond is transmitted 1322 to the output module 1324. As discussed above, the content determination engine and/or the action generator may be a trained network.

On receiving the indication whether the two correspond, the output module 1324 operates the mute function 1326.

Figure 14:
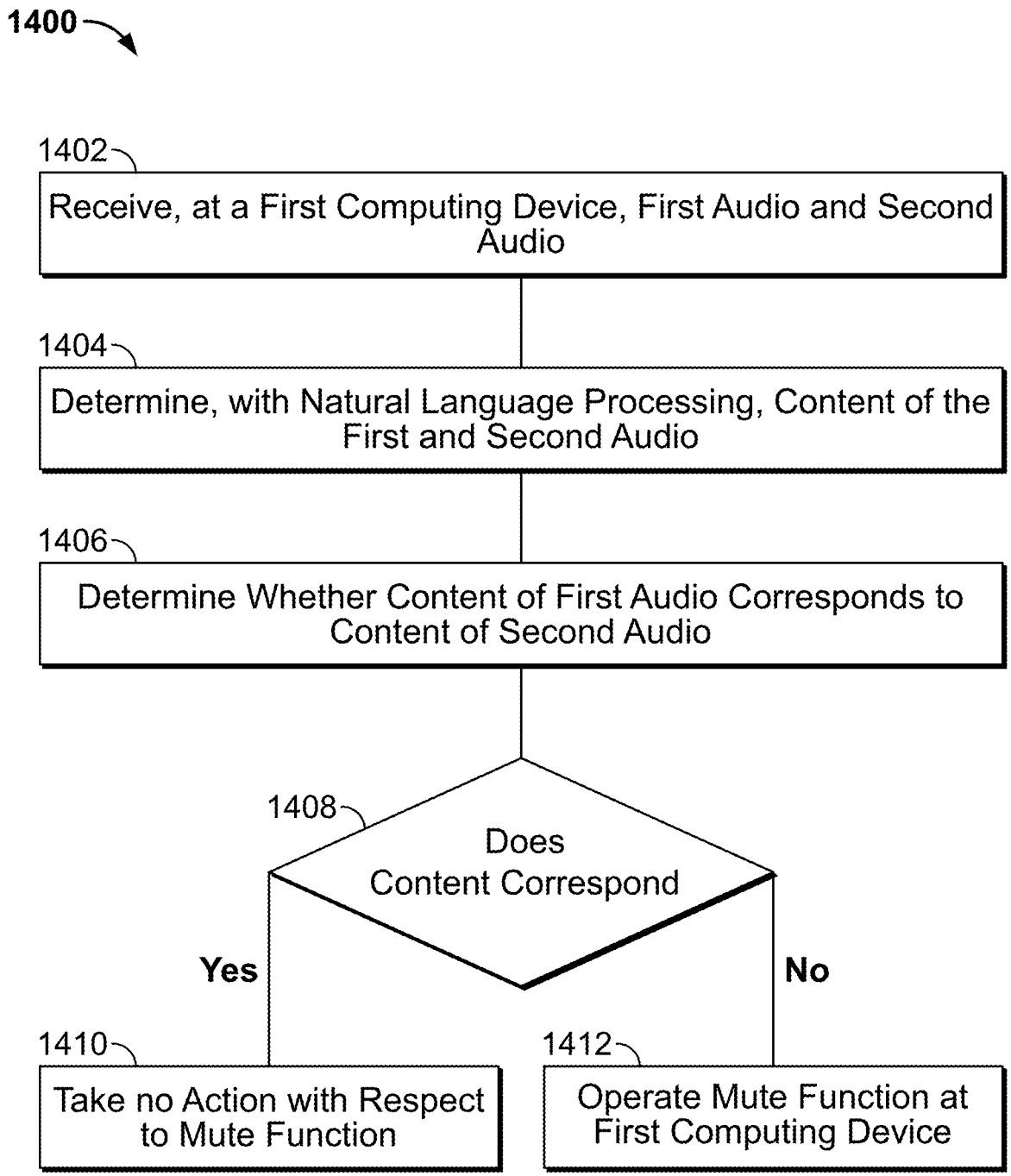
FIG. 14 is a flowchart representing a process for receiving a video and for automatically selecting a mute function based on first and second audio inputs to the computing device, in accordance with some embodiments of the disclosure.

FIG. 14 is a flowchart representing a process for receiving a video and for automatically selecting a mute function based on first and second audio inputs to the computing device, in accordance with some embodiments of the disclosure. Process 1400 may be implemented on any aforementioned computing device 904, 1004, 1104. In addition, one or more actions of process 1400 may be incorporated into or combined with one or more actions of any other process or embodiment described herein.

At 1402, first audio and second audio are received at a first computing device. At 1404, the content of the first and second audio is determined with natural language processing. At 1406, whether the content of the first audio corresponds to the content of the second audio is determined. At 1408, if the content corresponds, no action is taken with respect to the mute function at 1410. At 1408, if the content does not correspond, the mute function is operated at the first computing device at 1412.

Figure 15:
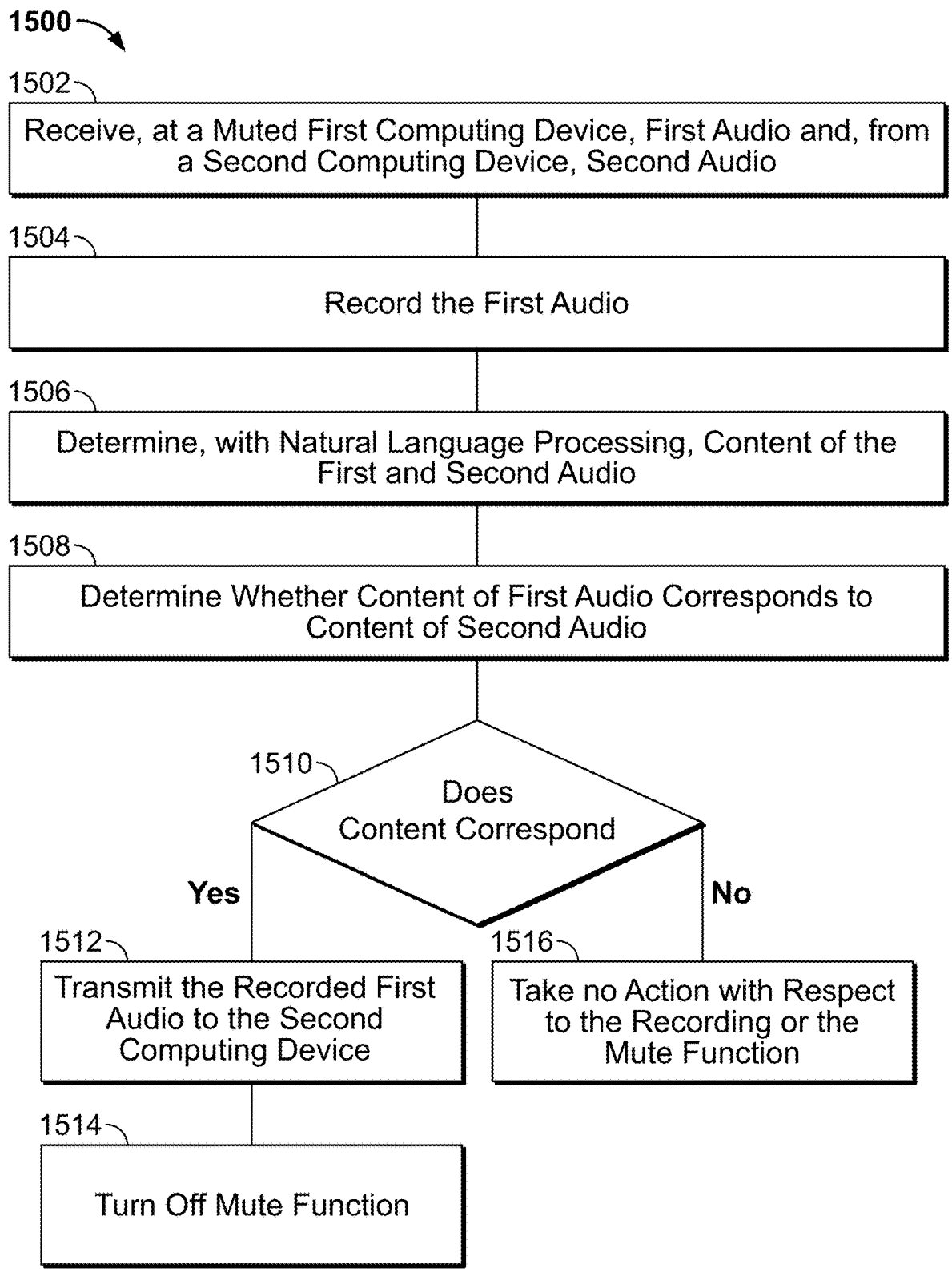
FIG. 15 is another flowchart representing a process for receiving a video and for automatically selecting a mute function based on first and second audio inputs to the computing device, in accordance with some embodiments of the disclosure.

FIG. 15 is a flowchart representing a process for receiving a video and for automatically selecting a mute function based on first and second audio inputs to the computing device, in accordance with some embodiments of the disclosure. Process 1500 may be implemented on any aforementioned computing device 904, 1004, 1104. In addition, one or more actions of process 1500 may be incorporated into or combined with one or more actions of any other process or embodiment described herein.

At 1502, first audio and second audio are received at a muted first computing device. At 1504, the first audio is recorded. The first audio may be recorded at the first computing device, and/or a server. At 1506, the content of the first and second audio is determined with natural language processing. At 1508, whether the content of the first audio corresponds to the content of the second audio is determined. At 1510, if the content corresponds, the recorded first audio is transmitted to the second computing device at 1512 and the mute function is turned off at 1514. At 1516, if the content does not correspond, no action is taken with respect to the recording or the mute function.

Figure 16:
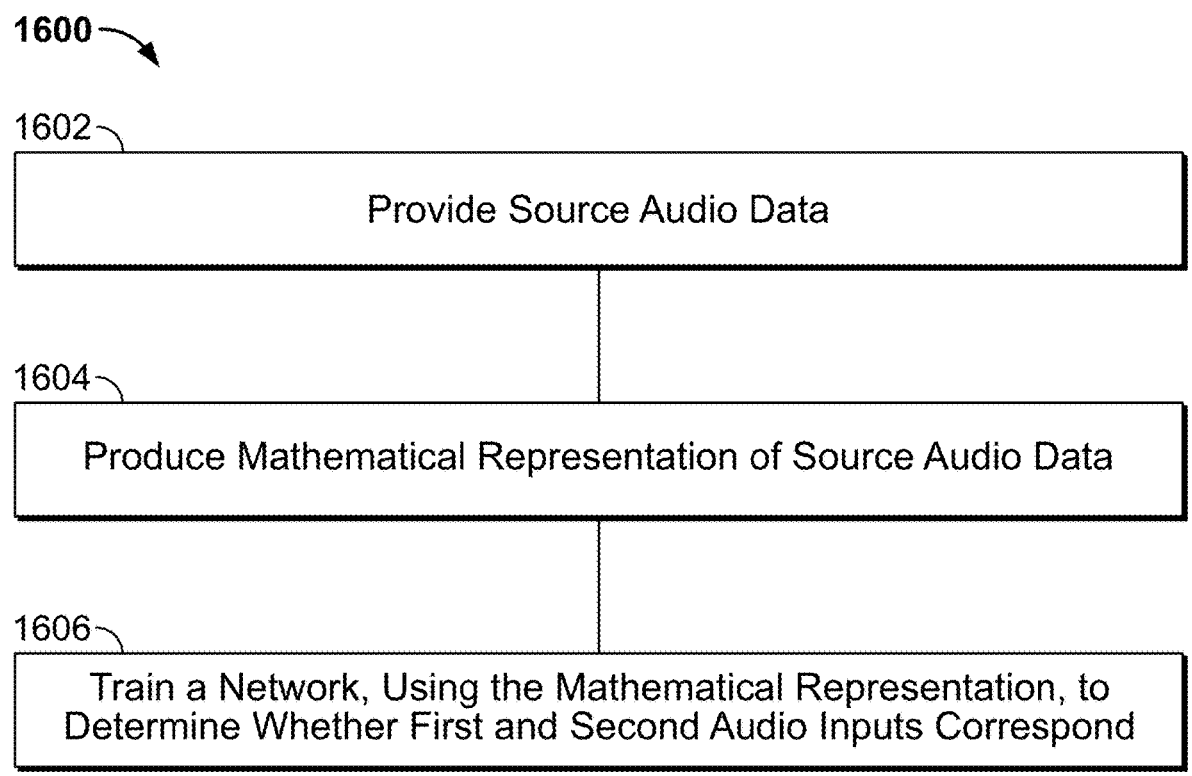
FIG. 16 a flowchart representing a process for training a network to determine whether the content of a first audio input corresponds to the content of a second audio input, in accordance with some embodiments of the disclosure.

FIG. 16 a flowchart representing a process for training a network to determine whether the content of a first audio input corresponds to the content of a second audio input, in accordance with some embodiments of the disclosure. One or more actions of process 1600 may be incorporated into or combined with one or more actions of any other process or embodiment described herein.

The determination as to whether the content of the first audio input and the second audio input correspond may be carried out by a trained network. Such a network may be trained in accordance with the following steps.

At 1602 source audio data is provided. Such data is tagged to indicate the content, so that the network can make a connection between the source audio data and the tag. At 1604, a mathematical representation of the source audio data is produced. For example, this may be a plurality of vectors. At 1606, a network is trained, using the mathematical representations, to determine whether the first and second audio inputs correspond. Such training may utilize datasets of corresponding audio inputs, so that the network can learn what audio inputs correspond.

Figure 17A:
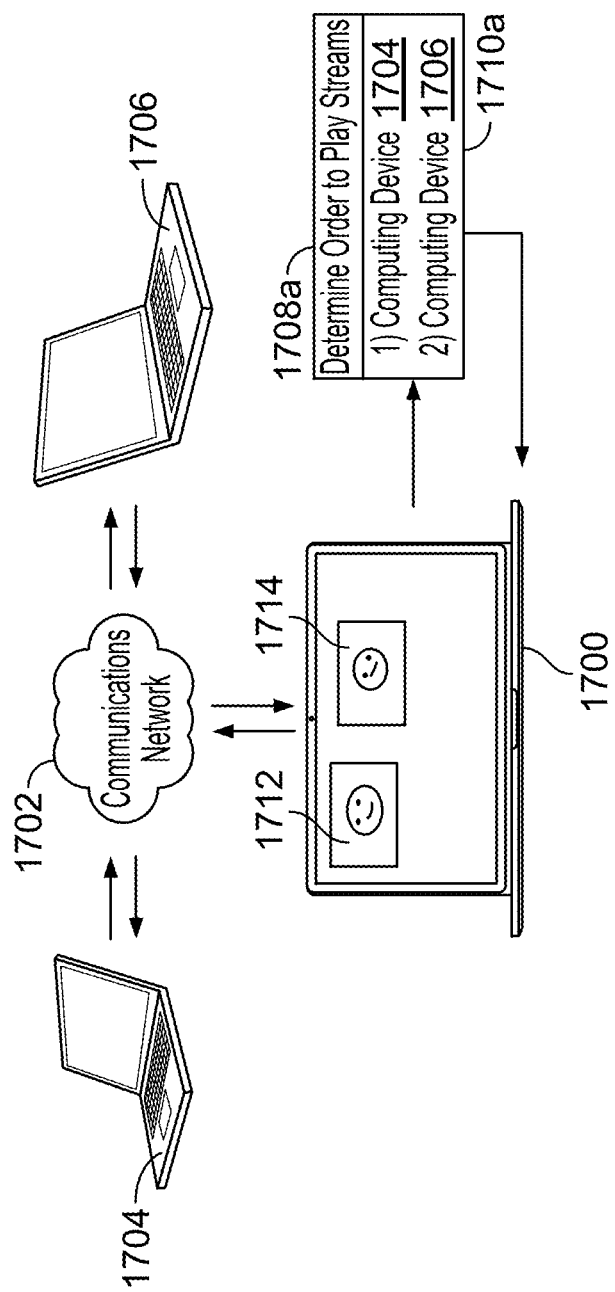
FIG. 17a shows an exemplary environment in which a plurality of video streams are received at a computing device and the video streams are automatically displayed on a display of the computing device in a determined order, in accordance with some embodiments of the disclosure.

FIG. 17a shows an exemplary environment in which a plurality of video streams are received at a computing device and the video streams are automatically displayed on a display of the computing device in a determined order, in accordance with some embodiments of the disclosure. A first computing device 1700 participates in a videoconference via a communications network 1702 with secondary computing devices 1704, 1706. The communications network 1702 may be a local network and/or the internet and may include wired and/or wireless components. The secondary computing devices 1704, 1706 each comprise a video camera for generating a respective video stream 1712, 1714 of a user participating in the videoconference. These video streams 1712, 1714 are transmitted from the secondary computing devices 1704, 1706, via the communications network 1702, and are displayed on a display of the first computing device 1700. The order in which to display the video streams 1712, 1714 from the secondary computing devices 1704, 1706 is determined 1708a. In this example, it is determined that the stream 1712 from secondary computing device 1704 is displayed first and the stream 1714 from the secondary computing device 1706 is displayed second 1710a, based on the order in which the secondary computing devices 1704, 1706 connected to the first computing device 1700.

The video streams may further comprise audio, and the order in which to display the video streams may comprise utilizing natural language processing in order to determine the context of the audio. Additionally and/or alternatively, a participant recognition model may be utilized to determine the participants of the videoconference, and the video streams may be displayed according to preset rules. Participants may be identified by, for example, facial recognition and/or by a displayed name of a participant. Determining the context of the audio may include utilizing a trained model. Such a model may be an artificial intelligence model, such as a trained neural network, and may associate a confidence level with the output. In this particular example, the trained model would be implemented at the first laptop 1700; however, the audio may be transmitted to a server, and the model may be implemented on the server, with the video order being transmitted to the first laptop 1700.

Figure 17B:
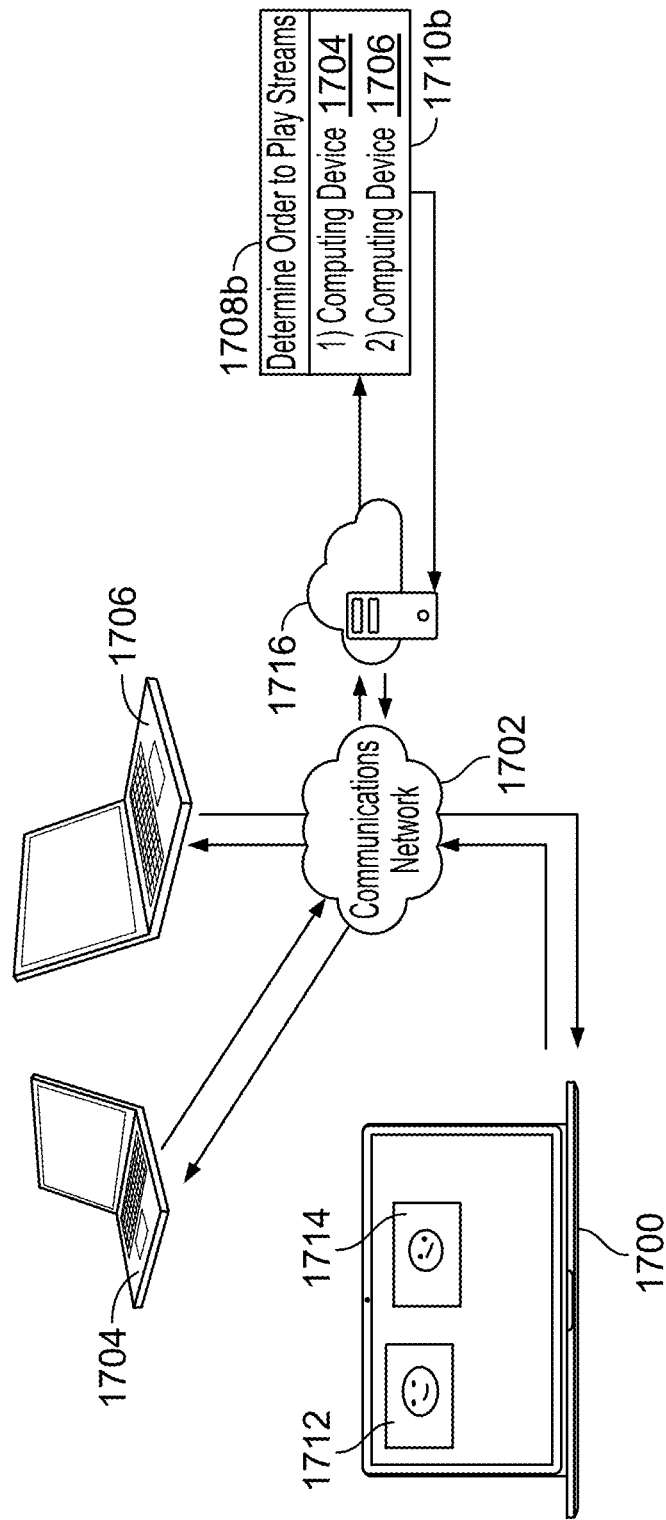
FIG. 17b shows another exemplary environment in which a plurality of video streams are received at a computing device and the video streams are automatically displayed on a display of the computing device in a determined order, in accordance with some embodiments of the disclosure.

FIG. 17*b* shows another exemplary environment in which a plurality of video streams are received at a computing device and the video streams are automatically displayed on a display of the computing device in a determined order, in accordance with some embodiments of the disclosure. A first computing device 1700 participates in a videoconference via a communications network 1702 and a server 1716 with secondary computing devices 1704, 1706. The communications network 1702 may be a local network and/or the internet and may include wired and/or wireless components. The server 1716 may coordinate the videoconference participants and/or push videoconference settings out to videoconference participants. The secondary computing devices 1704, 1706 each comprise a video camera for generating a respective video stream 1712, 1714 of a user participating in the videoconference. These video streams 1712, 1714 are transmitted from the secondary computing devices 1704, 1706, via the communications network 1702 and the server 1716 and are displayed on a display of the first computing device 1700. The order in which to display the video streams 1712, 1714 from the secondary computing devices 1704, 1706 is determined 1708*b* at the server 1716. In this example, it is determined that the stream 1712 from secondary computing device 1704 is displayed first and the stream 1714 from the secondary computing device 1706 is displayed second 1710*b*, based on the order in which the secondary computing devices 1704, 1706 connected to the first computing device 1700. The server transmits the determined order to the laptop 1700, and the video streams are displayed in the determined order on a display of the laptop 1700. Although not shown, the server can also determine the order of the video streams for the secondary participants 1704, 1706 and transmit the order to the secondary participants. The order may be different for different participants, depending on, for example, whether they are a host or a co-host.

Figure 17C:
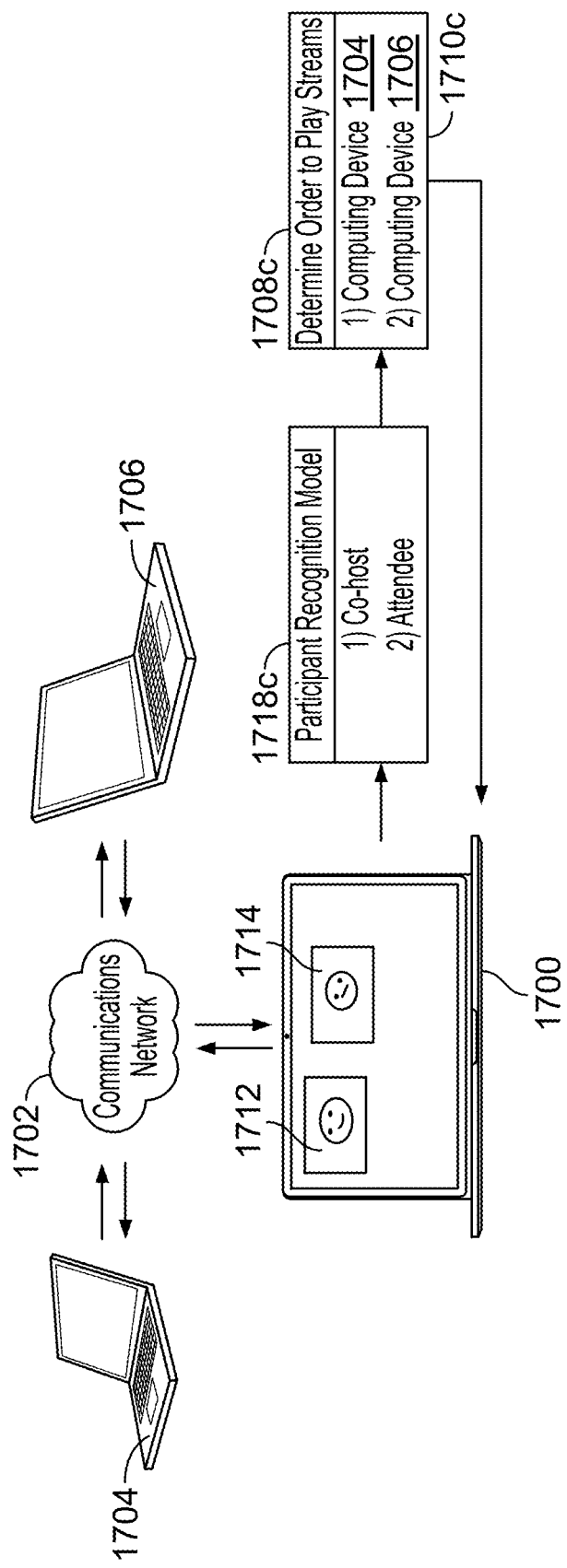
FIG. 17c shows another exemplary environment in which a plurality of video streams are received at a computing device and the video streams are automatically displayed on a display of the computing device in a determined order, in accordance with some embodiments of the disclosure.

FIG. 17*c* shows another exemplary environment in which a plurality of video streams are received at a computing device and the video streams are automatically displayed on a display of the computing device in a determined order, in accordance with some embodiments of the disclosure. A first computing device 1700 participates in a videoconference via a communications network 1702 with secondary computing devices 1704, 1706. The communications network 1702 may be a local network and/or the internet and may include wired and/or wireless components. The secondary computing devices 1704, 1706 each comprise a video camera for generating a respective video stream 1712, 1714 of a user participating in the videoconference. These video streams 1712, 1714 are transmitted from the secondary computing devices 1704, 1706, via the communications network 1702 and are displayed on a display of the first computing device 1700. A participant recognition model 1718*c* determines the videoconference participants. In this example, computing device 1704 is a co-host and computing device 1706 is an attendee. The order in which to display the video streams 1712, 1714 from the secondary computing devices 1704, 1706 is determined 1708*c* based on the output from the participant recognition model. In this example, it is determined that the stream 1712 from secondary computing device 1704 is displayed first and the stream 1714 from the secondary computing device 1706 is displayed second 1710*c*, based on the secondary computing device 1704 being a cohost and the secondary computing device 1706 being an attendee.

Figure 17D:
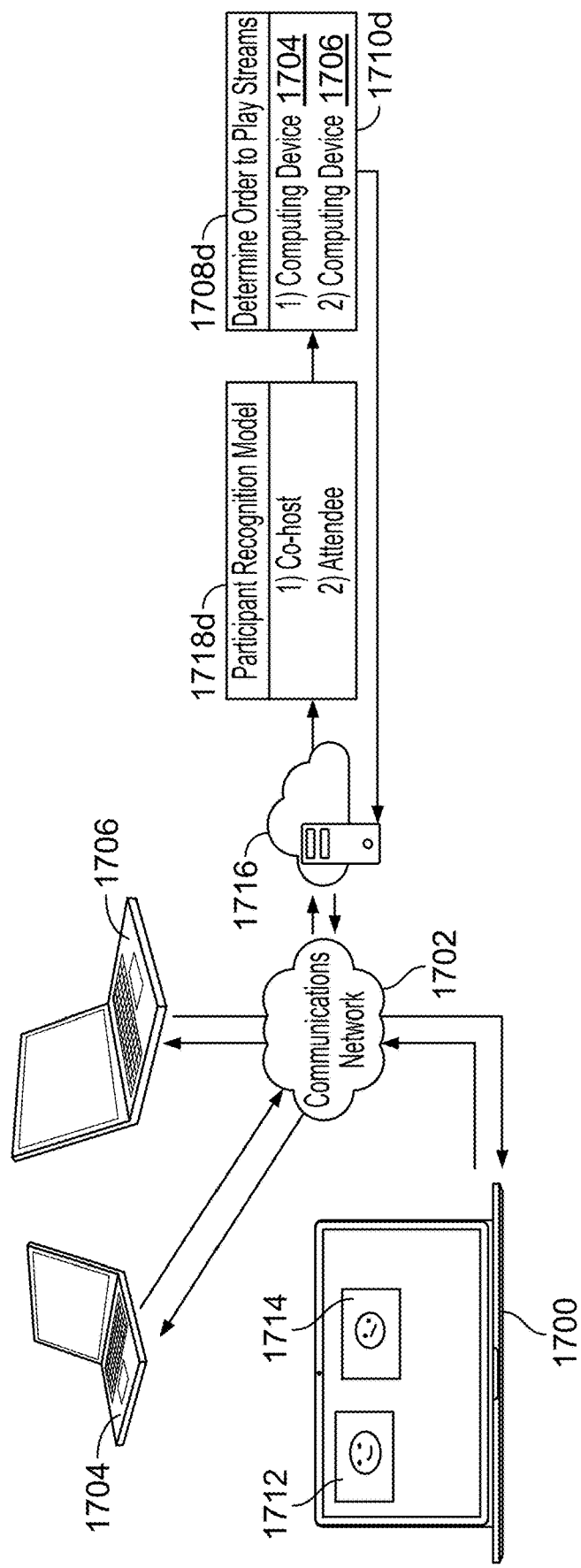
FIG. 17d shows another exemplary environment in which a plurality of video streams are received at a computing device and the video streams are automatically displayed on a display of the computing device in a determined order, in accordance with some embodiments of the disclosure.

FIG. 17*d* shows another exemplary environment in which a plurality of video streams are received at a computing device and the video streams are automatically displayed on a display of the computing device in a determined order, in accordance with some embodiments of the disclosure. A first computing device 1700 participates in a videoconference via a communications network 1702 and a server 1716 with secondary computing devices 1704, 1706. The communications network 1702 may be a local network and/or the internet and may include wired and/or wireless components. The server 1716 may coordinate the videoconference participants and/or push videoconference settings out to videoconference participants. The secondary computing devices 1704, 1706 each comprise a video camera for generating a respective video stream 1712, 1714 of a user participating in the videoconference. These video streams 1712, 1714 are transmitted from the secondary computing devices 1704, 1706, via the communications network 1702 and the server 1716 and are displayed on a display of the first computing device 1700. A participant recognition model 1718*d* at the server 1716 determines the videoconference participants. In this example, computing device 1704 is a co-host and computing device 1706 is an attendee. The order in which to display the video streams 1712, 1714 from the secondary computing devices 1704, 1706 is determined 1708*d* at the server 1716 and is based on the output from the participant recognition model. In this example, it is determined that the stream 1712 from secondary computing device 1704 is displayed first and the stream 1714 from the secondary computing device 1706 is displayed second 1710*d*, based on the secondary computing device 1704 being a cohost and the secondary computing device 1706 being an attendee. The server transmits the determined order to the laptop 1700 and the video streams are displayed in the determined order on a display of the laptop 1700. Although not shown, the server can also determine the order of the video streams for the secondary participants 1704, 1706 and transmit the order to the secondary participants. The order may be different for different participants, depending on, for example, whether they are a host or a co-host.

As discussed above, the participant recognition model may identify participants by, for example, facial recognition, a displayed name of a participant and/or determining the context of the audio of the videoconference. The participant recognition model may include utilizing a trained model. Such a model may be an artificial intelligence model, such as a trained neural network, and may associate a confidence level with the output. The participant recognition model may query a database in order to determine additional information about participants. For example, if the model determines a name of a participant, it may query a database to determine whether they are a host, co-host or attendee.

Figure 17E:
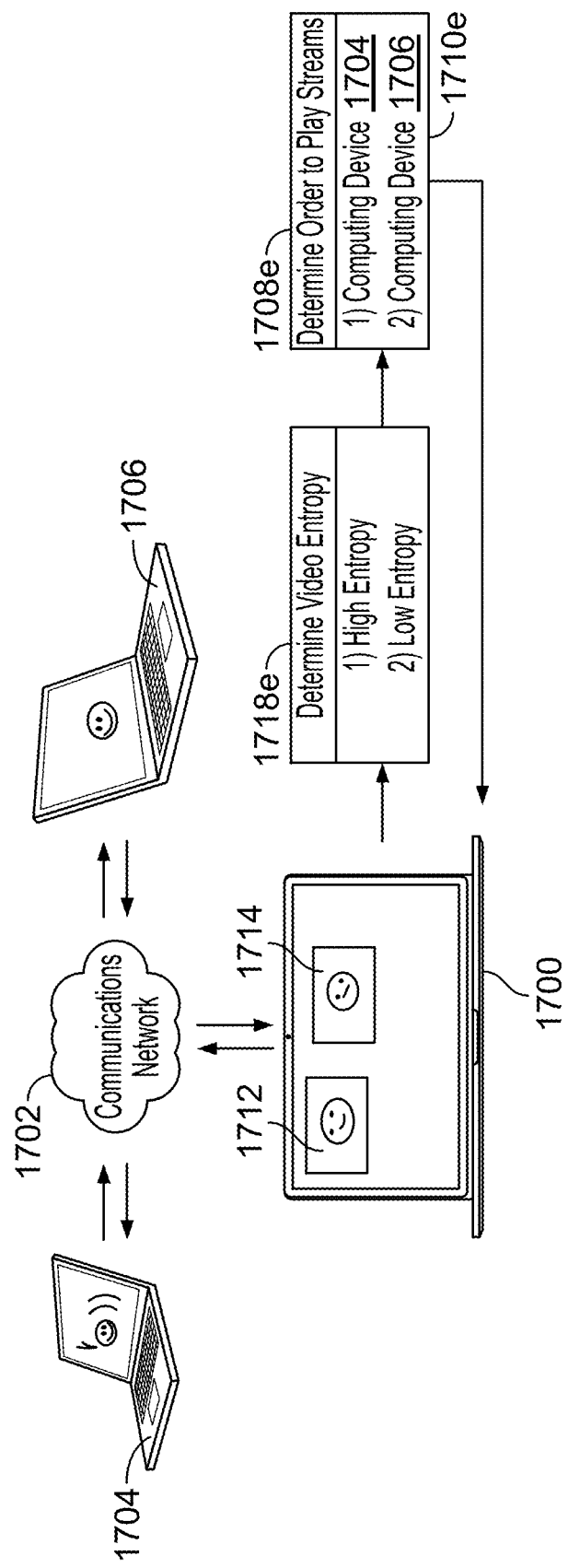
FIG. 17e shows another exemplary environment in which a plurality of video streams are received at a computing device and the video streams are automatically displayed on a display of the computing device in a determined order, in accordance with some embodiments of the disclosure.

FIG. 17*e* shows another exemplary environment in which a plurality of video streams are received at a computing device and the video streams are automatically displayed on a display of the computing device in a determined order, in accordance with some embodiments of the disclosure. A first computing device 1700 participates in a videoconference via a communications network 1702 with secondary computing devices 1704, 1706. The communications network 1702 may be a local network and/or the internet and may include wired and/or wireless components. The secondary computing devices 1704, 1706 each comprise a video camera for generating a respective video stream 1712, 1714 of a user participating in the videoconference. These video streams 1712, 1714 are transmitted from the secondary computing devices 1704, 1706, via the communications network 1702 and are displayed on a display of the first computing device 1700. The entropy of the video streams is determined 1718e. In this example, the video stream from the computing device 1704 has high entropy and the video stream from the computing device 1706 has low entropy. The order in which to display the video streams 1712, 1714 from the secondary computing devices 1704, 1706 is determined 1708e based on the entropy determination. In this example, it is determined that the stream 1712 from secondary computing device 1704 is displayed first and the stream 1714 from the secondary computing device 1706 is displayed second 1710e, based on the video stream from the secondary computing device 1704 having high entropy and the video stream from the secondary computing device 1706 having low entropy.

Figure 17F:
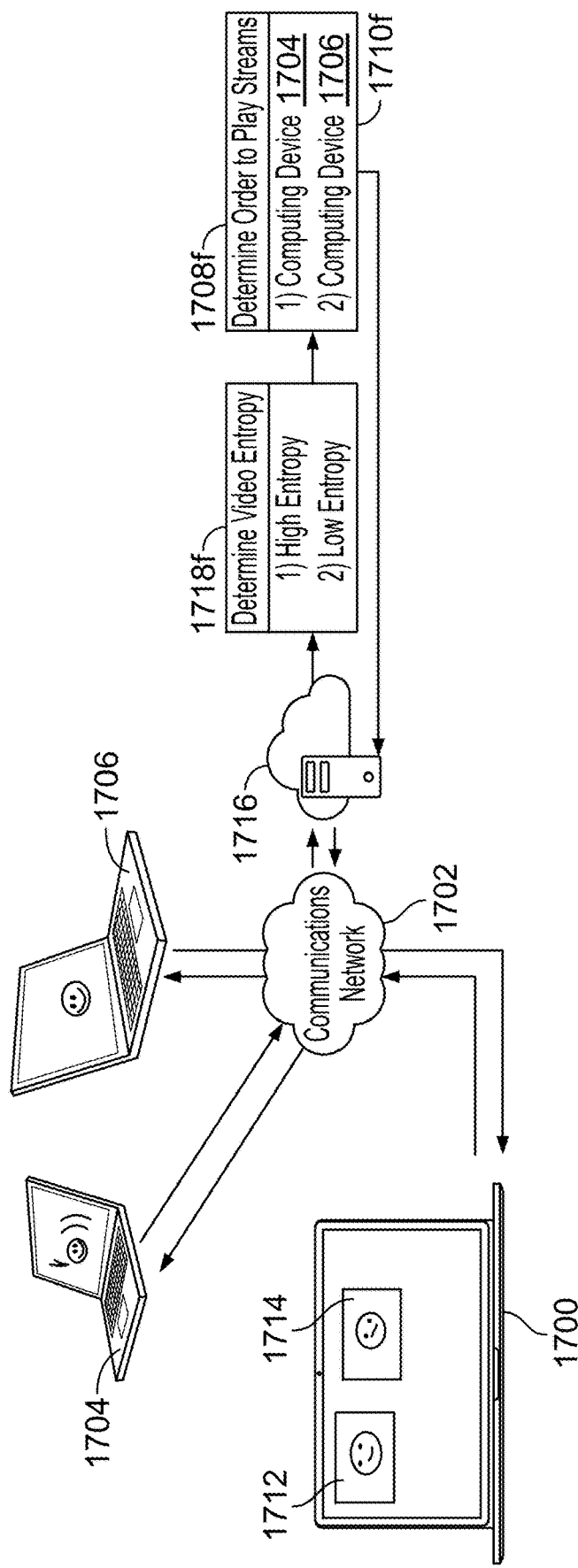
FIG. 17f shows another exemplary environment in which a plurality of video streams are received at a computing device and the video streams are automatically displayed on a display of the computing device in a determined order, in accordance with some embodiments of the disclosure.

FIG. 17f shows another exemplary environment in which a plurality of video streams are received at a computing device and the video streams are automatically displayed on a display of the computing device in a determined order, in accordance with some embodiments of the disclosure. A first computing device 1700 participates in a videoconference via a communications network 1702 and a server 1716 with secondary computing devices 1704, 1706. The communications network 1702 may be a local network and/or the internet and may include wired and/or wireless components. The server 1716 may coordinate the videoconference participants and/or push videoconference settings out to videoconference participants. The secondary computing devices 1704, 1706 each comprise a video camera for generating a respective video stream 1712, 1714 of a user participating in the videoconference. These video streams 1712, 1714 are transmitted from the secondary computing devices 1704, 1706, via the communications network 1702 and the server 1716 and are displayed on a display of the first computing device 1700. The entropy of the video streams is determined 1718f at the server. The order in which to display the video streams 1712, 1714 from the secondary computing devices 1704, 1706 is determined 1708f at the server 1716 and is based on the determined entropy. In this example, it is determined that the stream 1712 from secondary computing device 1704 is displayed first and the stream 1714 from the secondary computing device 1706 is displayed second 1710f, based on the video stream from the secondary computing device 1704 having a high entropy and the video stream from the secondary computing device 1706 having a low entropy. The server transmits the determined order to the laptop 1700, and the video streams are displayed in the determined order on a display of the laptop 1700. Although not shown, the server can also determine the order of the video streams for the secondary participants 1704, 1706 and transmit the order to the secondary participants. The order may be different for different participants, depending on, for example, whether they are a host or a co-host.

As discussed above, the entropy of video streams may be analyzed to determine an order in which to display them. For example, a presenter may be moving around while presenting, whereas a person attending the presentation may be relatively immobile. As such, the video of the presenter will have a higher entropy and may be displayed first. In addition to determining the entropy, the video may be analyzed to determine whether human or non-human movement contributes to the entropy of the video, for example, if a participant is sitting next to a busy road. Entropy contributed by non-human movement may be ignored.

Figure 18:
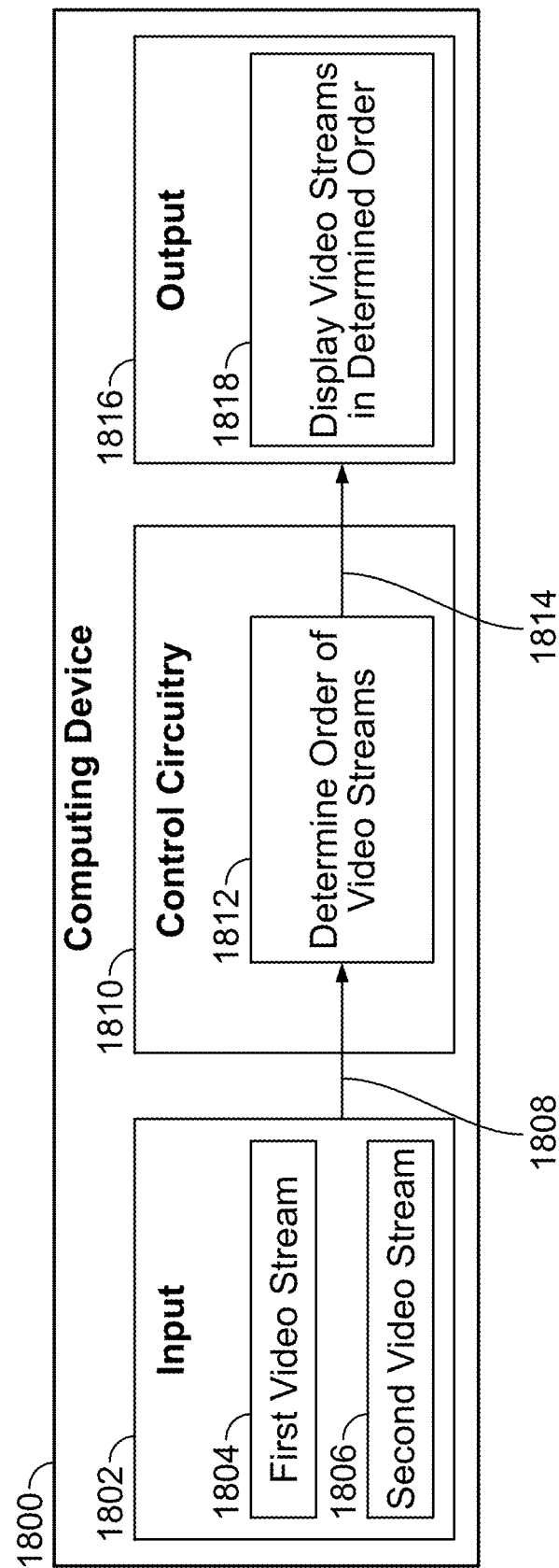
FIG. 18 is a block diagram representing components of a computing device and data flow therebetween for receiving a plurality of video streams and for automatically displaying the video streams on a display of the computing device in a determined order, in accordance with some embodiments of the disclosure.

FIG. 18 is a block diagram representing components of a computing device and data flow therebetween for receiving a plurality of video streams and for automatically displaying the video streams on a display of the computing device in a determined order, in accordance with some embodiments of the disclosure. Computing device 1800 (e.g., a computing device 1700 as discussed in connection with FIG. 17) comprises input circuitry 1802, control circuitry 1810 and an output module 1816. Control circuitry 1810 may be based on any suitable processing circuitry and comprises control circuits and memory circuits, which may be disposed on a single integrated circuit or may be discrete components. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). Some control circuits may be implemented in hardware, firmware, or software.

First video stream 1804 is received by the input circuitry 1802. Second video stream 1806 is also received by the input circuitry 1802. The video streams may be received from secondary computing devices via a network, such as the internet. This may be by using wired means, such as an ethernet cable, or wireless means, such as Wi-Fi. The input circuitry 1802 is configured to receive a video stream. The input circuitry 1802 determines whether the input is a video stream and, if it is a video stream, transmits the video stream to the control circuitry 1810.

The control circuitry 1810 comprises a module to determine 1812 the order of the video streams. Upon the control circuitry 1810 receiving 1808 the video, the module to determine the order of the video streams 1812 determines an order in which to display the video streams.

As discussed above, the module to determine the order of the video streams may be a trained network. The video streams may further comprise audio, and the order in which to display the video streams may comprise utilizing natural language processing in order to determine the context of the audio. Additionally and/or alternatively, a participant recognition model may be utilized to determine the participants of the videoconference, and the video streams may be displayed according to preset rules. Participants may be identified by, for example, facial recognition and/or by a displayed name of a participant. Determining the context of the audio may include utilizing a trained model. Such a model may be an artificial intelligence model, such as a trained neural network, and may associate a confidence level with the output.

On receiving 1814 the order in which to display the video streams, the output module 1816 displays the video streams in the determined order 1818 on a display of the computing device 1800.

Figure 19A:
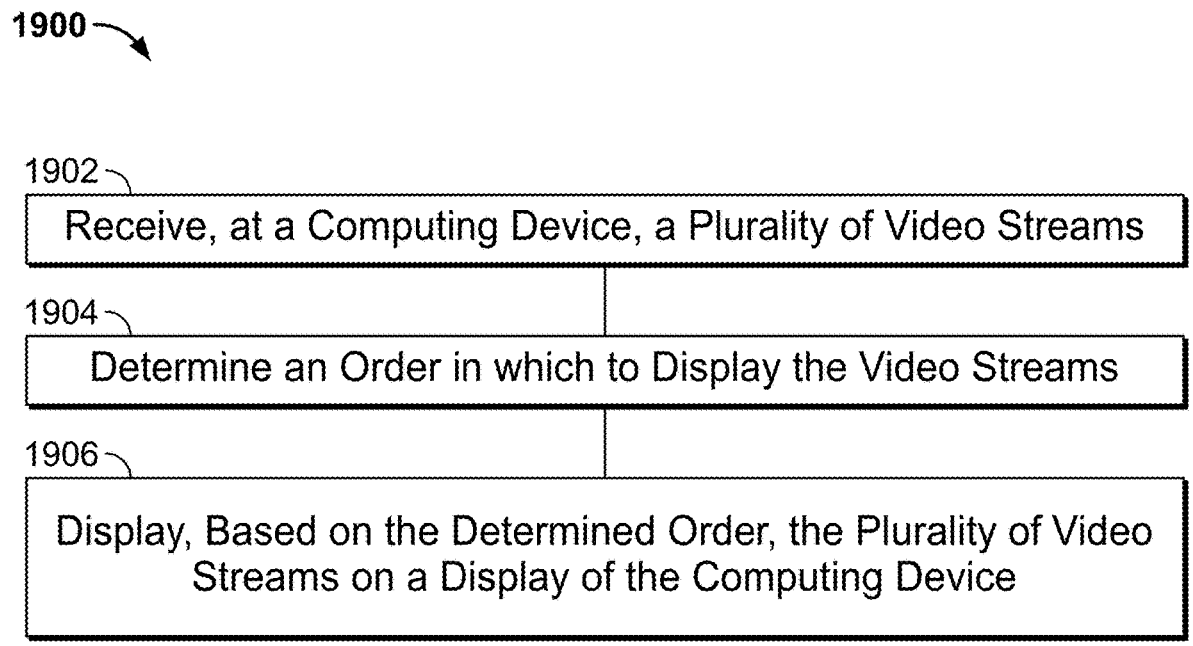
FIG. 19a is a flowchart representing a process for receiving a plurality of video streams and for automatically displaying the video streams on a display of the computing device in a determined order, in accordance with some embodiments of the disclosure.

FIG. 19a is a flowchart representing a process for receiving a plurality of video streams and for automatically displaying the video streams on a display of the computing device in a determined order, in accordance with some embodiments of the disclosure. Process 1900 may be implemented on any aforementioned computing device 1700. In addition, one or more actions of process 1900 may be incorporated into or combined with one or more actions of any other process or embodiment described herein.

At 1902, a plurality of video streams is received at a computing device. At 1904, an order in which to display the video streams is determined. At 1906, the plurality of video streams is displayed, based on the determined order, on a display of the computing device.

Figure 19B:
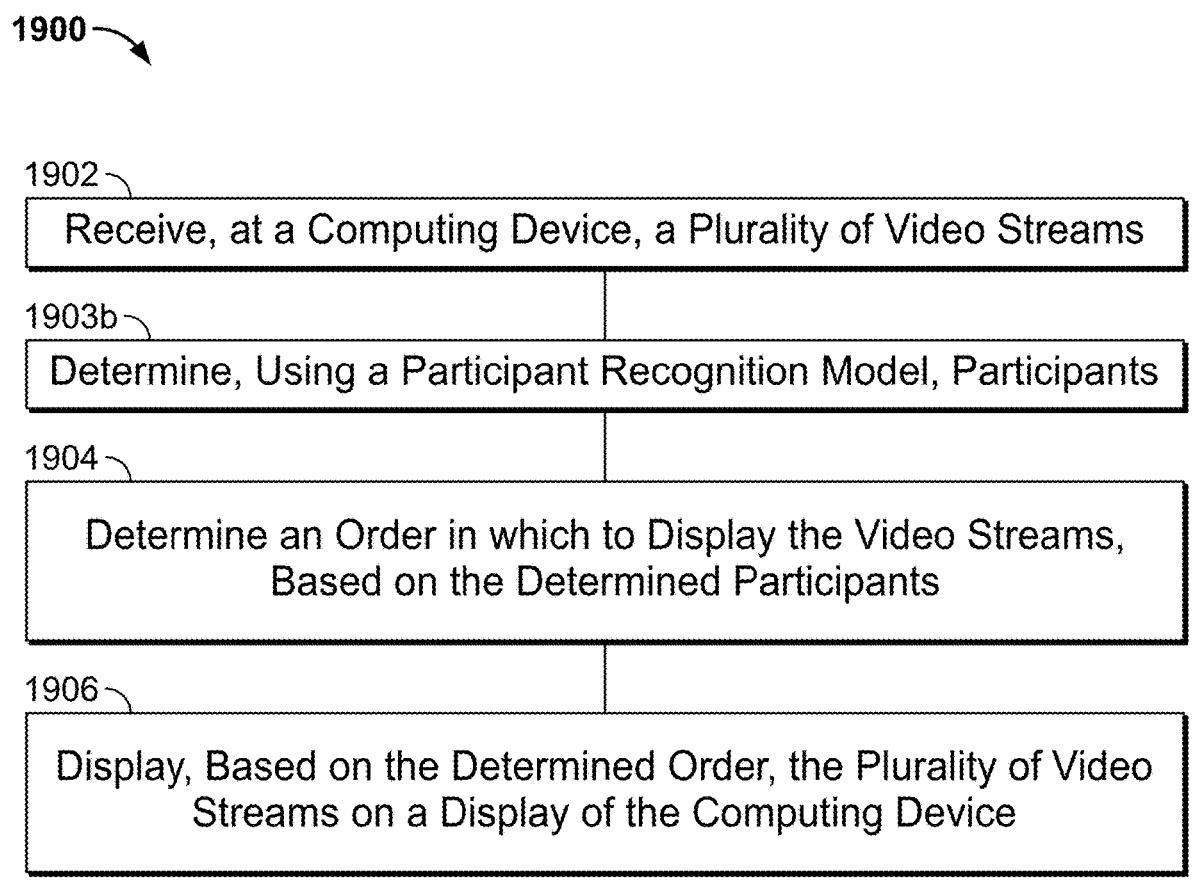
FIG. 19b is another flowchart representing a process for receiving a plurality of video streams and for automatically displaying the video streams on a display of the computing device in a determined order, in accordance with some embodiments of the disclosure.

FIG. 19b is another flowchart representing a process for receiving a plurality of video streams and for automatically displaying the video streams on a display of the computing device in a determined order, in accordance with some embodiments of the disclosure. Process 1900 may be implemented on any aforementioned computing device 1700. In addition, one or more actions of process 1900 may be incorporated into or combined with one or more actions of any other process or embodiment described herein.

At 1902, a plurality of video streams is received at a computing device. At 1903b, participants in the videoconference are determined using a participant recognition model. At 1904, an order in which to display the video streams is determined, based on the participants of the videoconference. At 1906, the plurality of video streams is displayed, based on the determined order, on a display of the computing device.

Figure 19C:
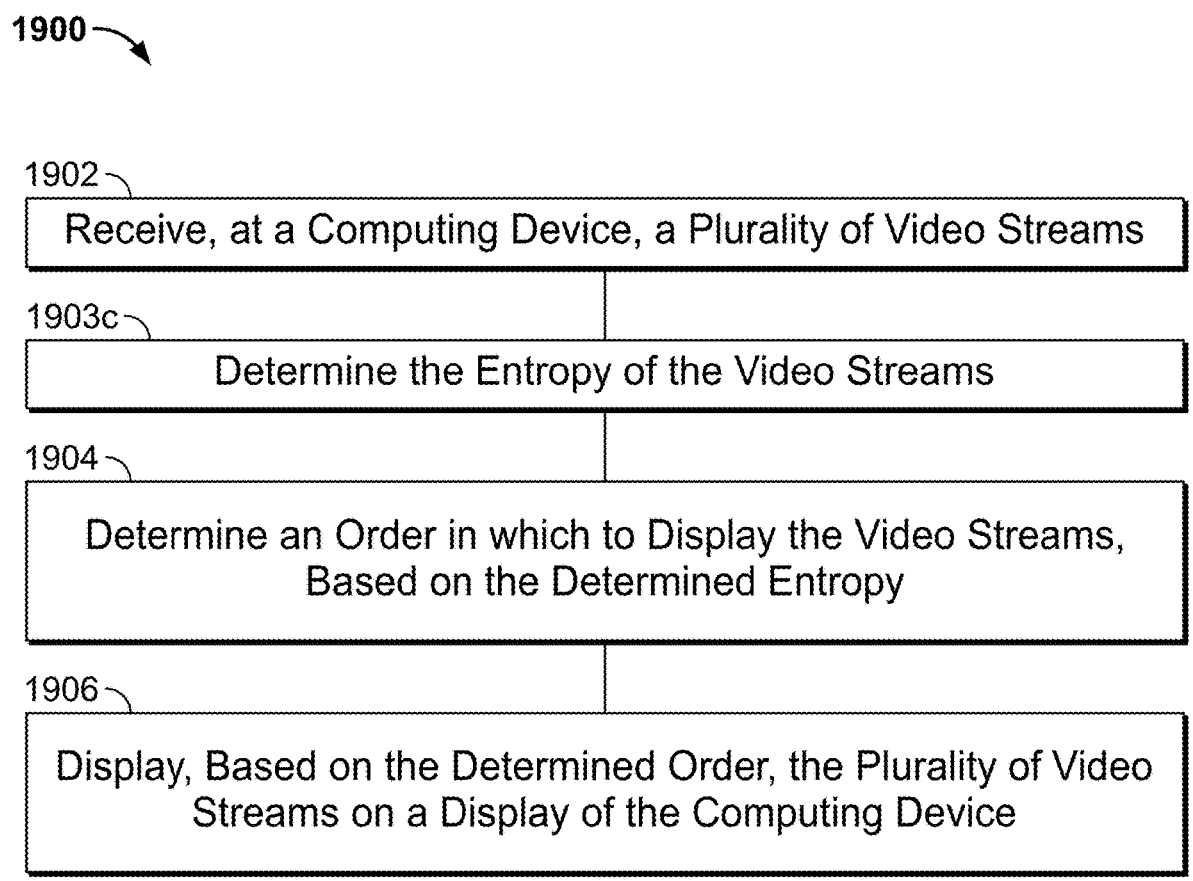
FIG. 19c is another flowchart representing a process for receiving a plurality of video streams and for automatically displaying the video streams on a display of the computing device in a determined order, in accordance with some embodiments of the disclosure.

FIG. 19c is another flowchart representing a process for receiving a plurality of video streams and for automatically displaying the video streams on a display of the computing device in a determined order, in accordance with some embodiments of the disclosure. Process 1900 may be implemented on any aforementioned computing device 1700. In addition, one or more actions of process 1900 may be incorporated into or combined with one or more actions of any other process or embodiment described herein At 1902, a plurality of video streams is received at a computing device. At 1903c, the entropy of the video streams of the videoconference is determined. At 1904, an order in which to display the video streams is determined, based on the determined entropy. At 1906, the plurality of video streams is displayed, based on the determined order, on a display of the computing device.

Again, as discussed above, the video streams may further comprise audio, and determining the order in which to display the video streams may comprise utilizing natural language processing in order to determine the context of the audio. Additionally and/or alternatively, a participant recognition model may be utilized to determine the participants of the videoconference, and the video streams may be displayed according to preset rules. Participants may be identified by, for example, facial recognition and/or by a displayed name of a participant. Determining the context of the audio may include utilizing a trained model. Such a model may be an artificial intelligence model, such as a trained neural network, and may associate a confidence level with the output.

Figure 20A:
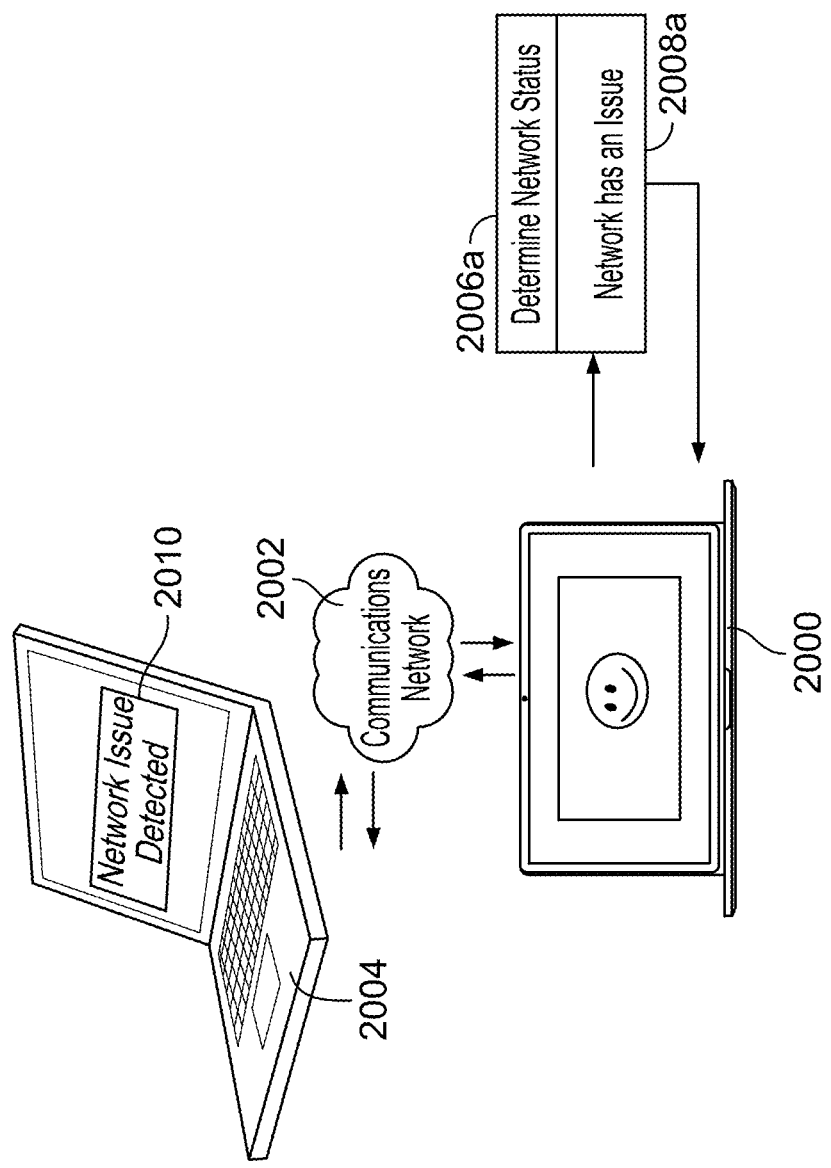
FIG. 20a shows an exemplary environment in which a media stream is transmitted from a first computing device to one or more secondary computing devices and network connectivity issues are automatically responded to, in accordance with some embodiments of the disclosure.

FIG. 20a shows an exemplary environment in which a media stream is transmitted from a first computing device to one or more secondary computing devices and network connectivity issues are automatically responded to, in accordance with some embodiments of the disclosure. A first laptop 2000 participates in a videoconference, via a communications network 2002, with a second laptop 2004. The communications network 2002 may be a local network and/or the internet and may include wired and/or wireless components.

The network status is determined 2006a. In this example, the network has an issue 2008a that still allows a basic level of communication between the first laptop 2000 and the second laptop 2004. A notification is transmitted to the secondary computing device 2004 and is displayed 2010.

Figure 20B:
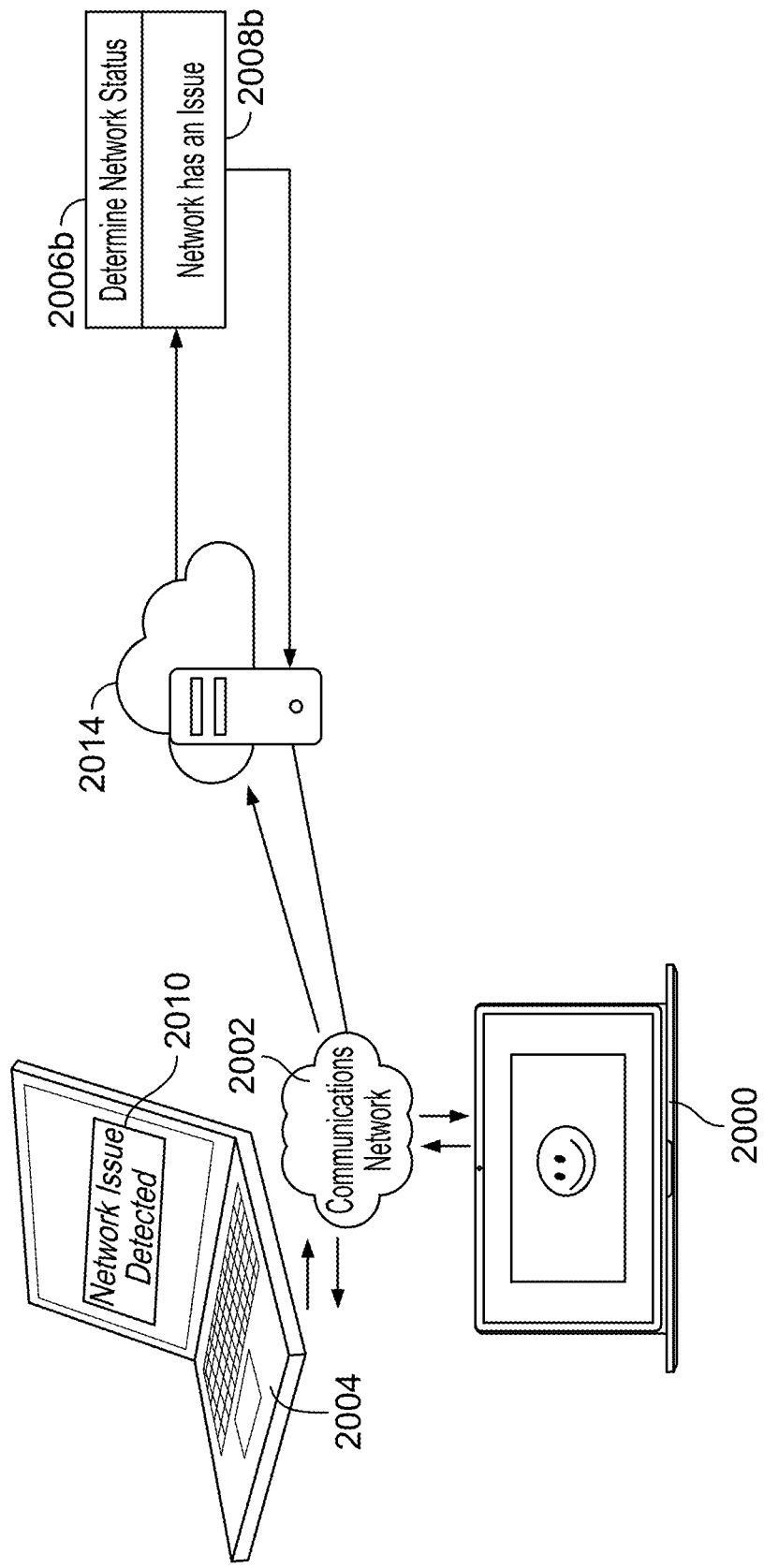
FIG. 20b shows another exemplary environment in which a media stream is transmitted from a first computing device to one or more secondary computing devices and network connectivity issues are automatically responded to, in accordance with some embodiments of the disclosure.

FIG. 20b shows an exemplary environment in which a media stream is transmitted from a first computing device to one or more secondary computing devices and network connectivity issues are automatically responded to, in accordance with some embodiments of the disclosure. A first laptop 2000 participates in a videoconference, via a communications network 2002 and a server 2014, with a second laptop 2004. The communications network 2002 may be a local network and/or the internet and may include wired and/or wireless components.

The network status is determined 2006b at the server 2014. In this example, the network has an issue 2008b. Independent of whether the first laptop 2000 and the second laptop 2004 can communicate, as long as a network connection is available between the server 2014 and the second laptop 2004, the server transmits a notification to the secondary computing device 2004, which is displayed 2010.

Natural language processing may be used to determine a context of the videoconference audio. Based on the context of the audio, a personalized message may be displayed. For example, the message may refer to the name or job title of a speaker experiencing a network issue.

A network connectivity issue is any issue that has the potential to cause issues with the transmission of media content between two or more computing devices. This may include a reduction in available bandwidth, a reduction in available computing resources (such as computer processing and/or memory resources) and/or a change in network configuration. Such an issue may not be immediately obvious to an end user; however, for example, a relatively small reduction in bandwidth may be a precursor to further issues. A connectivity issue may manifest itself as pixilated video and/or distorted audio on a conference call. Network connectivity issues also include issues where connectivity is entirely lost.

The notification may be a text message that appears in a chat area of the one or more secondary computing devices, an audio message, an icon (for example a warning triangle and/or an exclamation mark), and/or a notification that appears in a notification area of the one or more secondary computing devices. The generation of the notification may also utilize a text-to-speech model.

Figure 21A:
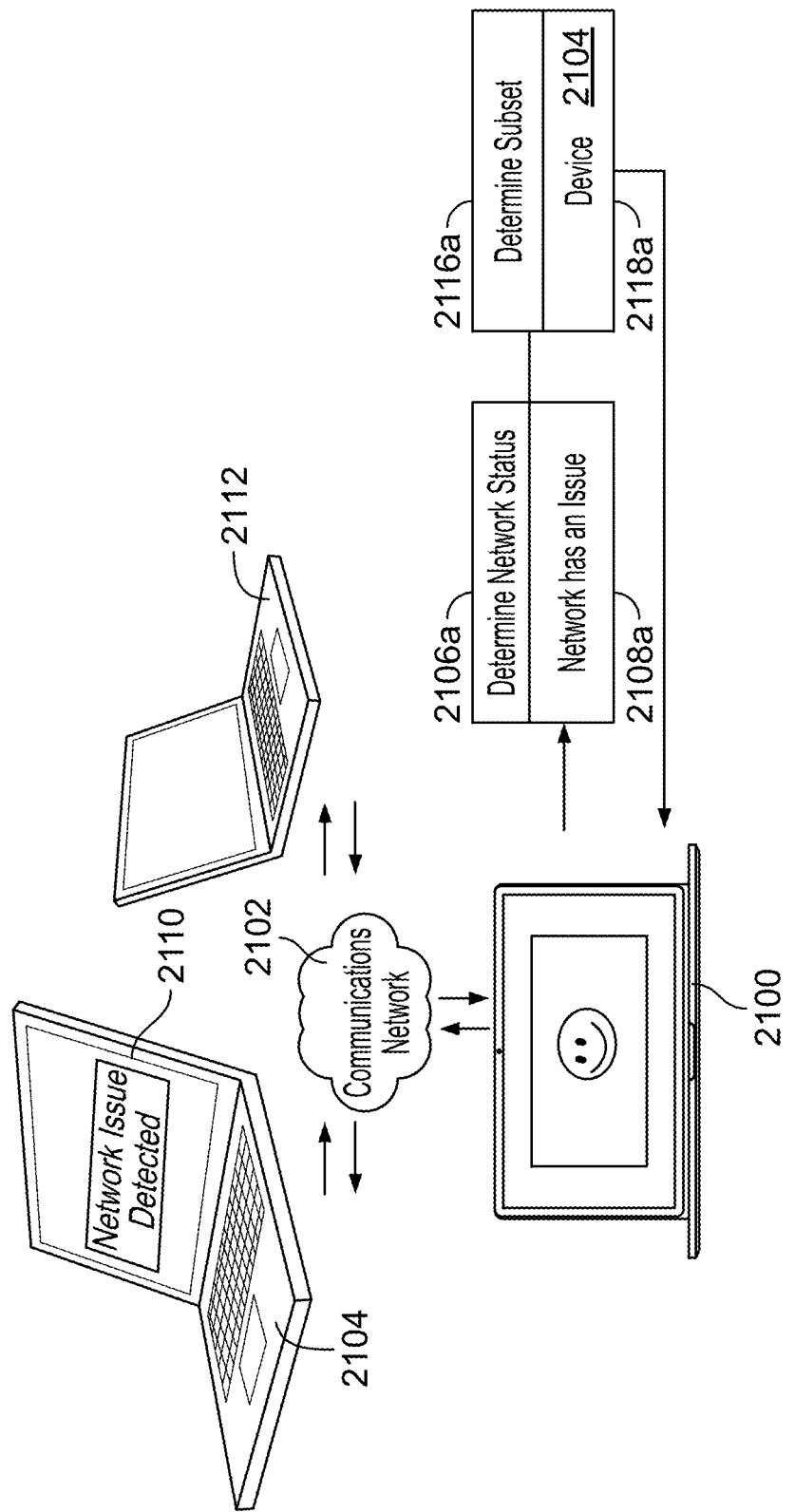
FIG. 21a shows another exemplary environment in which a media stream is transmitted from a first computing device to one or more secondary computing devices and network connectivity issues are automatically responded to, in accordance with some embodiments of the disclosure.

FIG. 21a shows another exemplary environment in which a media stream is transmitted from a first computing device to one or more secondary computing devices and network connectivity issues are automatically responded to, in accordance with some embodiments of the disclosure. A first laptop 2100 participates in a videoconference, via a communications network 2102, with secondary laptops 2104, 2112. The communications network 2102 may be a local network and/or the internet and may include wired and/or wireless components.

The network status is determined 2106a. In this example, the network has an issue 2108a that still allows a basic level of communication between the first laptop 2100 and the secondary laptops 2104, 2112. A subset of the secondary laptops 2104, 2112 to which a notification is to be sent is determined 2116a. In this example, laptop 2104 is selected, as it is determined to be a co-host. Further examples of determination criteria are discussed in connection with FIG. 24 below. A notification is transmitted to a subset of the secondary computing devices 2104 and is displayed 2110. Such an implementation may be utilized where the first laptop 2100 is being used by a host and a subset of the secondary laptops 2104 is being used by a co-host. In this case it may be useful to notify the co-host that the host is experiencing network issues, so that they can step in if necessary. However, it is not needed, in this case, to notify the rest of the participants 2112. Natural language processing may be used to determine a context of the videoconference audio. Based on the context of the audio, a subset of the participants may be selected, for example if natural language processing determines that they are co-hosts. Other options that may be determined are discussed in more detail in connection with FIG. 24 below.

Figure 21B:
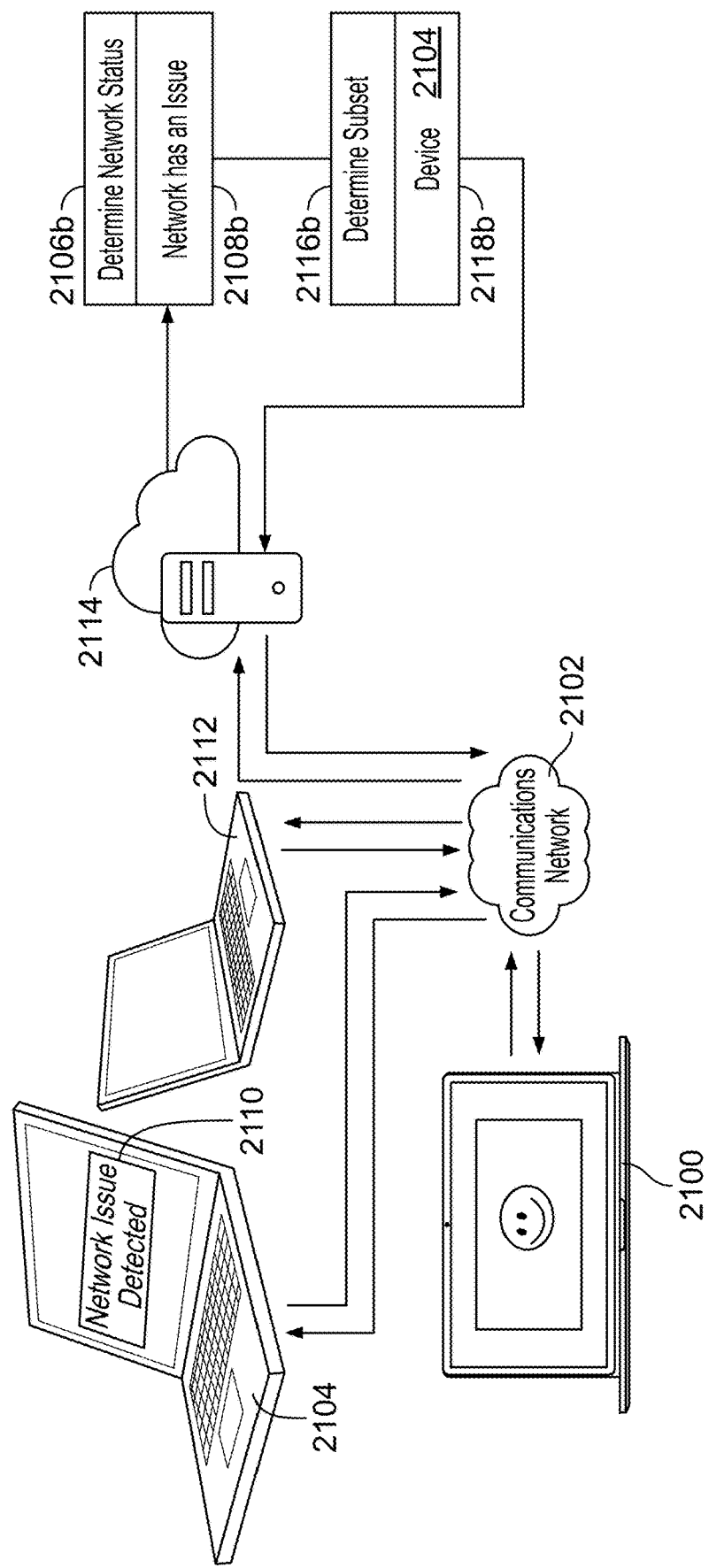
FIG. 21b shows another exemplary environment in which a media stream is transmitted from a first computing device to one or more secondary computing devices and network connectivity issues are automatically responded to, in accordance with some embodiments of the disclosure.

FIG. 21b shows another exemplary environment in which a media stream is transmitted from a first computing device to one or more secondary computing devices and network connectivity issues are automatically responded to, in accordance with some embodiments of the disclosure. A first laptop 2100 participates in a videoconference, via a communications network 2102 and a server 2114, with secondary laptops 2104, 2112. The communications network 2102 may be a local network and/or the internet and may include wired and/or wireless components.

The network status is determined 2106b at the server 2114. In this example, the network has an issue 2108b. A subset of the secondary laptops 2104, 2112 to which a notification is to be sent is determined 2116b. In this example, laptop 2104 is selected as it is determined to be a co-host. Further examples of determination criteria are discussed in connection with FIG. 24 below. A notification is transmitted from the server to a subset of the secondary computing devices 2104 and is displayed 2110. Independent of whether the first laptop 2100 and the secondary laptops 2104, 2112 can communicate, as long as a network connection is available between the server 2114 and the secondary laptop 2104, a notification can be transmitted. Such an implementation may be utilized where the first laptop 2100 is being used by a host and a subset of the secondary laptops 2104 is being used by a co-host. In this case it may be useful to notify the co-host that the host is experiencing network issues, so that they can step in if necessary. However, it is not needed, in this case, to notify the rest of the participants 2112. Natural language processing may be used to determine a context of the videoconference audio. Based on the context of the audio, a subset of the participants may be selected, for example if natural language processing determines that they are co-hosts. Other options that may be determined are discussed in more detail in connection with FIG. 24 below.

Figure 22A:
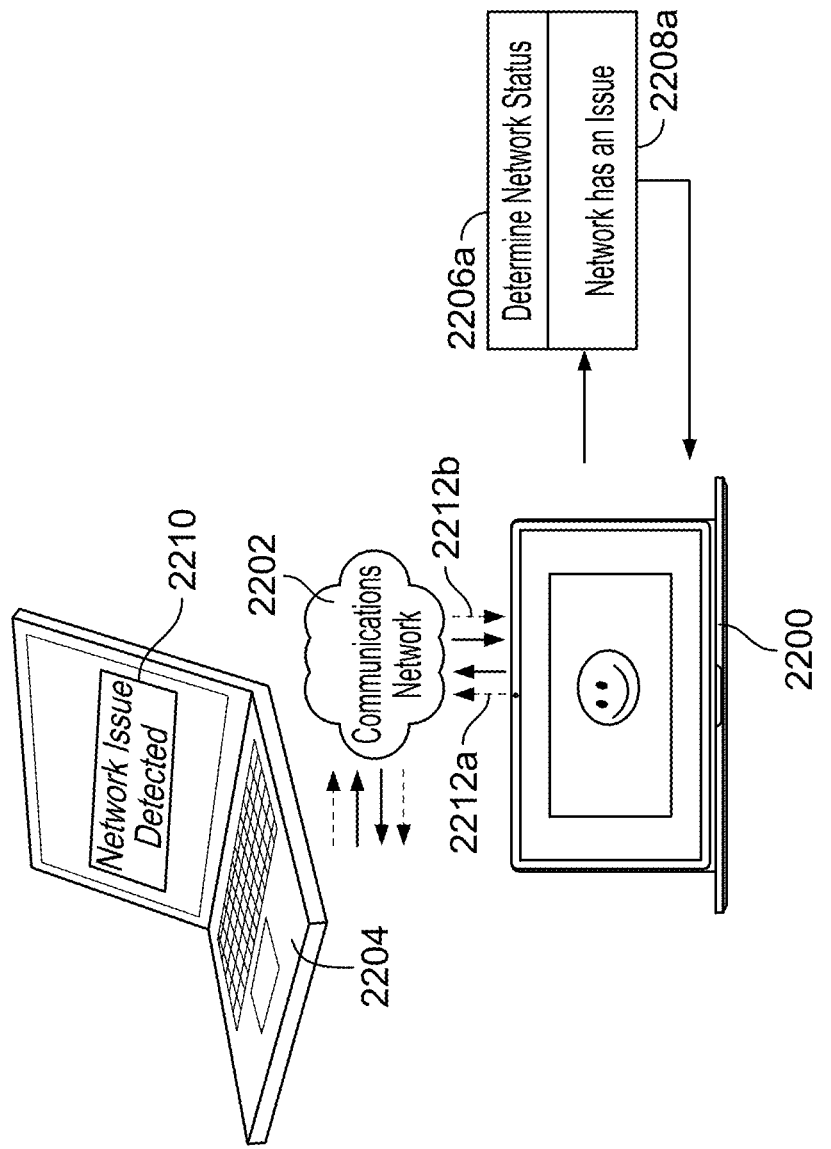
FIG. 22a shows another exemplary environment in which a media stream is transmitted from a first computing device to one or more secondary computing devices and network connectivity issues are automatically responded to, in accordance with some embodiments of the disclosure.

FIG. 22a shows another exemplary environment in which a media stream is transmitted from a first computing device to one or more secondary computing devices and network connectivity issues are automatically responded to, in accordance with some embodiments of the disclosure. A first laptop 2200 participates in a videoconference, via a communications network 2202, with a second laptop 2204. The communications network 2202 may be a local network and/or the internet and may include wired and/or wireless components.

A polling signal 2212a, 2212b is transmitted from the first laptop 2200 to the second laptop 2204 and returned from the second laptop 2204 to the first laptop 2200. The first laptop 2200 monitors the polling signal 2212 for any change in the polling signal, as an indicator as to whether there are any network issues. Changes may include a change in frequency of the polling signal or the polling signal stopping entirely.

The network status is determined 2206a based, at least in part, on the polling signal 2212. In this example, the network has an issue 2208a that still allows a basic level of communication between the first laptop 2200 and the second laptop 2204. A notification is transmitted to the second laptop 2204 and is displayed 2210.

Figure 22B:
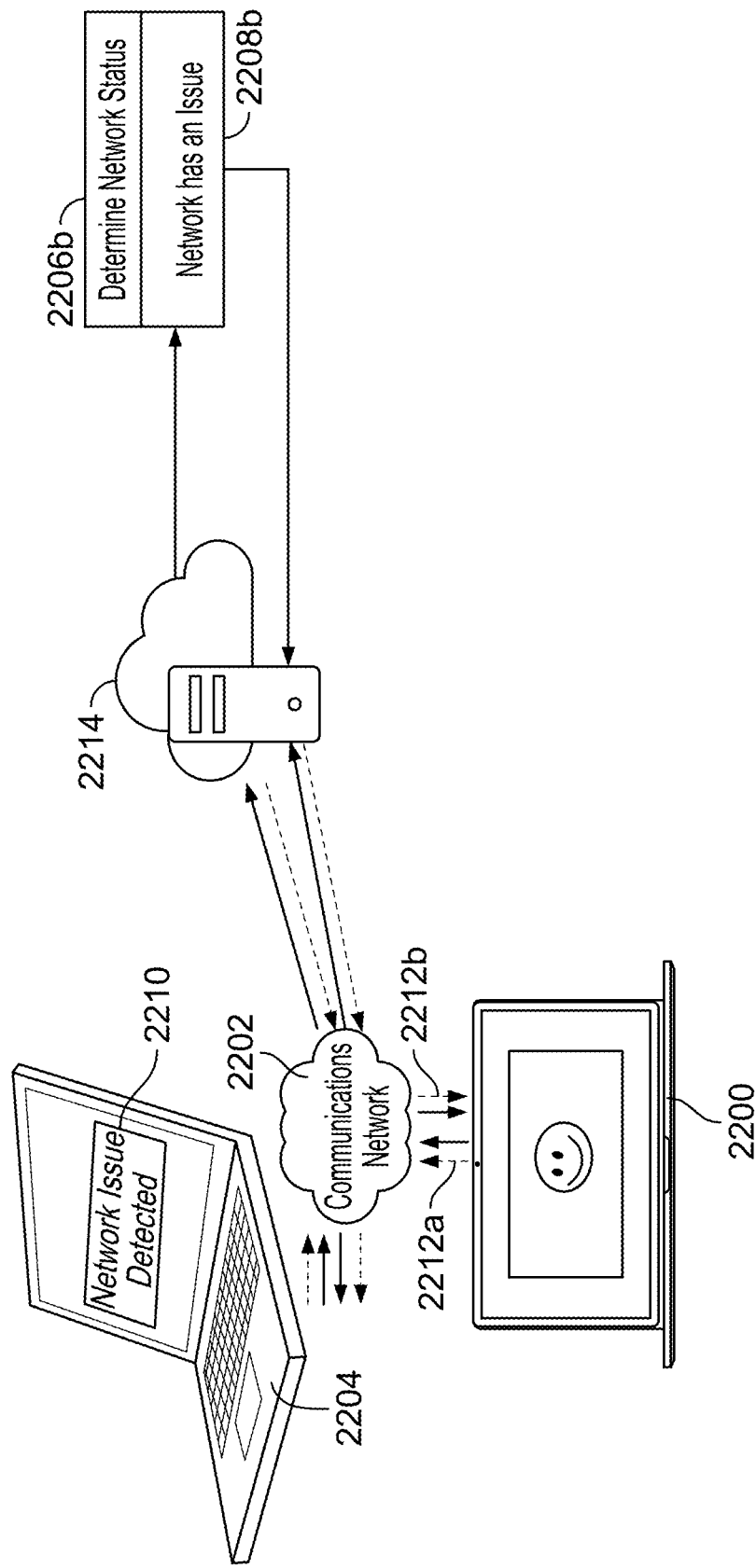
FIG. 22b shows another exemplary environment in which a media stream is transmitted from a first computing device to one or more secondary computing devices and network connectivity issues are automatically responded to, in accordance with some embodiments of the disclosure.

FIG. 22b shows another exemplary environment in which a media stream is transmitted from a first computing device to one or more secondary computing devices and network connectivity issues are automatically responded to, in accordance with some embodiments of the disclosure. A first laptop 2200 participates in a videoconference, via a communications network 2202 and a server 2214, with a second laptop 2204. The communications network 2202 may be a local network and/or the internet and may include wired and/or wireless components.

A polling signal 2212a is transmitted from the first laptop 2200 to the server 2214 and from the server 2214 to the second laptop 2204. The polling signal 2212b is returned from the second laptop 2204 to the server 2214 and from the server 2214 to the first laptop 2200. The first laptop 2200 monitors the polling signal 2212 for any change in the polling signal, as an indicator as to whether there are any network issues. Changes may include a change in frequency of the polling signal or the polling signal stopping entirely. Alternatively and/or additionally, the server 2214 monitors the polling signal 2212 for any change in the polling signal, as an indicator as to whether there are any network issues.

The network status is determined 2206b at the server and is based, at least in part, on the polling signal 2212. In this example, the network has an issue 2208b. The server transmits a notification the second laptop 2204, and the notification is displayed 2210. Independent of whether the first laptop 2200 and the secondary laptop 2204 can communicate, as long as a network connection is available between the server 2214 and the second laptop 2204, a notification can be transmitted. Alternatively, the second laptop 2204 can display a notification if no polling signal is received or if the frequency of receipt of the polling signal drops below a threshold amount, for example once every 10 seconds.

Although a first computing device is discussed in connection with FIGS. 20-22, if, for example, the host of a videoconference changes, then a secondary computing device may effectively become the first computing device.

Figure 23:
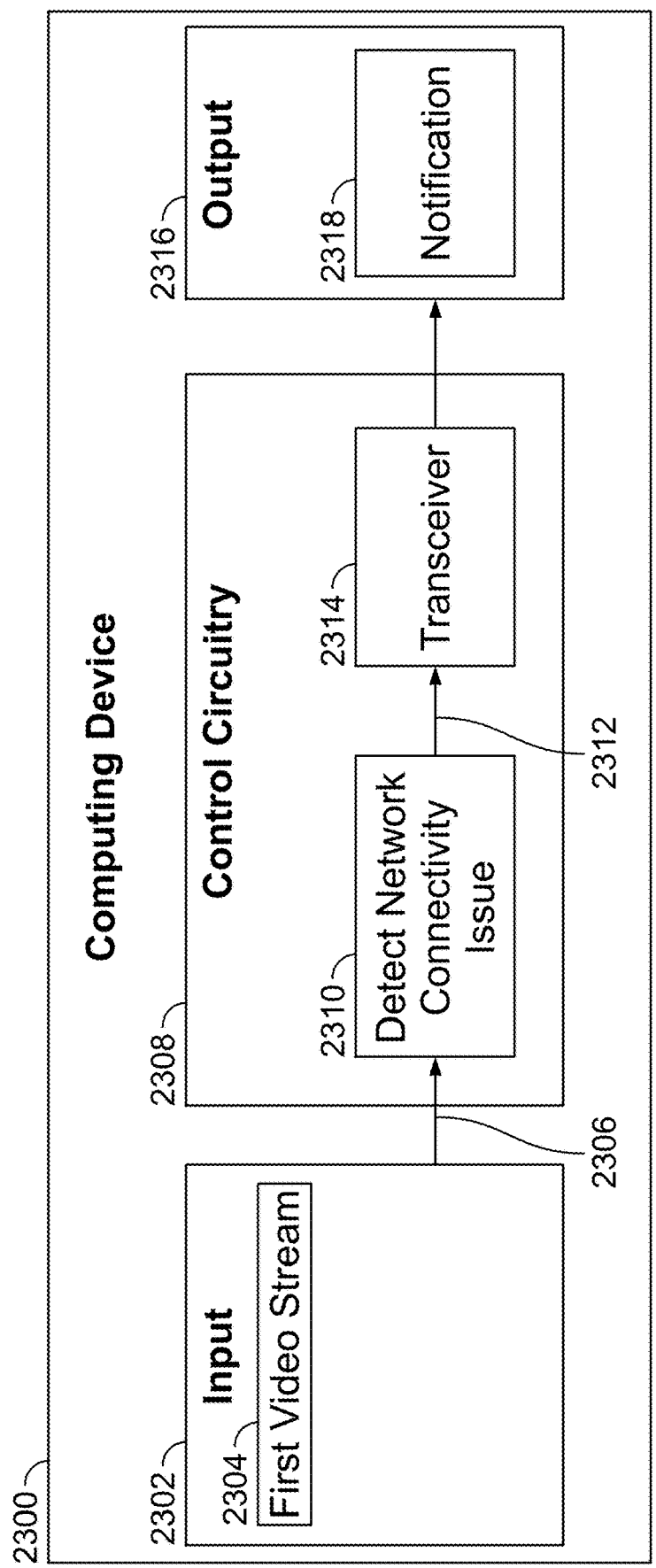
FIG. 23 is a block diagram representing components of a computing device and data flow therebetween for transmitting a media stream from a first computing device to one or more secondary computing devices and for automatically responding to network connectivity issues, in accordance with some embodiments of the disclosure.

FIG. 23 is a block diagram representing components of a computing device and data flow therebetween for transmitting a media stream from a first computing device to one or more secondary computing devices and for automatically responding to network connectivity issues, in accordance with some embodiments of the disclosure. Computing device 2300 (e.g., a computing device 2000, 2100, 2200 as discussed in connection with FIGS. 20-22) comprises input circuitry 2302, control circuitry 2308 and an output module 2316. Control circuitry 2308 may be based on any suitable processing circuitry and comprises control circuits and memory circuits, which may be disposed on a single integrated circuit or may be discrete components. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). Some control circuits may be implemented in hardware, firmware, or software.

First video stream 2304 is received by the input circuitry 2302. The input may be one or more secondary computing devices. Input from a second computing device may be via a network, such as the internet and may comprise wired means, such as an ethernet cable, and/or wireless means, such as Wi-Fi.

The control circuitry 2308 comprises a module to detect network connectivity issues 2310 and a transceiver 2314. Upon the control circuitry 2308 receiving 2306 the video stream, the module to detect network connectivity issues 2310 determines whether there is a network connectivity issue. If there is, it transmits 2312 a notification 2318 via the transceiver 2314 and the output module 2316 to at least one of the secondary computing devices indicating that there is a network issue.

FIG. 24 is an exemplary data structure for indicating attributes associated with conference participants, in accordance with some embodiments of the disclosure. The notification that is sent to the secondary computing devices may be based on one or more of the data.

The data structure 2400 indicates, for each device 2402, what role 2404 the user using the device has in the videoconference. For example, the user may be a host, a co-host or a participant. If the host is having network issues, the notification may be sent only to the co-hosts.

If the data structure 2400 indicates that a user is using video 2406, then the notification may be a visual notification. However, if the data structure indicates that a user is using audio 2408 only, then the notification may be an audible notification.

If the data structure 2400 indicates a user has a high bandwidth 2410, then a relatively small dip in bandwidth may be ignored. However, if the data structure 2400 indicates that a user has low bandwidth, then what is a small dip for a high bandwidth user may be noticeable to a low bandwidth user, and a notification may be displayed.

The data structure 2400 also indicates a user's company 2412 and role in the company 2414. For example, if a company is hosting a videoconference, then notifications may be sent to users that are part of the company before other users. Similarly, users with more senior roles may be notified before users with more junior roles.

Any of the aforementioned data may be populated manually, and/or by a trained network that determines the data from transmitted video and/or audio, for example by using text recognition to read a name badge.

FIG. 25 is a flowchart representing a process for transmitting a media stream from a first computing device to one or more secondary computing devices and for automatically responding to network connectivity issues, in accordance with some embodiments of the disclosure. Process 2500 may be implemented on any aforementioned computing device 2000, 2100, 2200. In addition, one or more actions of process 2500 may be incorporated into or combined with one or more actions of any other process or embodiment described herein.

At 2502, a video stream is transmitted from a computing device to one or more secondary computing devices. At 2504, a network connectivity issue between the first computing device and one or more secondary computing devices is detected. At 2506, a notification is displayed to the one or more secondary computing devices if a network issue is detected.

Figure 26:
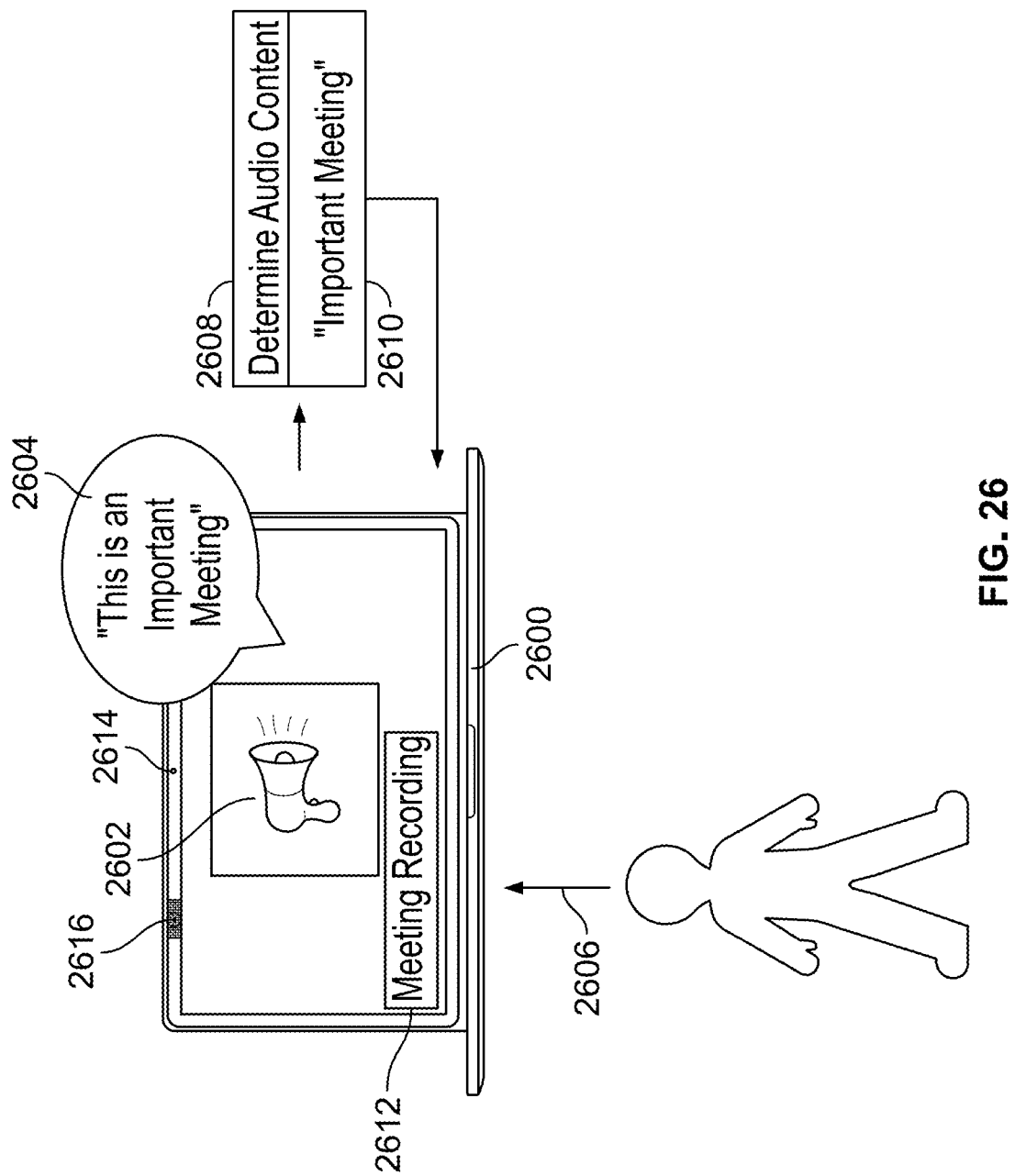
FIG. 26 shows an exemplary environment in which audio of a conference call is received at a computer and an action is automatically performed in respect of the conference call, in accordance with some embodiments of the disclosure.

FIG. 26 shows an exemplary environment in which audio of a conference call is received at a computer and an action is automatically performed in respect of the conference call, in accordance with some embodiments of the disclosure. At a laptop 2600, audio 2602 is received. The audio may be as part of a conference call. In this example, the audio is "This is an important meeting" 2604. A user 2606 hears that this is an important meeting and camera 2614 of the laptop captures the user 2606 turning their head towards the laptop 2600. The audio content and the user response are determined 2608. In this example, the user response of turning their head towards the laptop in response to the audio 2604 is determined to indicate that the user is interested in the content of the meeting, and the audio content is determined to indicate that this is an important meeting 2610. In response to the determination of the user response and the audio content, the meeting is recorded 2612 at the laptop 2600. Although recording is used in this example, other actions may take place. For example, a notification may be generated and displayed on a display of the laptop 2600 that the user is missing an important meeting or that the user should join the meeting at a certain time.

Figure 27:
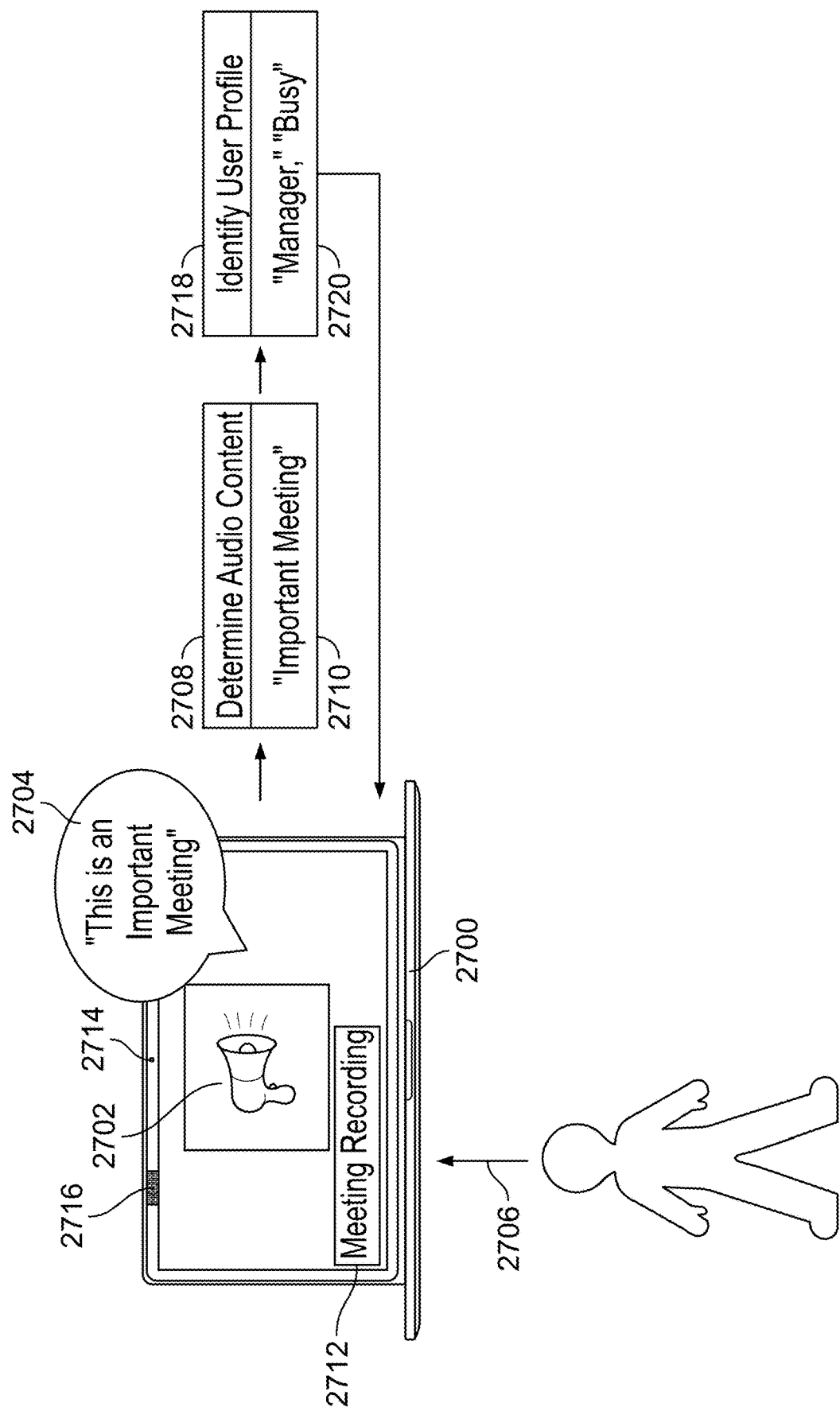
FIG. 27 shows another exemplary environment in which audio of a conference call is received at a computer and an action is automatically performed in respect of the conference call, in accordance with some embodiments of the disclosure.

FIG. 27 shows another exemplary environment in which audio of a conference call is received at a computer and an action is automatically performed in respect of the conference call, in accordance with some embodiments of the disclosure. At a laptop 2700, audio 2702 is received. The audio may be as part of a conference call. In this example, the audio is "This is an important meeting" 2704. A user 2706 hears that this is an important meeting, and camera 2714 of the laptop captures the user 2706 turning their head towards the laptop 2700. The audio content and the user response are determined 2708. In this example, the user response of turning their head towards the laptop in response to the audio 2704 is determined to indicate that the user is interested in the content of the meeting, and the audio content is determined to indicate that this is an important meeting 2710. In addition, a user profile is identified 2718. In this example, the user profile indicates that the user is a "Manager" and has a calendar appointment, so is currently "Busy" 2720. In this example, the user profile indicates that the user is senior and hence should hear what is said in the meeting. Additionally, the profile indicates that the user is not able to participate in the meeting because they are busy. In response to the determination of the user response, the audio content and the identified user profile, the meeting is recorded 2712 at the laptop 2700. Although recording is used in this example, other actions may take place. For example, a notification may be generated and displayed on a display of the laptop 2700 that the user is missing an important meeting or that the user should join the meeting at a certain time.

The determination of the user response and/or the content of the audio in FIGS. 26 and 27 may utilize a model, for example, an artificial intelligence model such as a trained neural network, and may associate a confidence level with the output. The action may be determined, in part, based on the confidence level. Alternatively and/or additionally, a knowledge graph may be utilized to identify topics of interest. Identifying a user response may additionally and/or alternatively comprise determining a facial expression of the user and/or an emotion of the user. The user may also utter a sound and/or words that may be captured by a microphone 2616, 2716 of the laptop 2600, 2700. The determination of the user response may also and/or additionally be based on an utterance of the user and/or eye tracking of the user.

Figure 28:
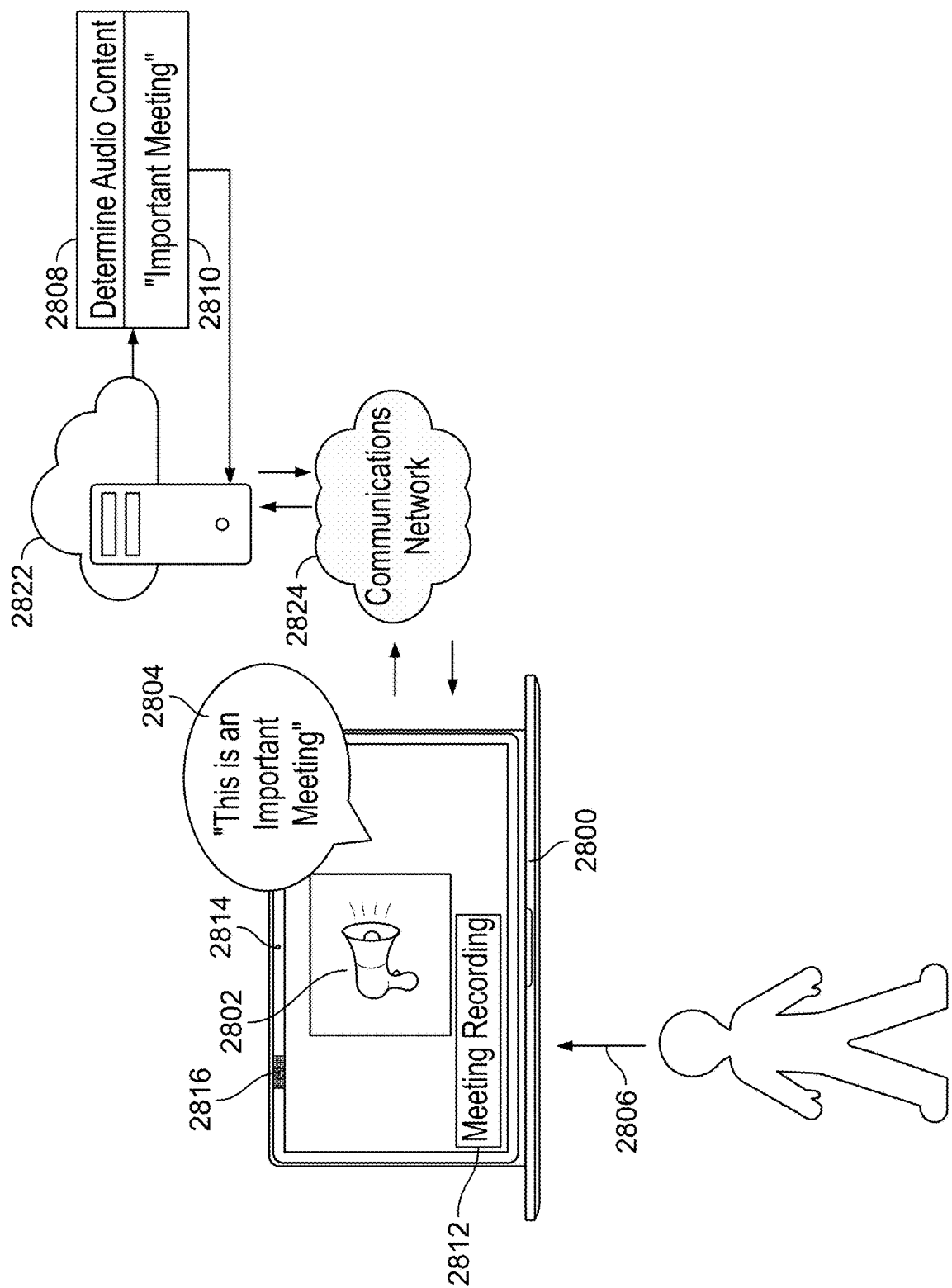
FIG. 28 shows another exemplary environment in which audio of a conference call is received at a computer and an action is automatically performed in respect of the conference call, in accordance with some embodiments of the disclosure.
Figure 29:
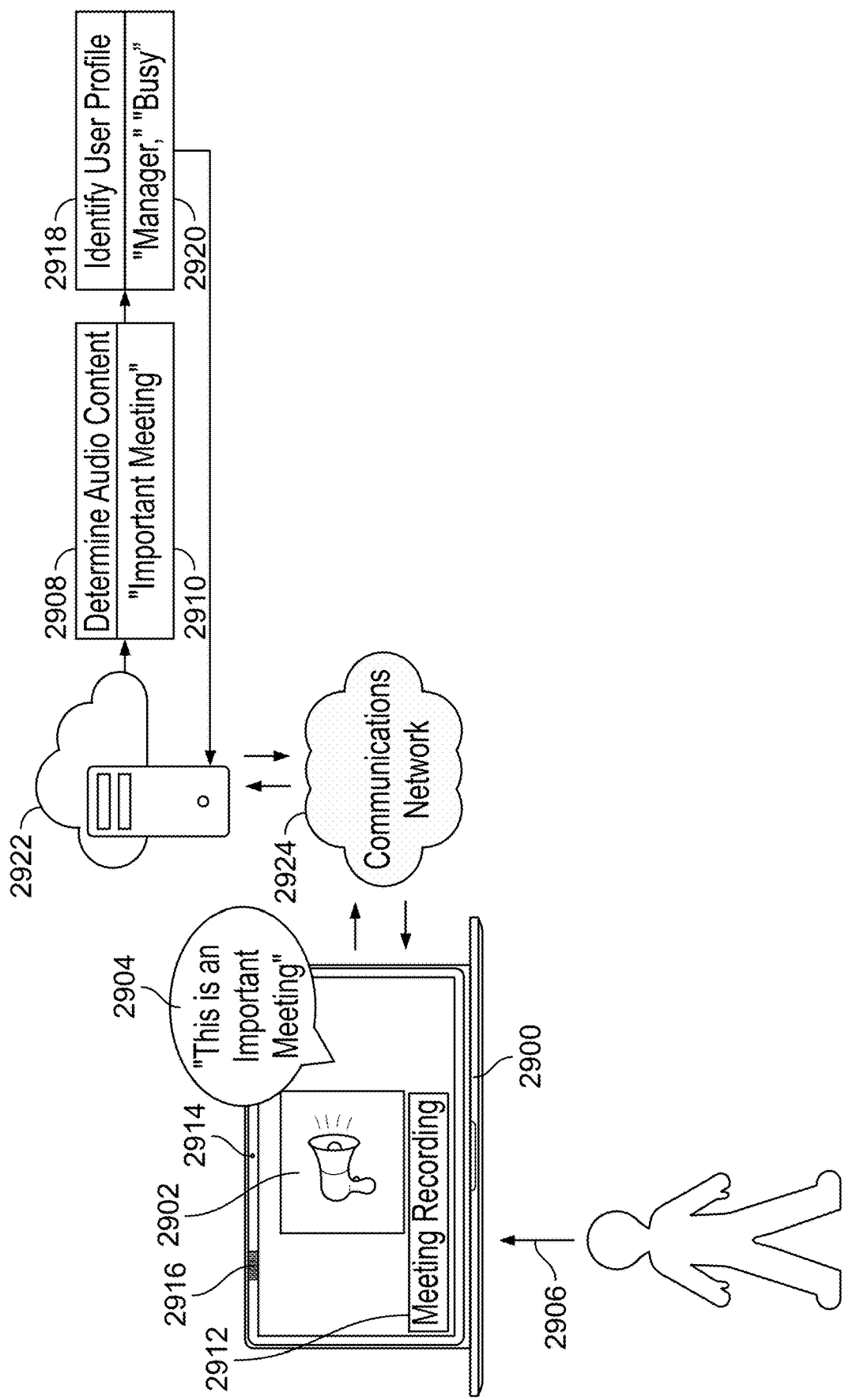
FIG. 29 shows another exemplary environment in which audio of a conference call is received at a computer and an action is automatically performed in respect of the conference call, in accordance with some embodiments of the disclosure.

FIG. 28 shows an exemplary environment in which audio of a conference call is received at a computer and an action is automatically performed in respect of the conference call, in accordance with some embodiments of the disclosure. At a laptop 2800, audio 2802 is received. The audio may be as part of a conference call. In this example, the audio is "This is an important meeting" 2804. A user 2806 hears that this is an important meeting, and camera 2814 of the laptop captures the user 2806 turning their head towards the laptop 2800. The audio content and the images of the user are transmitted, via a communications network 2824, to a server 2822. The communications network 2824 may be a local network and/or the internet and may include wired and/or wireless components. At the server 2822, the audio content and the user response are determined 2808. In this example, the user response of turning their head towards the laptop in response to the audio 2804 is determined to indicate that the user is interested in the content of the meeting, and the audio content is determined to indicate that this is an important meeting 2810. In response to the determination of the user response and the audio content, the server 2822 transmits, via the communications network 2824, an instruction to the laptop 2800 to record the meeting. The laptop 2800 executes the instruction to record the meeting 2812. Although recording is used in this example, other actions may take place. For example, a notification may be generated and displayed on a display of the laptop 2800 that the user is missing an important meeting or that the user should join the meeting at a certain time FIG. 29 shows an exemplary environment in which audio of a conference call is received at a computer and an action is automatically performed in respect of the conference call, in accordance with some embodiments of the disclosure. At a laptop 2900, audio 2902 is received. The audio may be as part of a conference call. In this example, the audio is "This is an important meeting" 2904. A user 2906 hears that this is an important meeting, and camera 2914 of the laptop captures the user 2906 turning their head towards the laptop 2900. The audio content and the images of the user are transmitted, via a communications network 2924, to a server 2922. The communications network 2924 may be a local network and/or the internet and may include wired and/or wireless components. At the server 2922, the audio content and the user response are determined 2908. In this example, the user response of turning their head towards the laptop in response to the audio 2904 is determined to indicate that the user is interested in the content of the meeting, and the audio content is determined to indicate that this is an important meeting 2910. In addition, a user profile is identified 2918. In this example, the user profile indicates that the user is a "Manager" and has a calendar appointment, so is currently "Busy" 2920. In this example, the user profile indicates that the user is senior and hence should hear what is said in the meeting. Additionally, the profile indicates that the user is not able to participate in the meeting because they are busy. In response to the determination of the user response, the audio content and the identified user profile, the server 2922 transmits, via the communications network 2924, an instruction to the laptop 2900 to record the meeting. The laptop 2900 executes the instruction to record the meeting 2912. Although recording is used in this example, other actions may take place. For example, a notification may be generated and displayed on a display of the laptop 2900 that the user is missing an important meeting or that the user should join the meeting at a certain time.

Figure 30:
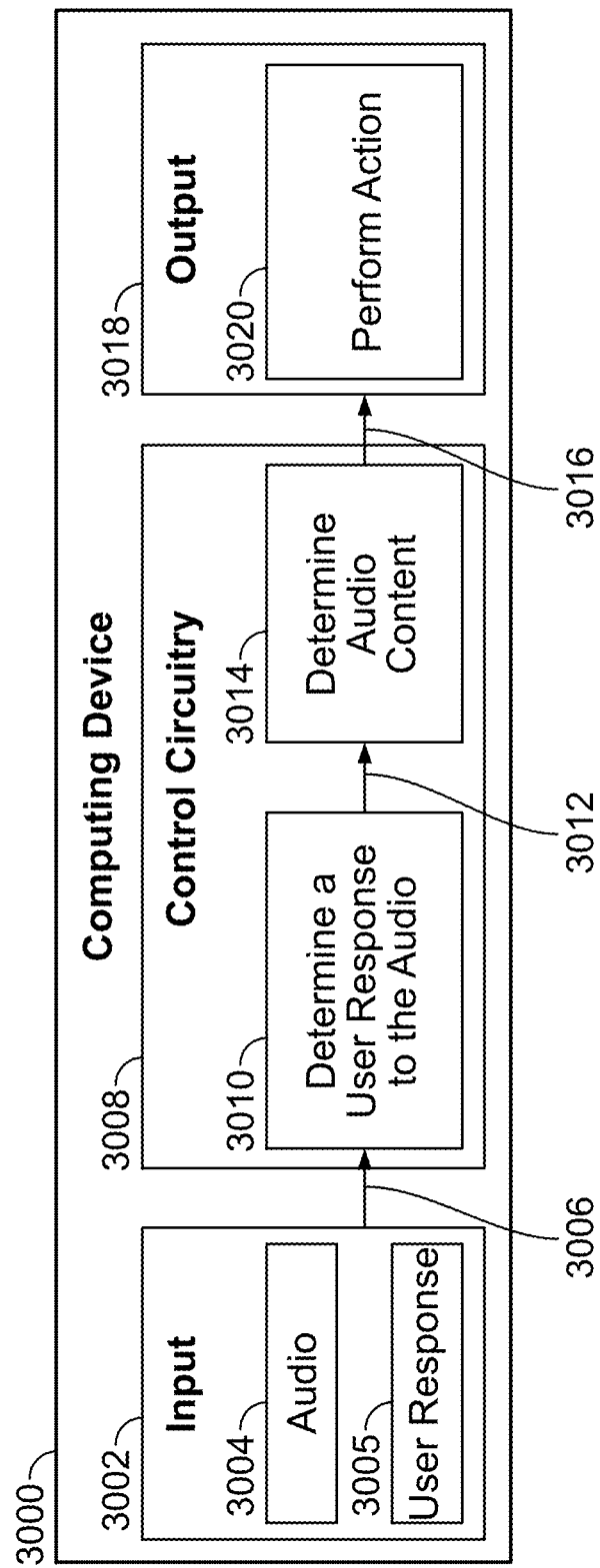
FIG. 30 is a block diagram representing components of a computing device and data flow therebetween for receiving audio of a conference call and for automatically performing an action in respect of the conference call, in accordance with some embodiments of the disclosure.

FIG. 30 is a block diagram representing components of a computing device and data flow therebetween for receiving audio of a conference call and for automatically performing an action in respect of the conference call, in accordance with some embodiments of the disclosure. Computing device 3000 (e.g., a computing device 2600, 2700, 2800, 2900 as discussed in connection with FIGS. 26-29) comprises input circuitry 3002, control circuitry 3008 and an output module 3018. Control circuitry 3008 may be based on any suitable processing circuitry and comprises control circuits and memory circuits, which may be disposed on a single integrated circuit or may be discrete components. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). Some control circuits may be implemented in hardware, firmware, or software.

First audio input 3004 is received by the input circuitry 3002. The input circuitry 3002 is configured to receive a first audio input as, for example, an audio stream from a secondary computing device. Transmission of the input 3004 from the secondary computing device to the input circuitry 3002 may be accomplished using wired means, such as an ethernet cable, or wireless means, such as Wi-Fi. The input circuitry 3002 determines whether the first audio input is audio and, if it is audio, transmits the first audio to the control circuitry 3008. The input module also receives a user response input 3005, such as a video and/or a second audio stream, for determining a user response to the audio. This may be received via an integral and/or external microphone and/or webcam. An external microphone and/or webcam may be connected via wired means, such as USB or via wireless means, such as BLUETOOTH.

The control circuitry 3008 comprises a module to determine a user response to the audio 3010 and a module to determine audio content 3014. Upon the control circuitry 3008 receiving 3006 the first audio and the video and/or second audio, the module to determine a user response to the audio 3010 receives the video and/or second audio and determines the user response to the first audio. The first audio input is transmitted 3012 to the module to determine the audio content 3014, and the content of the first audio input is determined.

An action to be performed is determined based on the user response to the first audio and the content of the first audio. This is transmitted 3016 to the output module 3018. On receiving the action, the output module 3018 performs the action 3020.

As discussed above, the determination of the user response and/or the content of the audio may utilize a model, for example, an artificial intelligence model such as a trained neural network, and may associate a confidence level with the output. The action may be determined, in part, based on the confidence level.

Figure 31:
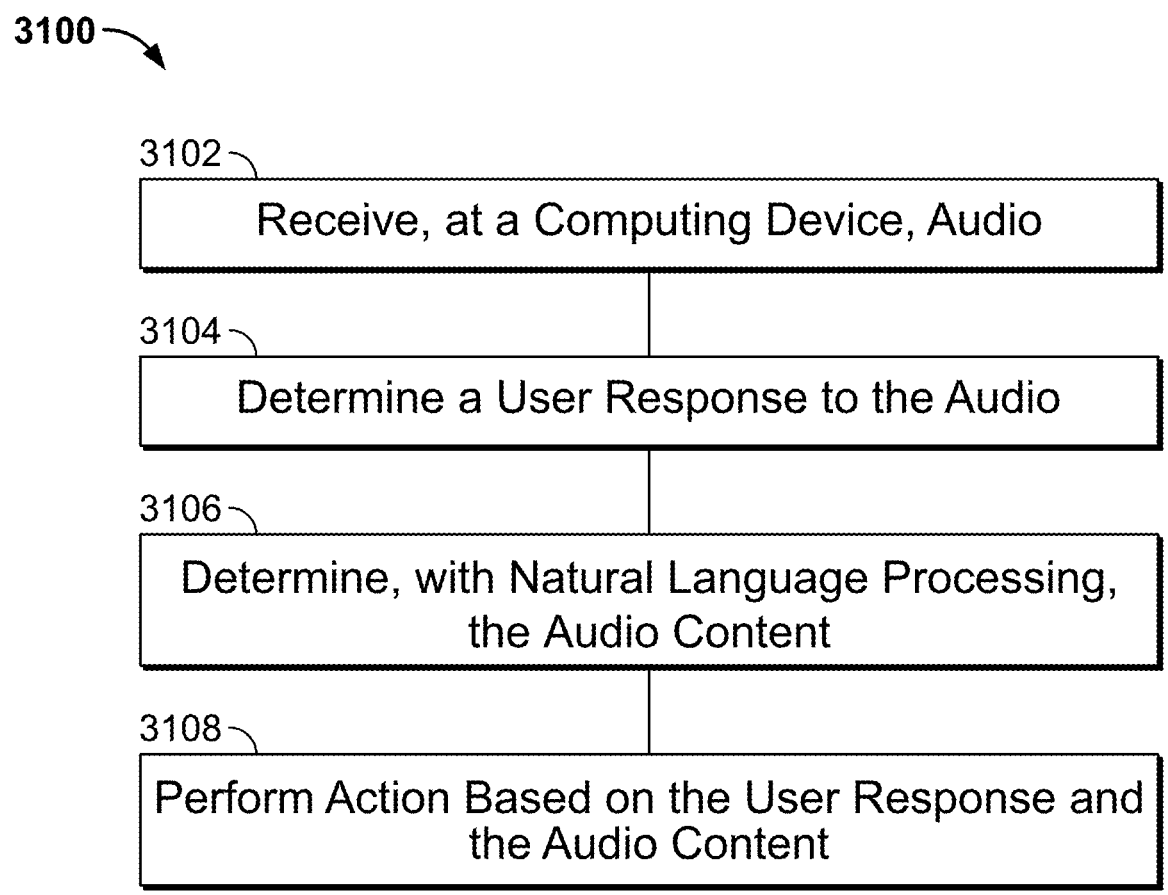
FIG. 31 is a flowchart representing a process for receiving audio of a conference call and for automatically performing an action in respect of the conference call, in accordance with some embodiments of the disclosure.

FIG. 31 is a flowchart representing a process for receiving audio of a conference call and for automatically performing an action in respect of the conference call, in accordance with some embodiments of the disclosure. Process 3100 may be implemented on any aforementioned computing device 2600, 2700, 2800, 2900. In addition, one or more actions of process 3100 may be incorporated into or combined with one or more actions of any other process or embodiment described herein. At 3102, audio is received at a computing device. At 3104, a user response to the audio is determined. At 3106, audio content is determined. At 3108, an action is performed based on the user response and the audio content. As discussed above, the determination of the user response and/or the content of the audio may utilize a model, for example, an artificial intelligence model such as a trained neural network, and may associate a confidence level with the output. The action may be determined, in part, based on the confidence level.

Figure 32:
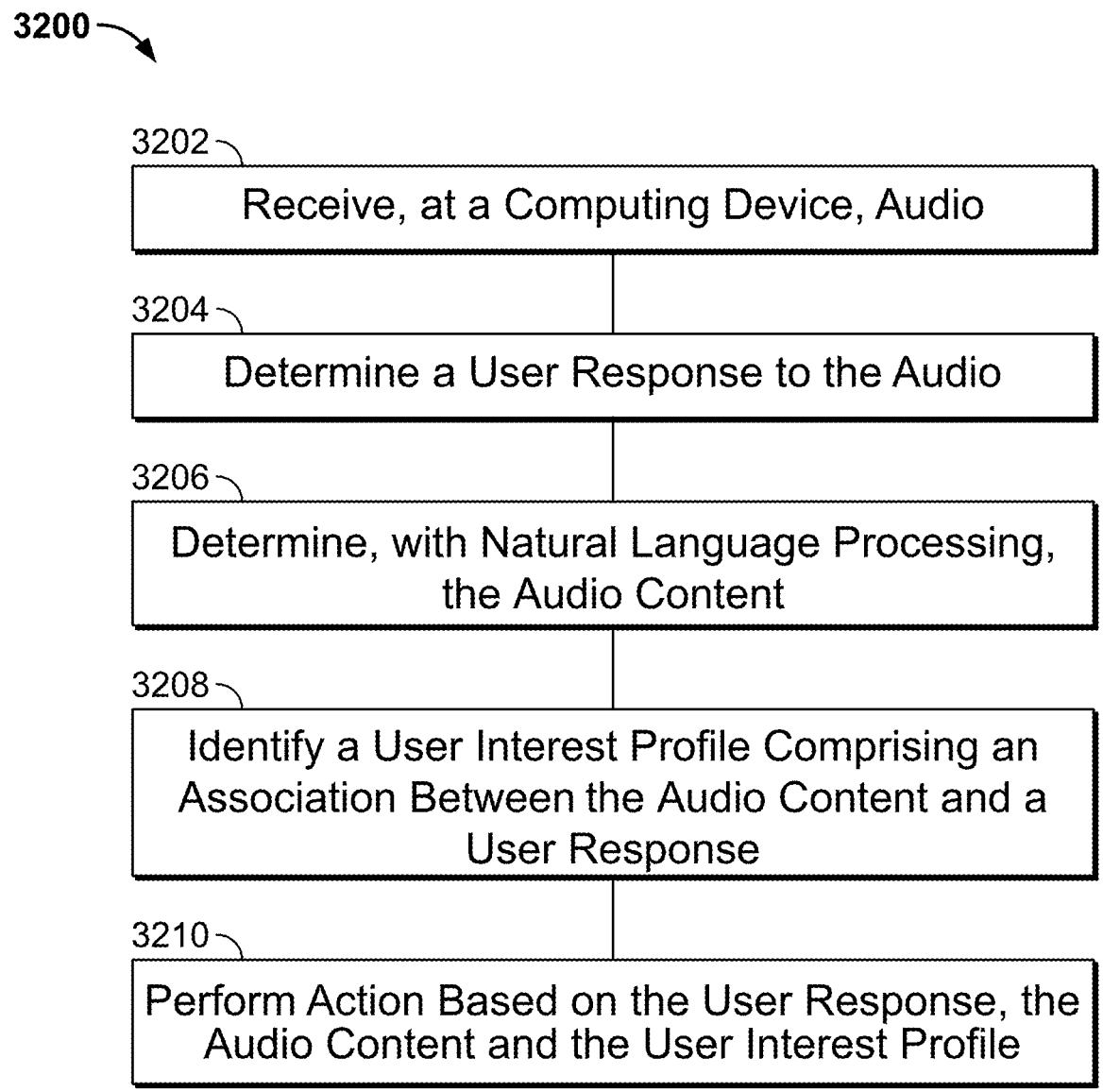
FIG. 32 is another flowchart representing a process for receiving audio of a conference call and for automatically performing an action in respect of the conference call, in accordance with some embodiments of the disclosure.

FIG. 32 is another flowchart representing a process for receiving audio of a conference call and for automatically performing an action in respect of the conference call, in accordance with some embodiments of the disclosure. Process 3200 may be implemented on any aforementioned computing device 2600, 2700, 2800, 2900. In addition, one or more actions of process 3200 may be incorporated into or combined with one or more actions of any other process or embodiment described herein. At 3202, audio is received at a computing device. At 3204, a user response to the audio is determined. At 3206, audio content is determined. At 3208, a user interest profile comprising an association between audio content and a user response is identified. At 3210, an action is performed based on the user response, the audio content and the identified user interest profile. As discussed above, the determination of the user response and/or the content of the audio may utilize a model, for example, an artificial intelligence model such as a trained neural network, and may associate a confidence level with the output. The action may be determined, in part, based on the confidence level.

The processes described above are intended to be illustrative and not limiting. One skilled in the art would appreciate that the steps of the processes discussed herein may be omitted, modified, combined, and/or rearranged, and any additional steps may be performed without departing from the scope of the disclosure. More generally, the above disclosure is meant to be exemplary and not limiting. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for automatically selecting a mute function based on audio content, the method comprising:
    receiving, at a first computing device, a first audio input and, from a second computing device, a second audio input;
    recording the first audio input;
    determining, with natural language processing, content of the first audio input and content of the second audio input;
    determining whether the content of the first audio input corresponds to the content of the second audio input;
    determining whether a mute function of the first computing device is turned on; and
    in response to determining that the content of the first audio input corresponds to the content of the second audio input and that the mute function of the first computing device is turned on:
        identifying a portion of the recorded first audio input based on the determination of whether the content of the first audio input corresponds to the content of the second audio input;
        transmitting the identified portion of the recorded first audio input to the second computing device; and
        turning off the mute function at the first computing device.

2. The method of claim 1, wherein the first audio input is received at the first computing device via an input device and the second audio input is transmitted from a second computing device.

3. The method of claim 1, wherein the first audio input is transmitted to at least the second computing device and wherein the first computing device and the second computing device are participants in an audioconference.

4. The method of claim 1, wherein, in response to determining that the content of the first audio input does not correspond to the content of the second audio input and that the mute function of the first computing device is turned off, the mute function of the first computing device is turned on.

5. The method of claim 1, wherein the first audio input and the second audio input are transcribed at the first computing device; and
    the determining the content of the first and second audio inputs is based on the transcribed audio.

6. The method of claim 1, first audio input is received via a microphone connected to the first computing device and the second audio input is received via a network.

7. A system for automatically selecting a mute function based on audio content, the system comprising:
    a communication port; and
    control circuitry configured to:
        receive, at a first computing device, a first audio input and, from a second computing device, a second audio input;
        record the first audio input;
        determine, with natural language processing, content of the first audio input and content of the second audio input;
        determine whether the content of the first audio input corresponds to the content of the second audio input;
        determine whether a mute function of the first computing device is turned on; and
        in response to determining that the content of the first audio input corresponds to the content of the second audio input and that the mute function of the first computing device is turned on:
            identify a portion of the recorded first audio input based on the determination of whether the content of the first audio input corresponds to the content of the second audio input;
            transmit the identified portion of the recorded first audio input to the second computing device; and
            turn off the mute function at the first computing device.

8. The system of claim 7, wherein:
    the control circuitry configured to receive the first audio input is further configured to receive the first audio input via an input device; and the control circuitry configured to receive the second audio input is further configured to receive the second audio input via a transmission from the second computing device.

9. The system of claim 7, wherein the control circuitry is further configured to:
- transmit the first audio input to at least the second computing device; and
- participate in an audioconference between the first computing device and the second computing device.

10. The system of claim 7, wherein, in response to determining that the content of the first audio input does not correspond to the content of the second audio input and that the mute function of the first computing device is turned off, the control circuitry configured to operate the mute function is further configured to turn on the mute function of the first computing device.

11. The system of claim 7, wherein the control circuitry is further configured to transcribe the first audio input and the second audio input at the first computing device; and
- the control circuitry configured to determine the content of the first and second audio inputs is further configured to determine the content based on the transcribed audio.

12. The system of claim 7, wherein:
- the control circuitry configured to receive the first audio input is further configured to receive the first audio input via a microphone; and
- the control circuitry configured to receive the second audio input is further configured to receive the second audio input via a network.

13. The system of claim 7, wherein the control circuitry configured to determine content of the first audio input and content of the second audio input is further configured to determine the content with a network trained in accordance with the method of claim 6.

* * * * *